(12) United States Patent
McGavran et al.

(10) Patent No.: US 9,823,077 B2
(45) Date of Patent: *Nov. 21, 2017

(54) NAVIGATION APPLICATION WITH SEVERAL NAVIGATION MODES

(71) Applicant: Apple Inc., Cupertino, CA (US)

(72) Inventors: Christine B. McGavran, Pacifica, CA (US); Bradford A. Moore, San Francisco, CA (US); Christopher D. Moore, San Francisco, CA (US); Harold O. Habeck, Mountain View, CA (US); Marcel van Os, San Francisco, CA (US); Wesley Yue, Sunnyvale, CA (US); Eric L. Grundstrom, Oakland, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/801,716

(22) Filed: Jul. 16, 2015

(65) Prior Publication Data
US 2015/0323340 A1 Nov. 12, 2015

Related U.S. Application Data

(62) Division of application No. 14/055,847, filed on Oct. 16, 2013, now Pat. No. 9,103,681.
(Continued)

(51) Int. Cl.
*G01C 21/00* (2006.01)
*G01C 21/36* (2006.01)
(Continued)

(52) U.S. Cl.
CPC ............ *G01C 21/00* (2013.01); *G01C 21/20* (2013.01); *G01C 21/3423* (2013.01);
(Continued)

(58) Field of Classification Search
CPC ............... G01C 21/20; G01C 21/3423; G01C 21/3626; G01C 21/3652; G01C 21/3661
(Continued)

(56) References Cited

U.S. PATENT DOCUMENTS

| 4,914,605 A | 4/1990 | Loughmiller, Jr. et al. |
| 6,321,158 B1 | 11/2001 | DeLorme et al. |

(Continued)

FOREIGN PATENT DOCUMENTS

| EP | 1030167 | 8/2000 |
| EP | 1614992 | 1/2006 |

(Continued)

OTHER PUBLICATIONS

Invitation to Pay Additional Fees with Partial Search Report of PCT/US2014/033095, dated Aug. 12, 2014, Apple Inc.
(Continued)

*Primary Examiner* — Maceeh Anwari
(74) *Attorney, Agent, or Firm* — DLA Piper LLP US

(57) ABSTRACT

A method for providing navigation instructions on a device is described. As the device traverses a navigated route according to a first mode of transportation, the method displays a first turn-by-turn navigation presentation defined for the first mode. Based on data gathered by the device, the method determines that the device is navigating the route according to a second mode of transportation. The method automatically displays a second, different turn-by-turn navigation presentation defined for the second mode.

9 Claims, 44 Drawing Sheets

Related U.S. Application Data

(60) Provisional application No. 61/832,843, filed on Jun. 8, 2013.

(51) Int. Cl.
  *G01C 21/20* (2006.01)
  *G01C 21/34* (2006.01)

(52) U.S. Cl.
  CPC ..... *G01C 21/3626* (2013.01); *G01C 21/3652* (2013.01); *G01C 21/3661* (2013.01); *G01C 21/3667* (2013.01)

(58) Field of Classification Search
  USPC ......................................................... 701/425
  See application file for complete search history.

(56) References Cited

U.S. PATENT DOCUMENTS

| | | | |
|---|---|---|---|
| 8,060,297 | B2 | 11/2011 | Couckuyt et al. |
| 8,355,862 | B2 | 1/2013 | Matas et al. |
| 8,464,182 | B2 | 6/2013 | Blumenberg et al. |
| 8,606,516 | B2 * | 12/2013 | Vertelney ........... G01C 21/3617 701/439 |
| 8,607,167 | B2 | 12/2013 | Matas et al. |
| 8,639,654 | B2 | 1/2014 | Vervaet et al. |
| 9,103,681 | B2 | 8/2015 | McGavran et al. |
| 2004/0204840 | A1 | 10/2004 | Hashima et al. |
| 2008/0140314 | A1 * | 6/2008 | Park ...................... G01C 21/00 701/469 |
| 2009/0271109 | A1 | 10/2009 | Lee et al. |
| 2011/0029237 | A1 | 2/2011 | Kamalski |
| 2011/0077853 | A1 | 3/2011 | Ranford et al. |
| 2011/0208421 | A1 | 8/2011 | Sakashita |
| 2012/0166077 | A1 | 6/2012 | Herzog et al. |

FOREIGN PATENT DOCUMENTS

| | | |
|---|---|---|
| EP | 2151668 | 2/2010 |
| EP | 2672225 | 12/2013 |
| EP | 2672226 | 12/2013 |
| JP | 2007-057857 | 3/2007 |
| TW | 201022638 | 6/2010 |
| TW | 201120417 | 6/2011 |
| TW | 201139995 | 11/2011 |
| TW | 201226855 A1 | 7/2012 |
| TW | 201231933 | 8/2012 |
| WO | WO 2009/073806 | 6/2009 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |
| WO | WO 2014/197114 | 12/2014 |

OTHER PUBLICATIONS

International Search Report and Written Opinion of PCT/US2014/033095, dated Nov. 12, 2014, Apple Inc.

Author Unknown, "'Touch & Go' Owner's Manual," Jul. 2011, 218 pages, Toyota, United Kingdom.

Author Unknown, "Android 2.3.4 User's Guide", May 20, 2011, pp. 1-384, Google, Inc.

Author Unknown, "Garmin. nüvi 1100/1200/1300/1400 series owner's manual," Jan. 2011, 72 pages, Garmin Corporation, No. 68, Jangshu $2^{nd}$ Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Ruhs, Chris, "My Favorite Android Apps: Maps," Jun. 24, 2011, 1 page, available at http://www.youtube.com/watch?v=v2aRkLkLT3s.

* cited by examiner

NAVIGATION APPLICATION WITH SEVERAL NAVIGATION MODES

CLAIM OF BENEFIT TO PRIOR APPLICATIONS

This application is a divisional application of U.S. patent application Ser. No. 14/055,847, filed Oct. 16, 2013, now published as U.S. Publication 2014/0365113. U.S. patent application Ser. No. 14/055,847 claims the benefit of U.S. Provisional Application 61/832,843, entitled "Navigation Application with Several Navigation Modes", filed Jun. 8, 2013. U.S. patent application Ser. No. 14/055,847, now published as U.S. Publication 2014/0365113 and U.S. Provisional Application 61/832,843 are incorporated herein by reference.

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes relative locations of streets, highways, points of interest, etc., in the map. Some map-based applications provide a navigation feature, which provides the user with turn-by-turn instructions to a destination. Most of these applications, however, do not have sophisticated features that today's demanding users wish to have in their map-based applications.

BRIEF SUMMARY

Some embodiments of the invention provide a navigation application that differently presents, in different navigation modes, the turn-by-turn navigation instructions and the turn-by-turn map views of a route between a starting location and an ending location. In some embodiments, the different navigation modes include the driving mode and the pedestrian mode.

In the driving mode, the navigation application of some embodiments tailors the presentation of the navigation instructions and the map views for a user who is driving a car to navigate the route. In the pedestrian mode, the navigation application of some embodiments tailors the presentation of the navigation instructions and the map views for a user who is walking along the route to the destination.

For instance, the navigation application of some embodiments presents the map views in three-dimension (3D) when the navigation application is in the driving mode. When in the pedestrian mode, the navigation application provides the map views in two-dimension (2D). Moreover, the navigation application of some embodiments presents the map views with higher detailed constructs (e.g., trees, foliage, sidewalks, medians, lanes of roads, road asphalt, cross walks, etc.) that provide a more realistic and richer 3D view when the navigation application is in the driving mode. The navigation application shows lower detailed constructs that provide a simpler 2D view when the navigation application is in the pedestrian mode.

For presenting the navigation instructions, the navigation application of some embodiments tailors the language of the navigation instructions for the driving mode and the pedestrian mode differently. For instance, a navigation instruction may recite "Turn Left at Main Street" when the navigation application is in the driving mode, while the navigation instruction may recite "Go left around the corner at Main Street" when the navigation application is in the pedestrian mode.

In some embodiments, the navigation application switches from one navigation mode to another navigation mode while the navigation application is presenting navigation instructions and map views for a route being traveled by the user. In some embodiments, the integrated application detects the current user activity (e.g., driving, walking, biking, etc.) from motion data that some detecting apparatuses collect. The detecting apparatuses include at least one of a gyroscope, an accelerometer, a magnetometer, and a global positioning system (GPS) receiver.

Based on the determined activity of the user, the integrated application of some embodiments switches from the driving mode to the pedestrian mode, and vice versa. For instance, the integrated application of some embodiments switches from the driving mode to the pedestrian mode when the navigation application determines that the current user activity is walking based on the motion data. In some embodiments, the integrated application automatically switches from one navigation mode to another based on the detected user activity. In other embodiments, the integrated application prompts the user for an approval or a disapproval of the switch between two different navigation modes.

In some embodiments, the navigation application provides the user with several different notifications for an incoming turn on a route. When the navigation application is running in the device and the device's screen is not turned off, the navigation application of some embodiments presents several different notifications to the user based on the distance from the current position of the device in the map to the location for the turn.

The navigation application of some embodiments presents a first audible notification to the user when the distance between the current position of the device and the location for the upcoming turn becomes smaller than a first threshold distance. The navigation application presents a second audible notification to the user as the distance turns smaller than a second threshold distance, which is smaller than the first threshold distance. The navigation application presents a third audible notification to the user when the user reaches the location for the turn.

The first audible notification that the navigation application of some embodiments uses is a recitation of the navigation instruction for the upcoming turn. The navigation application uses a short audible sound as the second audible notification. The navigation application uses a recitation of the navigation instruction at the location for the turn as the third audible notification.

In some embodiments, the navigation application uses different second audible notifications for the right turns and left turns. For instance, the navigation application of some embodiments uses a first short audible sound (e.g., "ding") when the upcoming turn is a left turn. The navigation application of some embodiments uses a second short audible sound (e.g., "dong") when the upcoming turn is a right turn.

In some embodiments, the navigation application presents non-audiovisual notifications (e.g., vibrations) to remind the user of an upcoming turn on a route being navigated by the user when the navigation application is running in the background of the device (e.g., when the device does not the user interface (UI) pages of the navigation application) or when the device's screen is turned off. In some such embodiments, the navigation application provides different non-audiovisual notifications for the right turns and left turns. For instance, the navigation application of some embodiments uses a first combination of long and short vibrations (e.g., short-long-short vibrations) when the upcoming turn is a left turn. The navigation application of some embodiments uses a second combination of long and short vibrations (e.g., long-short-long vibrations) when the upcoming turn is a right turn. In some embodiments, the integrated application combines the non-audiovisual notifications with the audible notifications to remind the user of the upcoming turn.

In some embodiments, the navigation application allows the user to select an audio output apparatus through which to present the audible notifications to the user. In some embodiments, the navigation application dynamically prepares a list of audio output apparatuses that are currently connected (wirelessly or through a wire) to the device on which the navigation application executes. The navigation application presents to the user this list of audio output apparatuses from which the user may select and presents the audible notifications through the selected audio output apparatus.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
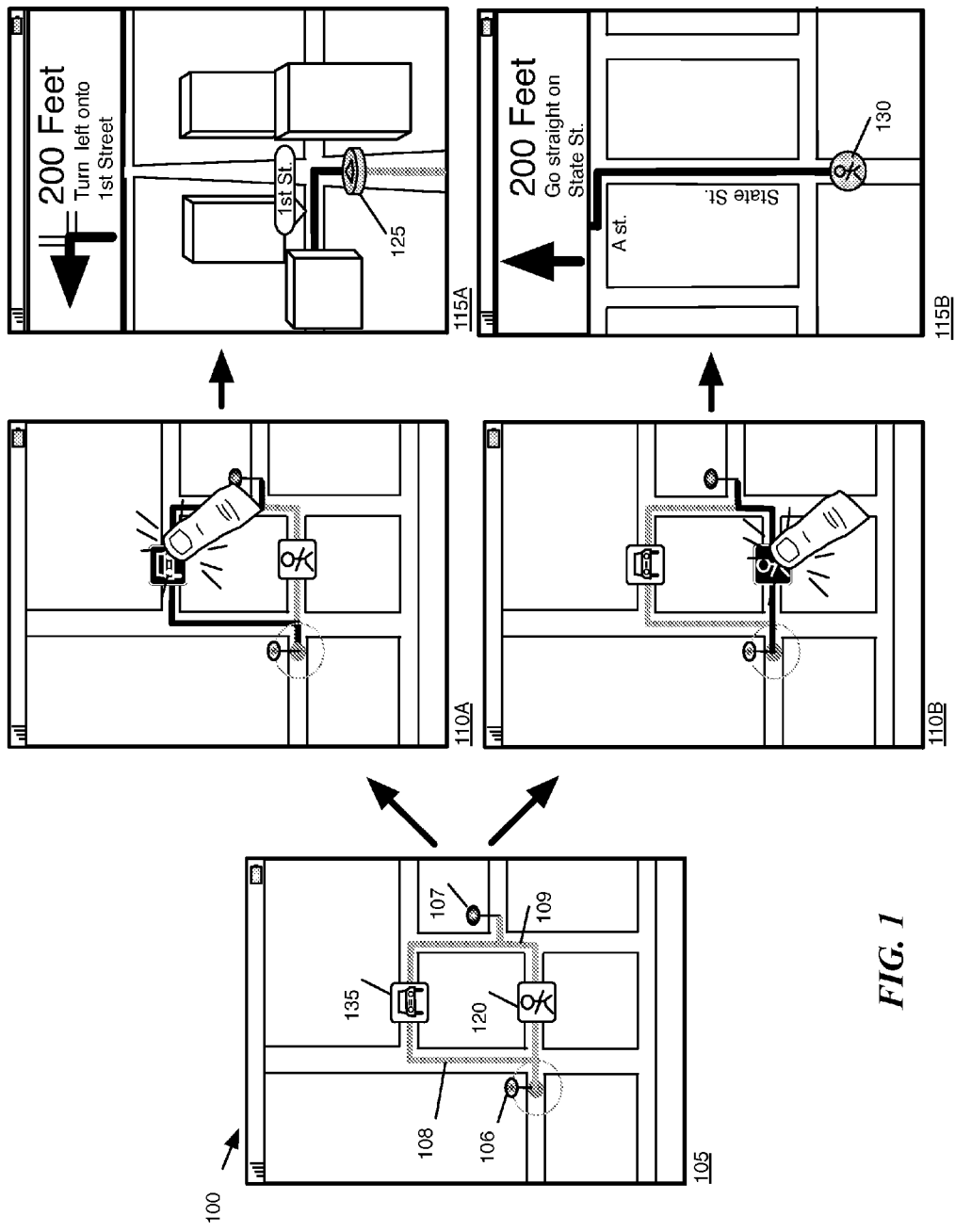
FIG. 1 illustrates an example of two different navigation modes, the driving mode and the pedestrian mode.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The navigation application of some embodiments is part of an integrated mapping application that includes several useful modalities, including location browsing, map searching, route identifying and route navigating operations. This integrated application (referred to as the mapping application, the navigation application, or the integrated application hereinafter) in some embodiments is defined to be executed by a device that has a touch-sensitive screen and/or a near-touch sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows® operating system, etc.), tablet computers (e.g., iPad® sold by Apple Inc., tablets operating the Android® operating system, tablets operating the Windows® operating system, etc.), etc.

The navigation application of some embodiments provides multiple different views during navigation and smooth transitions between these views. In some embodiments, examples of such views include a two-dimensional (2D) turn-by-turn view, a three-dimensional (3D) turn-by-turn view, and an overall route view. The application in some embodiments generates the turn-by-turn views from a perspective rendering position within a 3D navigation scene that the device renders. This perspective rendering position in some embodiments is adjustable and can be viewed as a virtual camera that can capture the 3D navigation scene from a variety of different perspectives (e.g., from a variety of different positions and orientations). Accordingly, in some embodiments, the turn-by-turn navigation is an animated rendering of navigated route that is rendered from the vantage point of a virtual camera that traverses along the direction of the route based on the traversal direction and speed of the user carrying the device, which in some embodiments is captured by directional data (e.g., GPS data, triangulated cell-tower data, etc.) associated with the device.

The navigation application of some embodiments has definitions of different navigation modes in which the navigation application differently presents turn-by-turn navigation instructions for a given route between a starting location and an ending location. In some embodiments, the navigation modes are defined based on the ways in which the navigation application presents the navigation instructions and the map views that are used to show the navigation instructions. In some such embodiments, the navigation modes are defined based on the means of transportation (also referred to as the modes of transportation) that are used for traveling the route. A navigation instruction is also referred to as a maneuvering instruction as it guides the user how to maneuver (e.g., make a turn) at a junction or a juncture of roads on a route.

FIG. 1 illustrates a device 100 that executes an integrated application of some embodiments of the invention. Specifically, this figure illustrates an example of two different navigation modes, the driving mode and the pedestrian mode. In the different navigation modes, the integrated application of some embodiments differently presents the navigation instructions and the map views that are used to present the navigation instructions of a route.

This figure shows three stages of a user's interaction with the integrated application. Specifically, this figure shows that the integrated application provides a driving route 108 and a walking route 109 between a starting location and an ending location. The stages 105, 110A and 115A show user's interaction with the integrated application when a route for driving is selected. The stages 105, 110B and 115B show user's interaction with the integrated application when a route for walking is selected.

The first stage 105 shows the device 100 after the user has specified or selected the starting location and the ending location. In some embodiments, the integrated application presents different routes for different modes or means of transportation (e.g., driving, walking, biking, etc.) for a given pair of starting and ending locations and provides turn-by-turn navigation instructions for a selected route. The integrated application of some embodiments provides several different ways for the user to specify or select the starting and ending locations on a map. Some of these different ways are described further below.

At the stage 105, the integrated application shows a map with the two routes 108 and 109 from the starting location to the ending location represented by two pins 106 and 107, respectively. In some embodiments, the integrated application displays different routes for different means of transportation in different visual representations. For instance, the integrated application uses different colors or brightness to display the routes for the different means of transportation. In the example of this figure, the driving route 108 is illustrated in dark grey while the walking route 109 is illustrated in light grey to show these two routes are for two different means of transportation.

In some embodiments, the integrated application displays additional visual cues for distinguishing between the routes for different means of transportation. For instance, the integrated application places on the route an icon that represents the means of transportation for which the route is displayed. As shown by the stage 105, an icon 135 bearing a drawing of a car is placed over the route 108 to indicate that the means of transportation for the route 108 is driving. Another icon 120 bearing a stick figure of a walking person is placed over the route 109 to indicate that the means of transportation for the route 109 is walking.

The second stages 110A and 110B show user's selection of the driving route 108 and the walking route 109, respectively. In some embodiments, the integrated application makes the displayed routes selectable. Alternatively or conjunctively, the navigation application of some embodiments makes the icon placed over a route selectable so that the user can select the route by selecting the icon. Once a route is selected, the integrated application changes the appearance of the route so that the selected route is visually distinguished from the route(s) that are not selected. In this example, the integrated application changes the color for a selected route from the route's original color to solid black. The second stage 110A shows that the integrated application changes the appearance of the selected route 108, while the second stage 110B shows that the integrated application changed the appearance of the selected route 109.

The third stages 115A and 115B show that the integrated application has entered a navigation mode in response to the selection of a route. As mentioned above, the integrated application of some embodiments presents the navigation instructions differently in different navigation modes. In this example, the third stage 115A shows that the navigation mode in which the integrated application provides the navigation instructions is the driving mode. On the other hand, the third stage 115B shows that the navigation mode in which the integrated application provides the navigation instructions is the pedestrian mode.

Different embodiments provide the navigation instructions differently in the driving mode and the pedestrian mode. For instance, the integrated application of some embodiments provides the navigation instructions in a three-dimensional (3D) view when the integrated application is in the driving mode. When in the pedestrian mode, the integrated application provides the navigation instructions in a two-dimensional (2D) view.

In some embodiments, the integrated application presents the navigation instructions in the same dimensional view in both the driving mode and the pedestrian mode. However, the integrated application of these embodiments shows different levels of details for the driving mode and the pedestrian mode. For instance, the integrated application of some embodiments shows the route with higher detailed constructs (e.g., trees, foliage, sidewalks, medians, lanes of roads, road asphalt, cross walks, etc.) that provide a more realistic and richer 3D view when the integrated application is in the driving mode. The integrated application shows lower detailed constructs that provide a simpler 3D view when the integrated application is in the pedestrian mode. In other embodiments, the integrated application shows more details in the pedestrian mode than in the driving mode.

In some embodiments, the integrated application provides the navigation instructions at the beginning of the route in a 3D view for the driving mode by default. The integrated application of these embodiments provides the navigation instructions at the beginning of the route in a 2D view for the pedestrian mode by default but changes or allows the user to change the view into a 3D view.

The integrated application uses different navigation location indicators (e.g., pucks 125 and 130) in the driving mode and the pedestrian mode. As shown in the third stages 115A and 115B, the puck 125 has an arrow pointing to the direction of driving while the puck 130 shows a stick figure of a person. Moreover, the puck 125 is rendered in 3D while the puck 270 is in 2D as shown.

Furthermore, the integrated application displays instruction signs with different appearances and contents. For instance, the background color for the sign displayed in the driving mode is green, while the background color is white for the pedestrian mode. The language of a navigation instruction may also be tailored for different navigation modes. For instance, the sign may say "Turn left at Main Street" when the integrated application is in the driving mode, while the sign may say "Go left around the corner at Main Street" when the integrated application is in the pedestrian mode.

As mentioned above, in some embodiments, the navigation modes are defined based on different means of transportation. Alternatively or conjunctively, in some embodiments, the navigation modes are defined based on the ways in which the integration application presents the navigation instructions and the map views. For instance, the navigation modes of the integrated application of some embodiments include a daytime mode, a dusk-time mode, and a nighttime mode. In the daytime mode, the integrated application presents the navigation instructions and the map views in a way that is suitable for a daytime driving. More specifically, in the daytime mode, the integrated application of some embodiments uses bright colors for rendering the map views, which include the background, the buildings, the roads, etc. and uses dark colors for the signs that display navigation instructions.

The integrated application presents the navigation instructions and the map views suitably for dusk-time and nighttime drives as well. For instance, in the dusk-time mode, the integrated application of some embodiments uses colors that are darker than the colors used in the daytime mode for rendering the map views. The integrated application in the dusk-time mode uses colors that are brighter than the colors used in the daytime for rendering the signs in some embodiments. Likewise, the integrated application in the nighttime mode uses colors that are darker than the colors used in the dusk-time mode for rendering the map views in some embodiments. The integrated application in the nighttime mode uses colors that are brighter than the colors used in the dusk-time mode for rendering the signs in some embodiments.

Furthermore, the integrated application of some embodiments displays different amount of information for different navigation modes. For instance, the integrated application may display more points of interests (POIs) or more street names when the integrated application is in the pedestrian mode than in the driving mode because the user is capable of handling more information while walking than while the user is driving.

Figure 2:
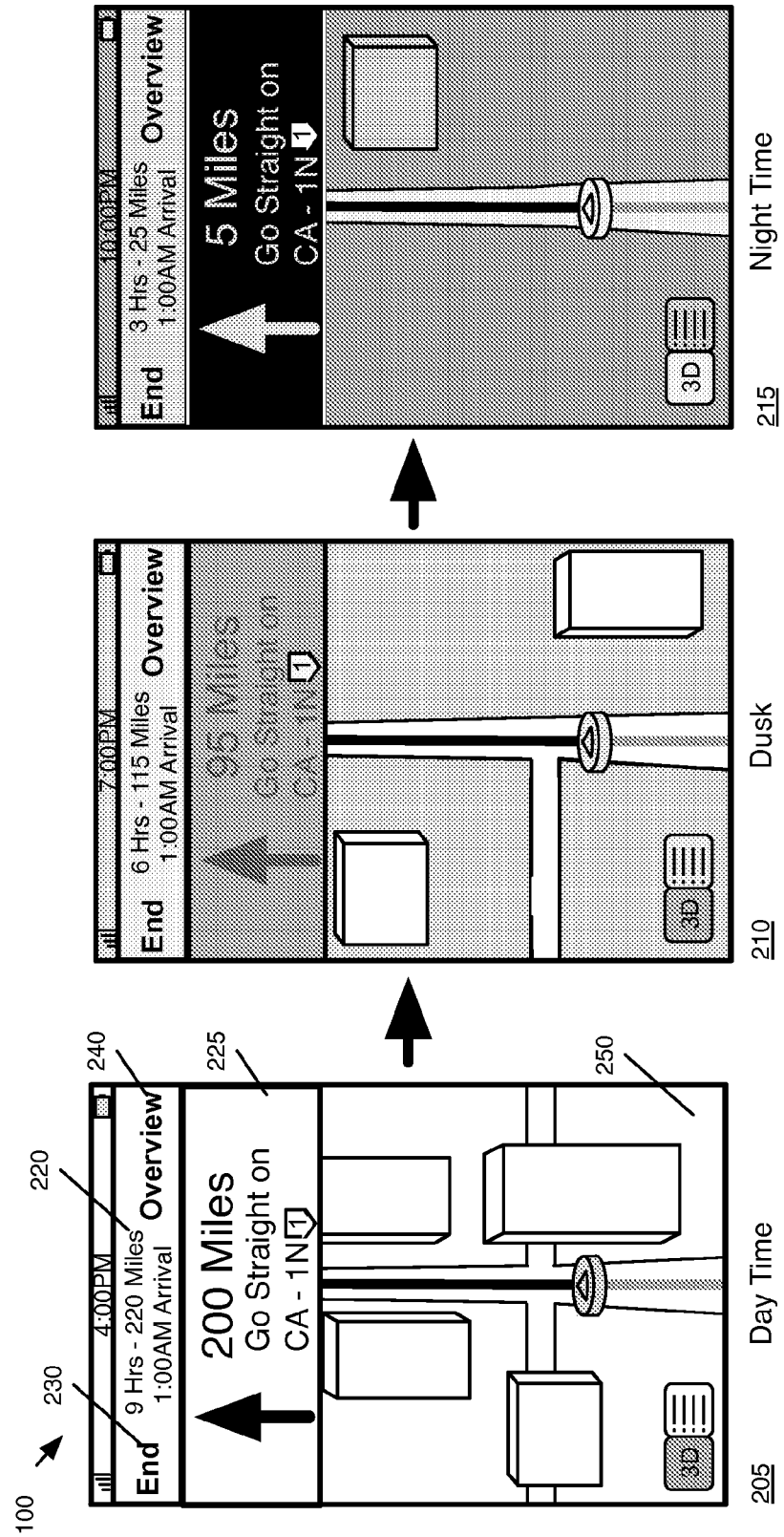
FIG. 2 illustrates the integrated application of some embodiments that automatically switches from one navigation mode to another navigation mode.

FIG. 2 illustrates an example of the integrated application that automatically switches from one navigation mode to another based on the information gathered at the device on which the integrated application executes. Specifically, this figure shows in terms of three stages 205, 210 and 215 that the integrated application automatically switches from the daytime mode to the dusk-time mode and then to the nighttime mode. This figure shows a device 200 on which the integrated application runs.

The integrated application has several user interface (UI) items for a navigation mode, including a top bar 220, a sign 225, and a display area 250. In some embodiments, the top bar 220 is for displaying information about the route being navigated. For instance, the top bar 220 displays an estimated time of arrival (ETA), a time remaining for the travel, a distance to the destination of the route, etc. The top bar 220 also includes an end control 230 and an overview control 240. The end control 230 of some embodiments is for ending the navigation mode by stopping displaying the navigation instructions. The overview control 240 of some embodiments is for showing the entire route in the map view.

The sign 225 is for displaying a navigation instruction for the current position of the device on the route being navigated. In some embodiments, the sign 225 has an appearance of a road sign. The sign 225 identifies the distance from the current position of the device to the next maneuver juncture in the navigated route and some other pertinent information. The sign 225 in some embodiments is for overlaying the map view displayed in the display area 250 and occupies a portion of the map view below the top bar 220. The display area 250 is for displaying a map view when the integrated application is in a navigation mode.

In some embodiments, the integrated application switches from one navigation mode to another based on the information gathered at the device. As a simplified example, the integrated application may use the current brightness information and switches the navigation mode between the daytime mode, the dusk-time mode, and the nighttime mode. The integrated application predetermines ranges of brightness levels that define the daytime, the dusk-time, and the nighttime of the day and automatically switches between these navigation modes based on the current brightness level to which the device is exposed.

In some embodiments, a light sensor collects the brightness information. In some embodiments, the light sensor is of the device so that the device itself gathers the brightness information using the light sensor. In some cases, the device may not have its own light sensor and the brightness information is supplied to the device and to the integrated application from other sources (e.g., an automobile connected to the device or a server supplying such information to the device).

The integrated application may also use the time information to determine whether the current time falls in the daytime, the dusk-time, or the nighttime of a day. In some embodiments, the integrated application determines uses the time information to supplement the brightness information in deciding whether to switch between navigation modes. For instance, in some embodiments, when the brightness information gathered indicates it is dark enough to be considered as the dusk time but the time information indicates that it is the daytime, the integrated application would not switch to the dusk-time mode. In some embodiments, the integrated application obtains the information indicating whether the current time at a particular location is the daytime, the dusk-time, or the nighttime from a remote server serving up such information.

The first stage 205 illustrates that the integrated application is in a navigation mode, displaying a navigation instruction for the current position of the device on the route being navigated. Specifically, the user of the device is driving during the daytime (e.g., at 4:00 PM as shown) of a day and thus the integrated application is in the daytime mode. The integrated application is displaying the sign 225 and the map view for the location according to the definition of the daytime mode. As shown in the first stage 205, the sign 225 is rendered in grey and the background of the map view is rendered in white. The second stage 210 illustrates that the user is driving during the dusk time (e.g., at 7:00 PM as shown) as the user makes a progress towards the destination of the route. The integrated application has automatically switched from the daytime mode to the dusk-time mode using the brightness information gathered at the device 100. As shown, the sign 225 is now rendered in light grey, which is brighter than grey used to render the sign 225 in the daytime mode at the previous stage 205. The background of the map view at the second stage 210 is rendered in grey, which is darker than white used to render the background of the map view in the daytime mode at the previous stage 205.

The third stage 215 illustrates that the user is driving during the nighttime (e.g., 10:00 PM as shown) of a day as the user makes more progress towards the destination of the route. The integrated application has automatically switched from the dusk-time mode to the nighttime mode using the brightness information gathered at the device 100. As shown, the sign 225 is now rendered in white, which is brighter than light grey used to render the sign 225 in the dusk-time mode at the previous stage 210. The background of the map view at the third stage 215 is rendered in grey, which is darker than light grey used to render the background of the map view in the dusk-time mode at the previous stage 210.

Figure 3:
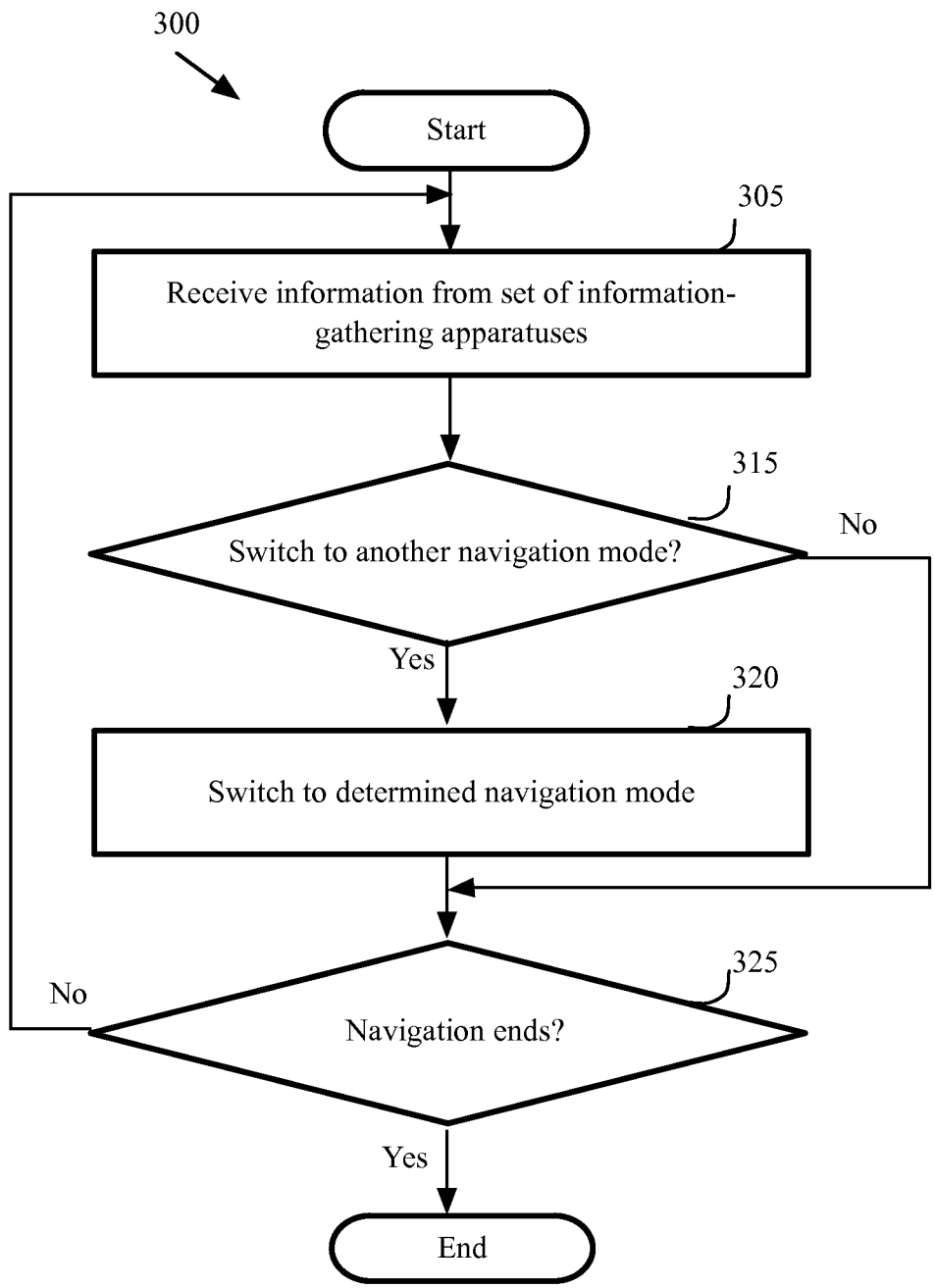
FIG. 3 conceptually illustrates a process performed by the integrated application of some embodiments.

FIG. 3 conceptually illustrates a process 300 performed by the integrated application of some embodiments. The process 300 starts when the integrated application is in a navigation mode to present navigation instructions in map views for a route that is being navigated by the user carrying the device.

The process 300 begins by receiving (at 305) information from a set of information-gathering apparatuses. In some embodiments, these apparatuses include one or more of a light sensor, a gyroscope, an accelerometer, a magnetometer, a GPS receiver and any other apparatuses (e.g., a system clock) that can collect information about the device. For instance, the process receives brightness information (e.g., light intensity) that indicates the amount of light the device receives. In some embodiments, some or all of these information-gathering apparatuses are not parts of the device. In some embodiments, the process polls the set of information-gathering apparatuses to receive the information. Alternatively or conjunctively, in some embodiments, the device is configured to receive the information passively from the set of information-gathering apparatuses that periodically supply the information to the integrated application.

Next, the process 300 determines (at 315) whether the process should switch from the current navigation mode to another navigation mode. In order to make this determination, the process analyzes the information received (at 305) from the set of information-gathering apparatuses. For instance, the process 300 determines that the user is driving when the information received from the accelerometer and/or the GPS receiver indicates that the device is moving faster than a threshold speed (e.g., five miles per hour). The process determines that the user is walking when the information indicates that the device is moving slower than the threshold speed or that the device's vertical distance with respect to the ground is fluctuating.

In some embodiments, the process records the instance in time and the location at which the user's speed goes above or falls below the threshold speed. The process measures the amount of time and the traveled distance for which the user's speed has been above or below the threshold speed. Only when the user maintains the speed above or below the threshold speed for a threshold period of time and/or a threshold distance, the process determines whether the user is driving or walking.

In some embodiments, the process factors in data confidence in determining a navigation mode. For instance, the process does not use detected values from an information-gathering apparatus if the values go beyond a normal range of values or if the apparatus fails to provide the values at predetermined regular intervals.

As another example, the process 300 analyzes the brightness information that the process received from the light sensor to determine in which of the daytime mode, the dusk-time mode and the nighttime mode to present the navigation instructions and the map views. Also, the process may supplement the brightness information with the time information that the process may receive from the system clock of the device. That is, for instance, the process of some embodiments may override a decision to present the navigation instructions and the map views in the nighttime mode if the time of a day (e.g., 10 AM) does not indicate that it is the nighttime. As another example, the process may also determine a navigation mode between the driving mode and the pedestrian mode by analyzing the motion data from one or more of a gyroscope, an accelerometer and a magnetometer as mentioned above.

As the process analyzes the data, the process compares the navigation mode that the process should be in is different from the current navigation mode. The process determines that the process should switch to another navigation mode when the current navigation is different than the navigation mode that the process should be in. The process determines that the process should not switch to the other navigation mode when the current navigation mode is not different than the navigation mode that the process should be in. Switching between different navigation modes are described in detail further below by reference to FIG. 36.

When the process 300 determines (at 315) that the process should not switch from the current navigation node to another navigation mode, the process 300 proceeds to 325, which is described further below. When the process 300 determines (at 315) that process should switch from the current navigation mode to another navigation mode, the process 300 switches (at 320) to the determined navigation mode from the current navigation mode in order to present the navigation instructions and the map views for the route according to the determined navigation mode. As mentioned above, the integrated application of some embodiments presents the navigation instructions and the map views differently for different navigation modes. In some such embodiments, the integrated application uses different style sheets that specify different attributes for different presentations of the navigation instructions and the map views. For instance, the integrated application uses different colors for the constructs in the map for different navigation modes based on the attributes defined in the style sheets for the different navigation modes.

In some cases, the process 300 does not switch to the determined navigation mode from the current navigation mode even if the determined navigation mode is different than the current navigation mode. For instance, the process 300 does not switch to the pedestrian mode and stays in the driving mode if the current position of the user on the route is not within a threshold distance from the destination of the route. More details of switching to one navigation to another based on the distance to the destination of a route are described further below by reference to FIGS. 30 and 31.

The process 300 then determines (at 325) whether the navigation of the route has ended. Different embodiments end the navigation of the route differently. For instance, in some embodiments, the integrated application ends the navigation when the integrated application receives a selection, by the user, of an end control (e.g., the end control 230 described above by reference to FIG. 2) while the route is being navigated. The integrated application may also end the navigation of the route when the user reaches the destination of the route.

When the process 300 determines (at 325) that the navigation of the route has not ended, the process 300 loops back to 305 to receive updated information from the set of information-gathering apparatuses. Otherwise, the process 300 ends.

Several detailed embodiments are described in the sections below. Section I describes the integrated application of some embodiments that have several different navigation modes. Next, Section II describes audible and non-audible notifications that the integrated application presents to the user in the pedestrian mode. Section III follows with a description of switching between different navigation modes. Section IV then describes example software architecture of an integrated application of some embodiments. Section V describes architecture of a mobile computing device of some embodiments and an electronic system that implements some embodiments of the invention. Finally, Section VI describes a map service operating environment according to some embodiments.

I. Navigation Application with Different Navigation Modes

The integrated application finds one or more routes between a starting location and an ending location of a map. In some embodiments, the integrated application finds different routes for different means of transportation. When the user navigates a route using the integrated application, the integrated application presents navigation instructions for the route in a navigation mode. The navigation mode defines a particular way of presenting the navigation instructions and the map views that are used to present the navigation instructions. This section describes finding routes and entering a particular navigation mode to present the navigation instructions and the map views.

A. Finding Routes

Figure 4:
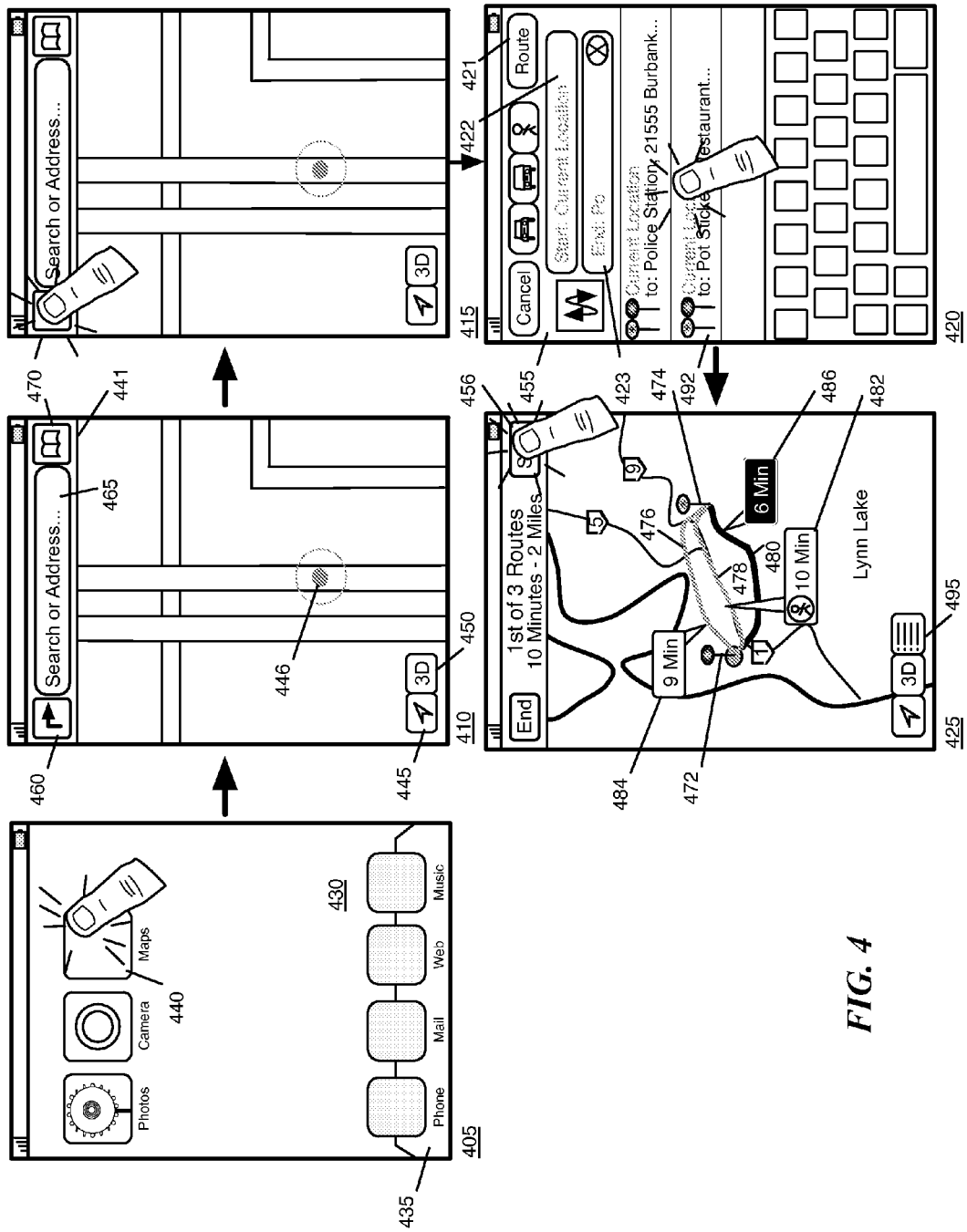
FIG. 4 illustrates displaying different routes for different means of transportation between a starting location and an ending location of a map.

FIG. 4 illustrates an example of displaying different routes for different means of transportation between a starting location and an ending location of a map. Specifically, this figure shows five stages 405-425 of interaction with the integrated application that provides different routes. The first stage 405 shows the device's UI 430, which includes several icons of several applications in a dock area 435 and on a page of the UI. One of the icons on this page is the icon 440 for the integrated application 440. The first stage 405 shows a user's selection of the integrated application through touch contact with the device's screen at the location of this application on the screen.

The second stage 410 shows the device after the integrated application has opened. As shown in this stage, the integrated application's UI has a starting page that in some embodiments displays (1) a map of the current position of the device and (2) several UI controls arranged in a top bar 441, and as floating controls. As shown in FIG. 4, the floating controls include an indicator 445, and a 3D control 450, while the top bar 441 includes a direction control 460, a search field 465, and a bookmark control 470.

In some embodiments, a user can initiate a search by tapping on the search field 465. This directs the integrated application to present an animation that (1) presents an on-screen keyboard and (2) opens a search table full of invaluable completions. After any input on the search field, the table is filled with search completions both from local sources (e.g., bookmarks, contacts, recent searches, recent route directions, etc.) and remote servers.

The bookmark control 470 (e.g., a button) allows location and routes to be bookmarked by the integrated application. The position indicator 445 allows the current position of the device to be specifically noted on the map. Once this indicator is selected, the integrated application maintains the current position (represented by a current position indicator 446) of the device in the center of the map. In some embodiments, the integrated application can also identify the direction to which the device currently points.

The 3D control 450 is a control for viewing a map or inspecting a route in three dimensions (3D). The integrated application provides the 3D control as a quick mechanism of getting into and out of a 3D view. The direction control 460 opens a direction entry page 455 through which a user can request a route to be identified between a starting location and an ending location.

The third stage 415 of FIG. 4 illustrates that the selection of the direction control 460 opens the direction entry page 455, which is shown in the fourth stage 420. The direction control is one of the three mechanisms of some embodiments through which the integrated application can be directed to identify and display a route between two locations; the two other mechanisms are (1) a control in an information banner that is displayed for a selected item in the map, and (2) recent routes identified by the device that are displayed in the search field 465. An information banner is described further below.

The fourth stage 420 shows that the direction entry page 455 includes starting and ending fields for providing starting and ending locations for a route, and a table that lists recent destinations for which the integrated application has previously provided routes to the user. Other controls on this page are controls for starting a route, for reversing the order of the start and end locations, for canceling the direction request, and for selecting walking, auto, or public transit routes.

The fourth stage 420 also illustrates the user selecting one of the recent directions that was auto-populated in the table 492. In response to the selection, the integrated application of some embodiments sends the starting and ending locations information to a remote server to obtain the routes. The user may type in the starting and ending locations in starting and ending location fields 422 and 423 and select a route generation control 421. In response to the selection of the route generation control 421, the integrated application of some embodiments sends the starting and ending locations information to a remote server to obtain the routes. The remote server computes walking routes and/or driving routes and returns the computed routes back to the integration application. However, in other embodiments, the integrated application computes the routes locally at the device.

At the fifth stage 425, the integrated application shows a map with the three routes 476, 478 and 480 from the starting location to the ending location, which are represented by two pins 472 and 474, respectively. The routes 476 and 480 are driving routes and the route 478 is a walking route. The fifth stage 425 shows a list control 495, which is another floating control. The selection of the list control 495 at this stage will cause the integrated application to display the set of navigation instructions for a selected route in a list format.

In some embodiments, the integrated application displays a banner for a route. The banner displays information about the route in order to aid the user to make a selection. For instance, the banner of some embodiments indicates the estimated travel time to the ending location from the starting location of the route. In addition, the banner may indicate the means of transportation for the route. For instance, the banner may display an icon representing the means of transportation. As shown at the first stage 105, the integrated application displays an icon on a banner 482 for the route 478 to indicate that the route 478 is a walking route. The banner 482 also indicates that the estimated travel time to the ending location is ten minutes. For the driving routes 476 and 480, the integrated application of some embodiments does not display an icon in banners 484 and 486 as shown because the default means of transportation is set to driving in this example and the integrated application does not display an icon for the default means of transportation. The integrated application still displays the estimated travel time, nine and six minutes in this example, for the driving routes 476 and 480, respectively.

In some embodiments, the integrated application makes a displayed route selectable. Alternatively or conjunctively, the navigation makes a banner for a route selectable so that the user can select the route by selecting the banner. In some embodiments, the integrated application selects a route with a least amount of estimated travel time as a default route.

As mentioned above, the integrated application changes the appearance of the route so that the selected route is visually distinguished from the route(s) not selected. The integrated application also changes the appearance of the banner that is attached to the selected route. In this example, the banner 486 for the selected route 480 is rendered in black. The route 480 is selected by default in this example for being the fastest route of the three routes. This stage also shows in the top bar 441 some information about the selected route. This bar includes start and end controls. A start control is shown to be selected in the fifth stage 425. The selection of the start control directs the integrated application to enter a navigation mode in some embodiments.

B. Entering Different Navigation Modes

Figure 5:
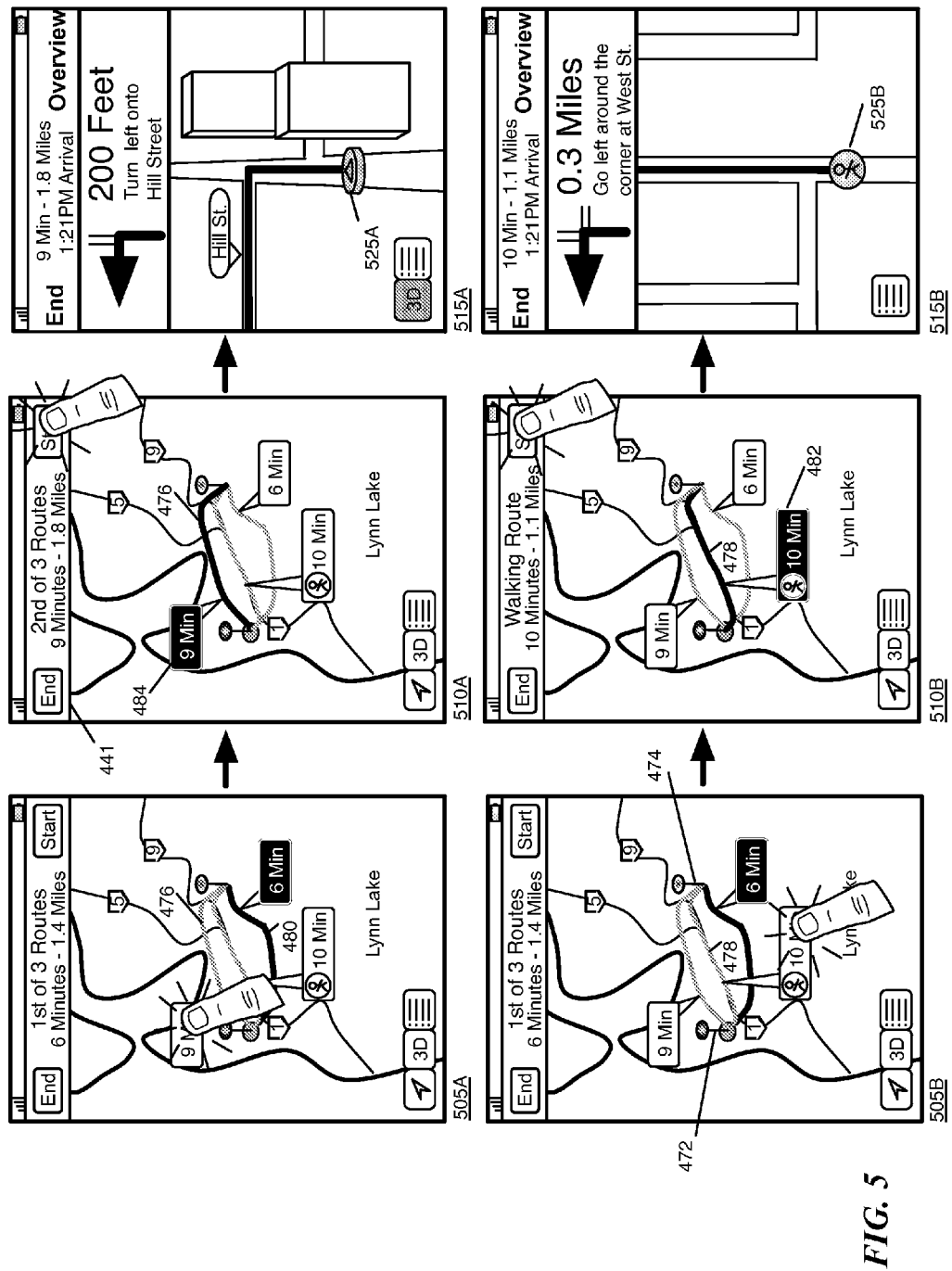
FIG. 5 illustrates entering a navigation mode by the integrated application of some embodiments when a route is selected to navigate.

FIG. 5 illustrates an example of entering a navigation mode by the integrated application of some embodiments when a route is selected to navigate. Specifically, the top half of this figure shows in terms of three stages 505A, 510A and 515A that the integrated application goes into the driving mode when a driving route is selected. The bottom half of this figure shows in terms of three stages 505B, 510B and 515B that the integrated application goes into the pedestrian mode when a walking route is selected.

The first stages 505A and 505B are similar to the fifth stage 425 of FIG. 4 in that the first stages 505A and 505B shows the three routes 476, 478 and 480 between the two pins 472 and 474 that represent the starting and ending locations, respectively. The route 480 is selected by default by the integrated application in this example. The first stage 505A shows that the user selects the driving route 476 by selecting the banner for the route 476, while the first stage 505B shows that the user selects the walking route 478 by selecting the banner for the route 476.

The second stages 510A and 510B show that the integrated application changes the appearance of the selected routes and the banners for the selected routes. At the second stage 510A, the selected route 476 and the banner 484 for the selected route 476 are rendered in black. At the second stage 510B, the selected route 478 and the banner 482 for the selected route 478 are rendered in black. The second stages 510A and 510B also show in the top bar 441 some information about the selected route, including the time and distance remaining to arrive at the destination. The user selects the start control to direct the integrated application to enter a navigation mode and present the navigation instructions for the selected route.

The third stages 515A and 515B show that the integrated application has entered a navigation mode in response to the selection of the start control in the second stages 510A and 510B. The third stage 515A in the top half of the figure shows that the navigation mode in which the integrated application provides the navigation instructions is the driving mode. On the other hand, the third stage 515B in the bottom half of the figure shows that the navigation mode in which the integrated application provides the navigation instructions is the pedestrian mode.

As mentioned above, different embodiments provide the navigation instructions differently in the driving mode and the pedestrian mode. In this example, the integrated application presents the map view in 3D when the integrated application is in the driving mode as shown by the third stage 515A in the top half of the figure. The integrated application presents the map view in 2D when the integrated application is in the pedestrian mode as shown by the third stage 515B in the bottom half of the figure. The integrated application of some embodiments thus does not show the 3D control 450 in the pedestrian mode as shown by the third stage 515B.

Also as shown, the integrated application uses different navigation location indicators (e.g., pucks 525A and 525B) in the driving mode and the pedestrian mode. Moreover, the integrated application tailors the navigation instructions for different means of transportation. As shown in third stage 515A in the top half of the figure, the navigation instruction reads "Turn left onto" a street in the driving mode, while the navigation instruction reads "Go left around the corner" to a street in the pedestrian mode as shown in the third stage 515B in the bottom half of the figure.

In some embodiments, the integrated application does not render some of the constructs in the map view in 3D in the driving mode. For instance, the integrated application of some embodiments may render the buildings shown at the stage 515A flat. As a result, the map view in these embodiments displays the map view at a perspective angle.

The integrated application re-computes a route to a destination location from the current position of the user when the user deviates from the route being navigated. In some embodiments, the integrated application is more forgiving in terms of the amount of the time of the deviation and the deviated distance from the route when the integrated application is in the pedestrian mode than when the integrated application is in the driving mode. That is, the integrated application allows the user to deviate from the route for a longer period of time and for a longer distance from the route before re-routing to the destination location.

Figure 6:
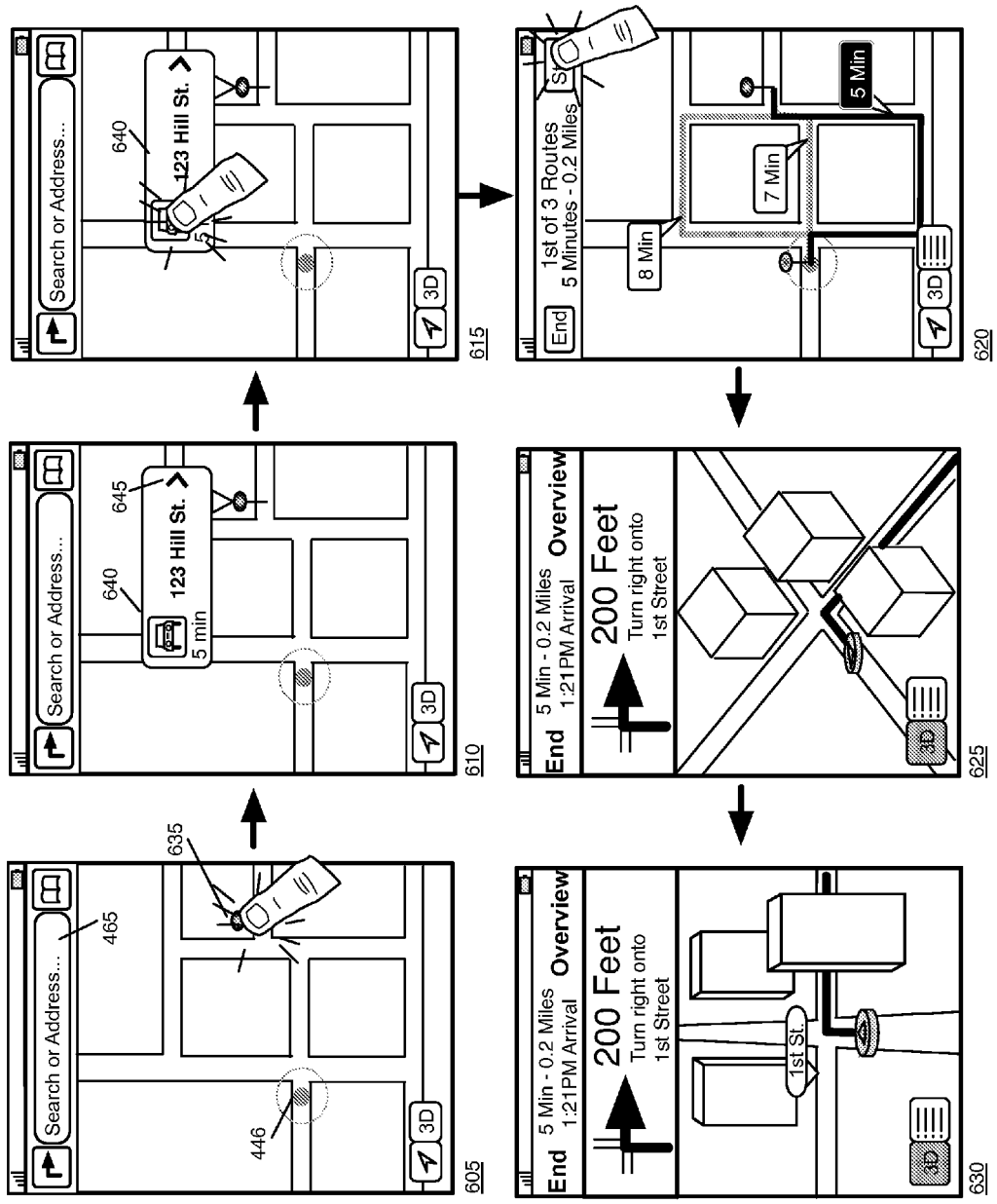
FIG. 6 illustrates entering the driving mode by the integrated application of some embodiments.

FIG. 6 illustrates another example of entering the driving mode by the integrated application of some embodiments over six stages 605-630. Specifically, this figure shows one of the several different ways of finding routes. This figure also shows that the integrated application presents a cinematic transition to the beginning of a selected route as the integrated application enters the driving mode.

The first stage 605 shows that the user selects a pin 635 that represents a location in the map displayed by the integrated application. The integrated application of some embodiments displays a number of pins on different locations of the map as a result of running a search on the map. A current position indicator 446 indicates the current position of the device on which the integrated application executes. At the first stage 605, the user selects the pin 635.

The second stage 610 shows that the integrated application displays an informational banner 640 for the location in the map represented by the pin 635, in response to the selection of the pin 635 at the previous stage 605. In some embodiments, the integrated application displays this informational banner for the pin in response to a user's selection of the pin. In other embodiments, the integrated application displays an informational banner without requiring a user's selection of the pin. That is, in these embodiments, the integrated application displays the informational banner along with the pin as a result of running a search.

Different embodiments display different information in an informational banner for a pin. Some of the information that the integrated application shows in the informational banner includes (1) a name associated with the location (e.g., a street address, a business name, etc.), (2) an estimated amount of time to arrive at the location from the current position of the device, (3) a selectable icon representing means of transportation to arrive at the location. In some embodiments, the integrated application also displays a selectable UI item (e.g., a UI item 645), which causes the integrated application to launch another UI page showing more information about the location. As shown in the second stage 610, the informational banner 640 includes the street address of the location, a car icon, an estimated amount of time to arrive at the location by driving from the current position of the device represented by the current position indicator 446.

The third stage 615 shows user's selection of the car icon in the informational banner 640. In response to the selection, the integrated application of some embodiments sends the information about the current position of the device and the location to a remote server to obtain the routes. The remote server computes walking routes and/or driving routes and returns the computed routes back to the integration application. However, in other embodiments, the integrated application computes the routes locally at the device.

The fourth stage 620 shows that the integrated application displays three different driving routes that will take five, seven and eight minutes to arrive at the destination. The integrated application places another pin on the current position of the device in the map to indicate that the current position is the starting position of these routes. The integrated application has also selected the route that takes five minutes to arrive at the destination, by default. The fourth stage 620 also shows user's selection of the start control to direct the integrated application to enter a navigation mode. In some embodiments, the integrated application can be configured to show only driving routes. The three routes that the integrated application displays at this stage 615 are driving routes. Therefore, the integrated application enters the driving mode for the selected route, in response to the user's selection of the start control.

The fifth stage 625 shows that the integrated application starts making a cinematic transition from a 2D map view to a 3D map view. In some embodiments, the integrated application generates the 3D view of the map by rendering the map view from a particular position in the 3D scene that can be conceptually thought of as the position of a virtual camera that is capturing the map view. As shown at the fourth through sixth stages 620-630, some embodiments use a cinematic transition from the 2D map view into the 3D map view. The integrated application begins from its current state (shown at the stage 620) and transitions smoothly from the first virtual camera view to the new virtual camera view that is more zoomed in and pointing in the direction of the start of the route (as shown at the stage 630). In doing so, the virtual camera may perform a combination of translation, zoom, and rotation operations in order to reach the start of the route for navigation. As shown in these stages, the virtual camera moves and rotates into its eventual location behind the navigation location indicator (i.e., the puck) shown in the sixth stage 630.

Figure 7:
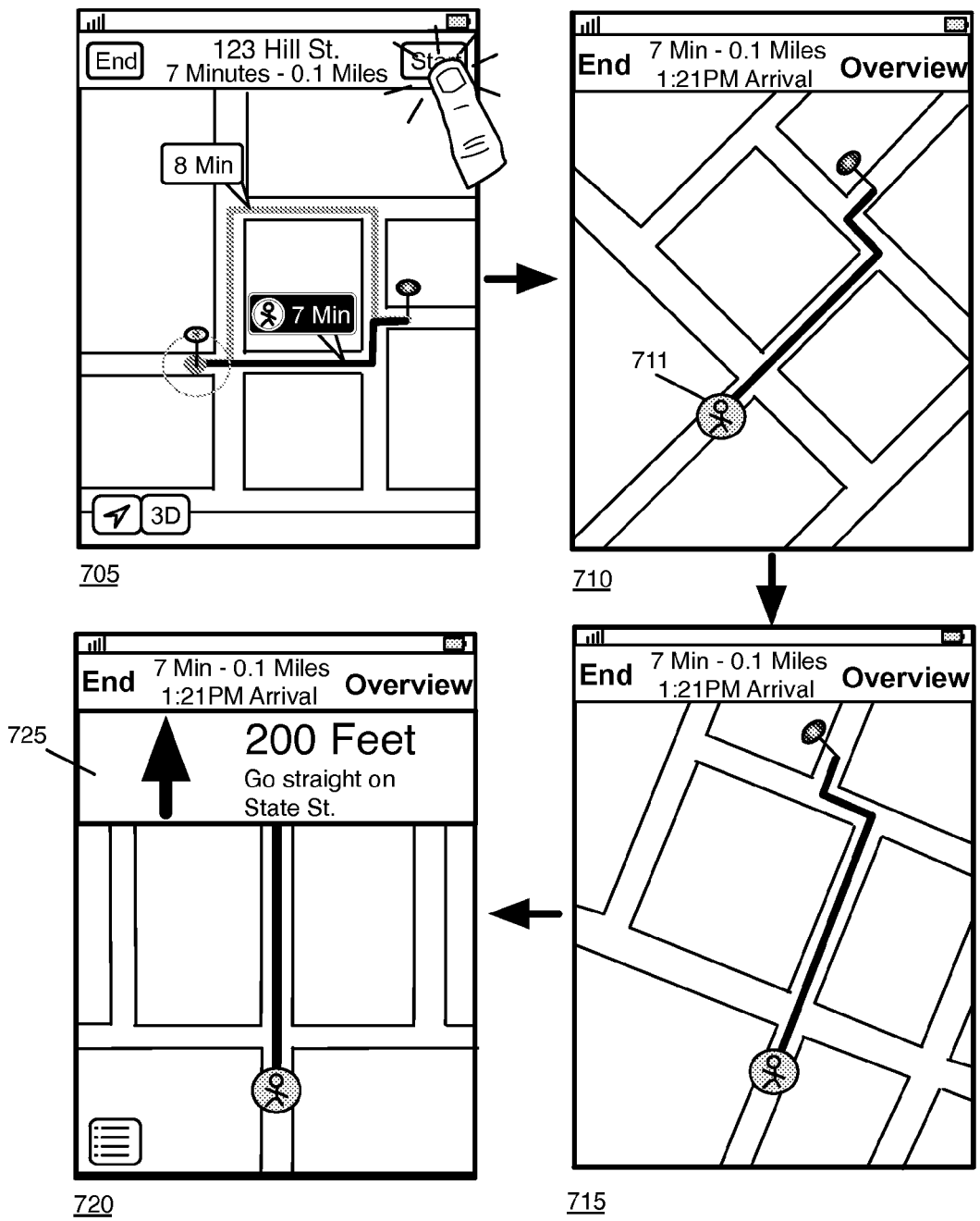
FIG. 7 illustrates entering the pedestrian mode by the integrated application of some embodiments.

FIG. 7 illustrates an example of entering the pedestrian mode by the integrated application of some embodiments over four stages 705-720. Specifically, this figure shows that the integrated application presents a cinematic transition to the beginning of a selected route as the integrated application enters the pedestrian mode.

The first stage 705 shows that the integrated application provided two routes between a starting location and an ending location in the map. The user has selected the walking route, which takes seven minutes to walk to the destination location. The user also selects the start control to direct the integrated application to enter a navigation mode to show the navigation instructions for the route.

The second, third and fourth stages 710-720 show that the integrated application performs a cinematic transition to animate the map view to the start of the route. As mentioned above, the map view is in 2D when the navigation mode is the pedestrian mode in some embodiments. The second stage 710 shows that the integrated application keeps the map view in 2D from the previous stage 705 but has rotated counterclockwise and zoomed in the map view from the map view shown at the previous stage 705. At the second stage 710, the integrated application has rotated the map view even more. However, the integrated application of some embodiments does not rotate a puck 711 so that the stick figure of a walking person displayed on the puck is always in the upright position.

The third stage 715 shows that the integrated application has rotated the map view such that the direction of travel points to the top of the screen of the device. The integrated application has also displayed a sign 725 to display the first navigation instruction. This figure shows that the map view stays in 2D for the pedestrian mode in some embodiments. However, the integrated application of other embodiments may perform a 2D map view to 3D map view cinematic transition for the pedestrian mode, like FIG. 6 showed above for the driving mode.

C. Finding Walking Routes and Entering Pedestrian Mode

Figure 8:
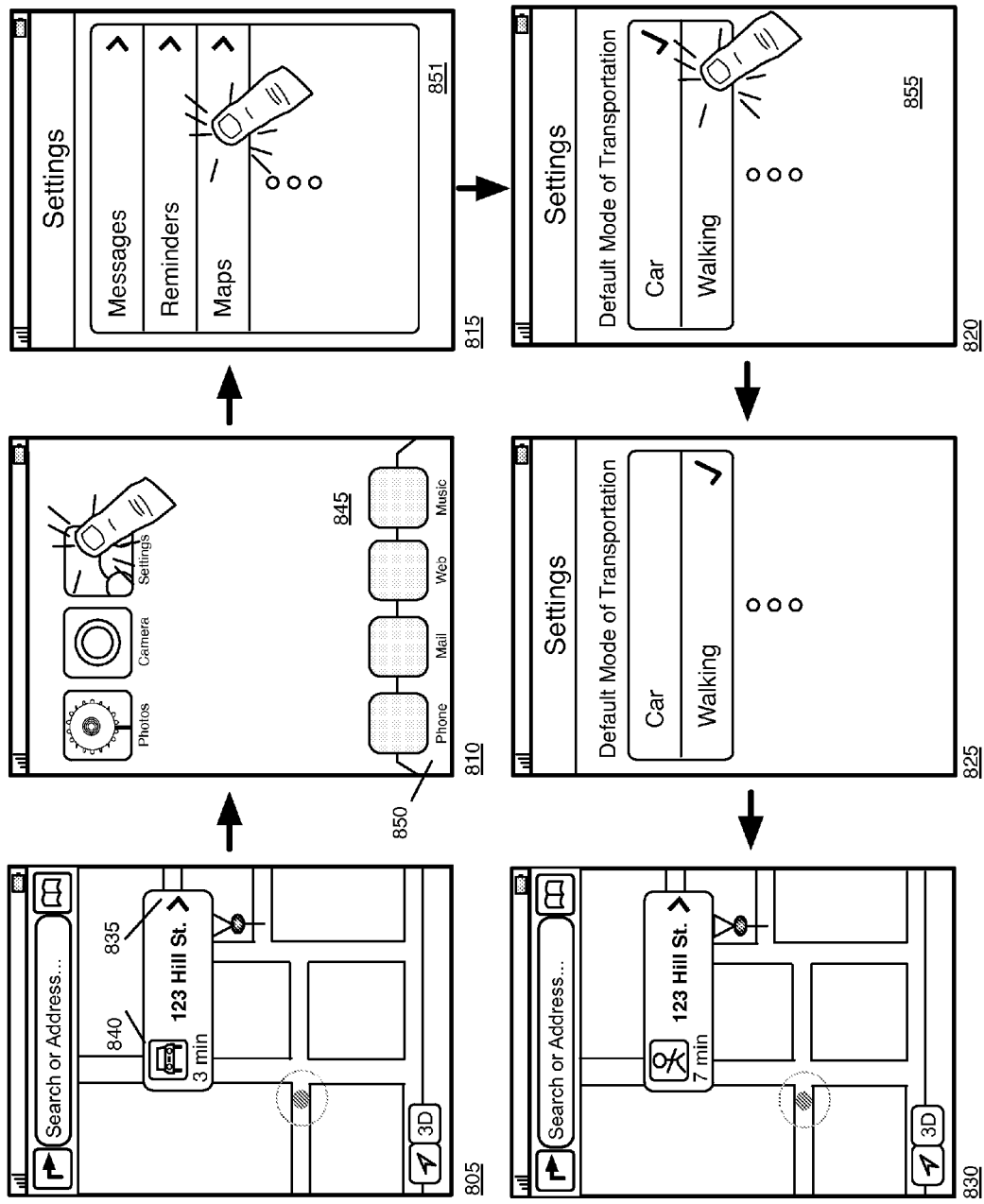
FIG. 8 illustrates an example of changing the default means of transportation.

FIG. 8 illustrates an example of changing the default means of transportation.

Specifically, this figure shows in terms of six stages 805-830 that the integrated application of some embodiments changes the default means of transportation from driving to walking. In some embodiments, the integrated application tailors the presentation of the routes for the default means of transportation.

The first stage 805 shows that the integrated application displays an informational banner 835 for a location in the map. The default means of transportation for which the integrated application presents the routes is driving at this stage. The informational banner 835 therefore displays the car icon and indicates that the estimated amount of time to arrive at the location by car from the current position of the device is three minutes.

The second stage 810 shows the device's UI 845, which includes several icons of several applications in a dock area 850 and on a page of the UI. The device provides several different ways for the user to arrive at the UI 845. For instance, the device shows the UI 845 in response to the user's selection of a home button (not shown). The home button causes a UI page of an application being run by the device and shows the UI 845 in some embodiments. The second stage 805 shows a user's selection of an application that allows the user to modify the settings of the device.

The third stage 815 shows an example UI page 851, which the device displays in response to the selection of the settings application at the previous stage 810. In some embodiments, the UI page 851 lists several applications of the device for which the user can change the settings. In this example, the UI page 851 includes "Maps" which in some embodiments represents the integrated application. At the third stage 815, the user selects the integrated application by e.g., tapping on "Maps."

The fourth stage 820 shows that the device has displayed another UI page 855 in response to the selection of the integrated application at the previous stage 815. The UI page 855 shows that the current default means of transportation is driving as indicated by a check mark for "Car." At the fourth stage, 820, the user selects "Walking" in order to change the default means of transportation from driving to walking. The fifth stage 825 shows that the default means of transportation has been changed to walking as indicated by a check mark for "Walking." This figure does not show that the navigation closes the settings application for the simplicity of illustration and description.

The sixth stage 830 shows that the device has switched back to run the integrated application in the foreground again. The informational banner 835 now displays the walking icon and indicates that the estimated amount of time to arrive at the location by walking from the current position of the device is seven minutes.

Figure 9:
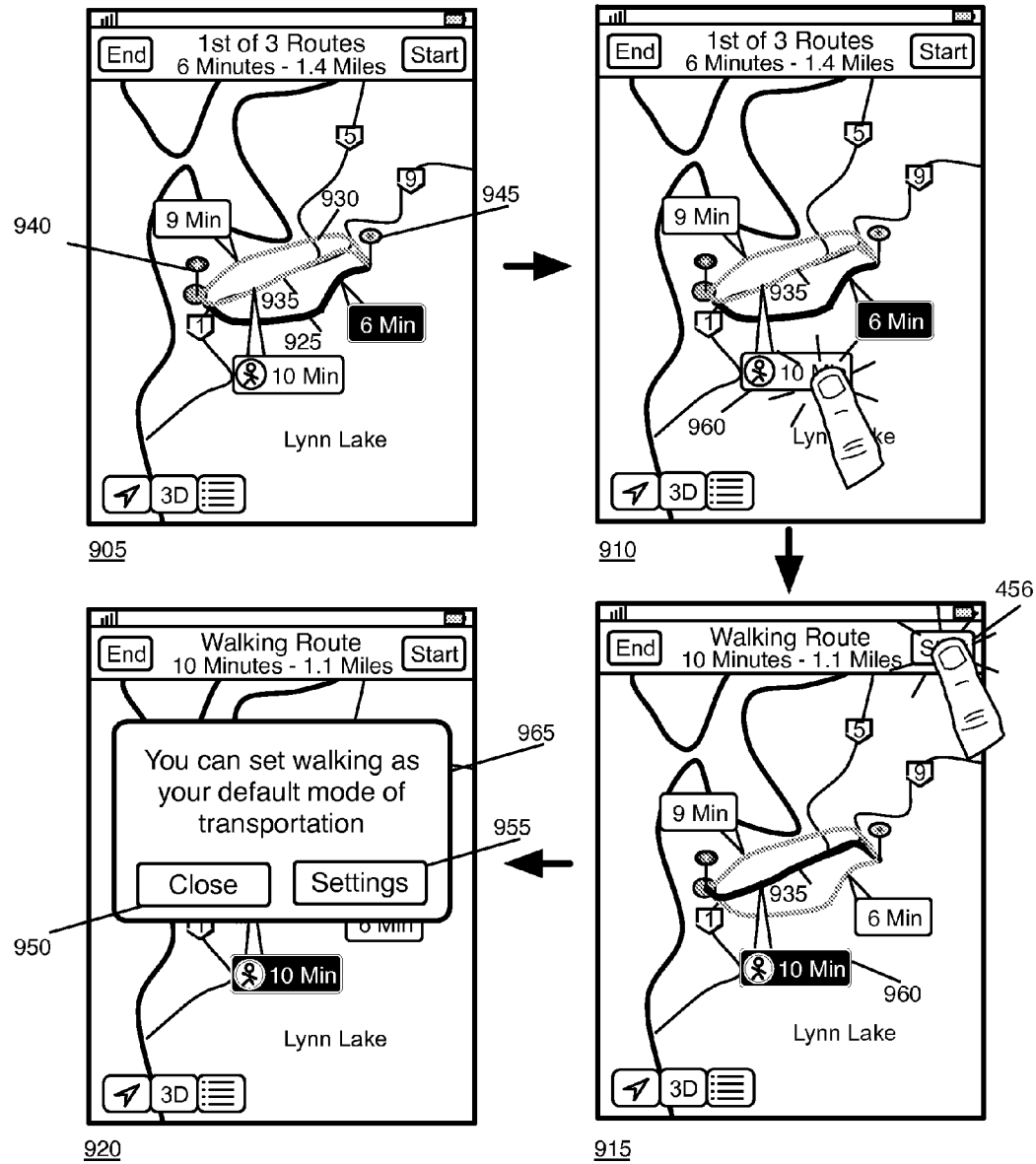
FIG. 9 illustrates the integrated application of some embodiments that informs a user that walking may be set as the default means of transportation.

FIG. 9 illustrates in four stages 905-920 an example of the integrated application of some embodiments that informs a user that walking may be set as the default means of transportation for finding routes when the user navigates a walking route for the first time. In some embodiments, the integrated application uses a pop-up window to inform the user. Alternatively or conjunctively, the integrated application of some embodiments may audibly inform the user.

At the first stage 905, the integrated application displays three routes 925, 930 and 935 from a starting location to an ending location, which are represented by two pins 940 and 945, respectively. The routes 925 and 930 are driving routes and the route 935 is a walking route. At this stage 905, the default means of transportation for finding routes is driving and the integrated application has selected the driving route 925 by default.

At the second stage 910, the user selects the walking route 935 by selecting a banner 960 that is associated with the walking route 935. The third stage 915 shows that the integrated application has changed the appearance of the banner 960 and the walking route 935 to indicate that the walking route 935 is selected. At the third stage 915, the user selects the start control 456.

At the fourth stage 920, the integrated application presents to the user a notification about an option to set walking as the default means of transportation in the form of a pop-up window 960. In some embodiments, the integrated application presents such notification when the user initiates a navigation of a walking route for the first time using the integrated application. In some embodiments, the integrated application records that the user is informed of the option to set walking as the default means of transportation. The integrated application checks this record whenever the user initiates a navigation of a walking route, in order not to present the same notification again.

In some embodiments, the integrated application automatically removes the pop-up window 960 after displaying the pop-up window for a short period of time (e.g., five seconds) and goes into the pedestrian mode to begin guiding the user through the route. The pop-up window 960 may also display a selectable UI items 950 for closing the pop-up window 960 and a selectable UI items 955 for showing the UI page 855 for changing the default means of transportation.

Figure 10:
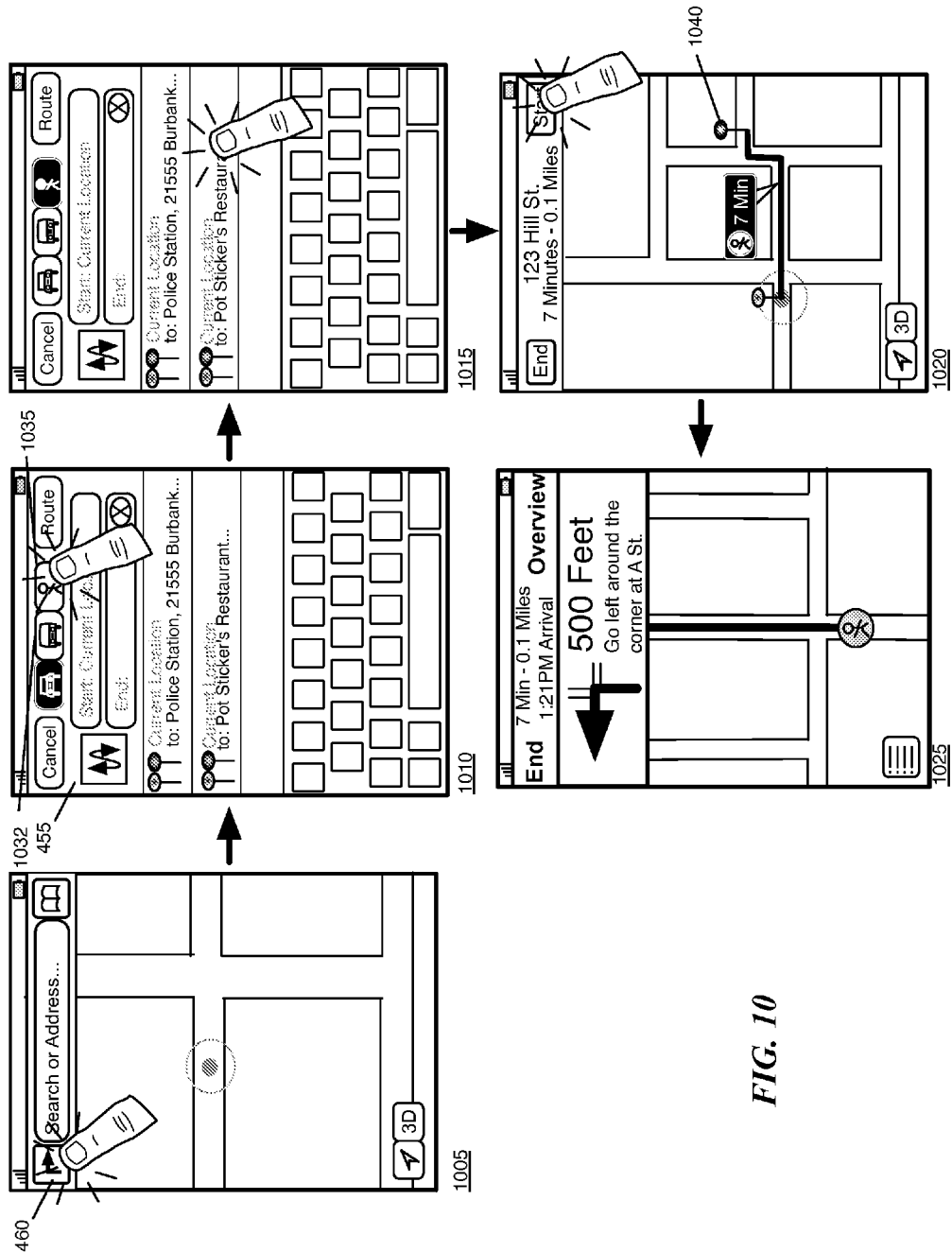
FIG. 10 illustrates an example of entering the pedestrian mode by the integrated application of some embodiments.

FIG. 10 illustrates an example of entering the pedestrian mode by the integrated application of some embodiments over five stages 1005-1025. In some embodiments, the integrated application allows the user to specify that the integrated application provide walking routes.

The first stage 1005 illustrates that user's selection of the direction control 460 opens the direction entry page 455, which is shown at the second stage 1010. The second stage 1010 shows that the direction entry page 455 includes starting and ending fields for providing starting and ending locations for a route, and a table that lists recent destinations for which the integrated application has provided routes to the user. In this example, a selectable icon 1030 is rendered in black to indicate that the means of transportation for which the integrated application computes the routes is driving. The second stage 1010 also shows that the user's selection of a selectable icon 1035, which will cause the integrated application to compute walking routes only. A selectable icon 1032, bearing a drawing of a bus, is for causing the integrated application to compute public transportation routes.

At the third stage 1015, the icon 1035 is rendered in black to indicate that the integrated application is to compute the walking routes. The third stage 1015 also shows a selection of a destination. Because the means of transportation for which the integrated application would provide the routes is walking, the selection of a destination that was previously provided to the user causes the integrated application to compute walking routes to the destination.

The fourth stage 1020 shows that the integrated application provides a walking route to the selected destination represented by a pin 1040. The integrated application provides driving routes as well as walking routes for which the user asked. In these embodiments, the integrated application selects a walking route by default because the integrated application is providing the walking routes in response to the user's selection of the icon 1035. The fourth stage 1020 also shows a user's selection of the start control to direct the integrated application to enter a navigation mode. The fifth stage 1025 shows that the integrated application provides an initial navigation instruction for the route in the pedestrian mode.

D. Voice Command to Enter a Navigation Mode

Figure 11:
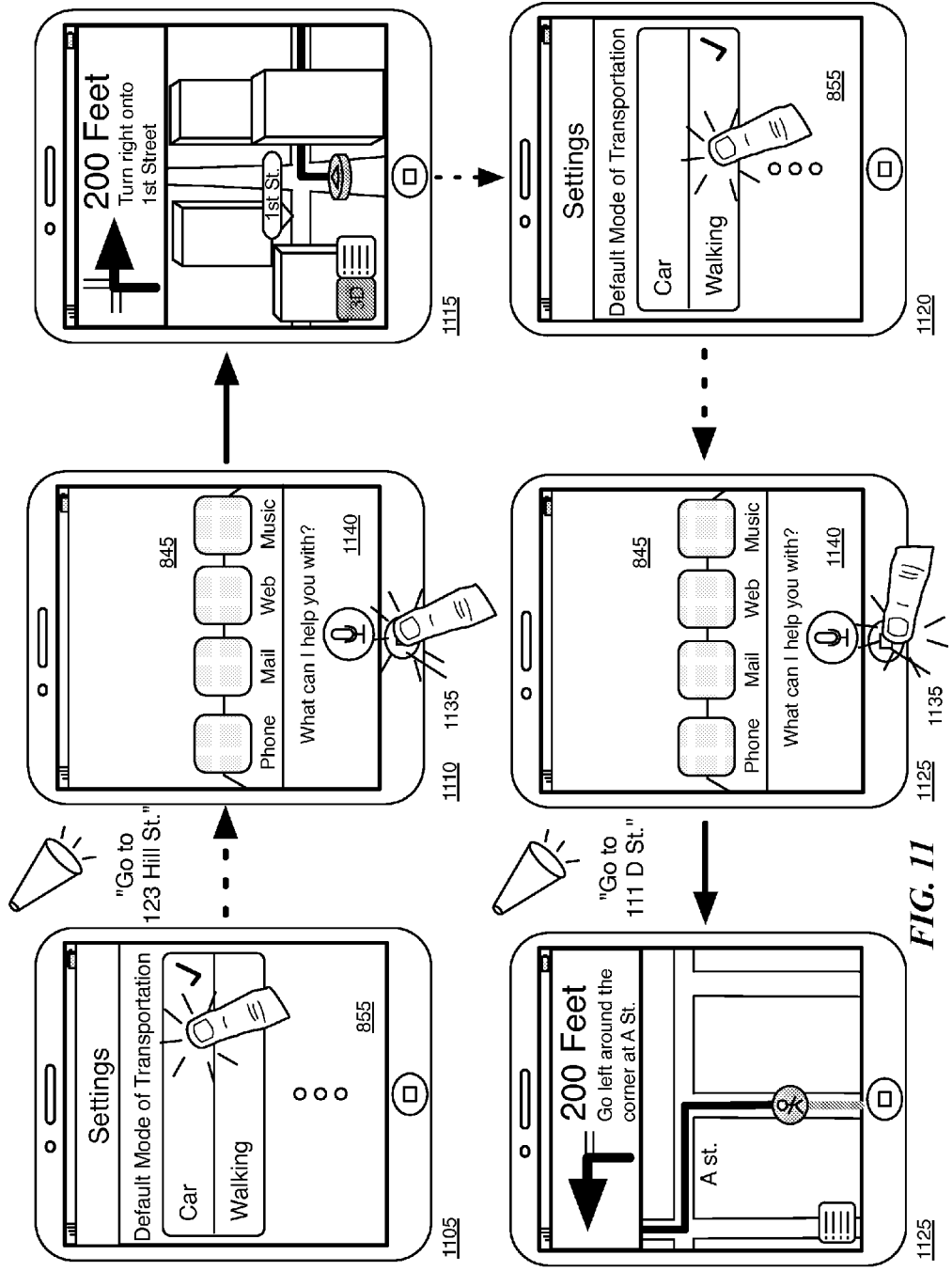
FIG. 11 illustrates that the integrated application of some embodiments directly enters a navigation mode upon receiving the voice inputs, based on the default means of transportation.

FIG. 11 illustrates in six stages 1105-1130 an example of entering different navigation modes by taking voice inputs to the device on which the integrated application executes. Specifically, this figure illustrates that the integrated application of some embodiments directly enters a navigation mode upon receiving the voice inputs, based on the default means of transportation set for the integrate application. In some embodiments, the integrated application takes the voice inputs from the device's voice-recognition interface that receives sound and recognizes the voice of the user. In other embodiments, the integrated application takes the voice inputs through an intelligent personal assistant running on the device, such as Siri™ by Apple, Inc., which launches the integrated application and supplies the voice inputs to the integrated application.

The first stage 1105 shows that the user sets the default means of transportation for the integrated application to driving by selecting "Car" item on the UI page 855. The steps to reach the UI page 855 are not illustrated in this figure for the simplicity of illustration.

The second stage 1110 illustrates the device after several different UI pages have been displayed on the device since the previous stage 1110, indicated by a dotted arrow from the first stage 1105 to the second stage 1110. At the second stage 1110, the device is displaying the UI 845, in response to the user's selection (not shown) of a home button 1135 prior to this stage 1110. The user presses the home button 1135 again, for a period of time (e.g., two seconds), to launch the intelligent personal assistant. In some embodiments, the intelligent personal assistant slides in a UI window 1140 from the bottom of the screen of the device as shown. The user tells the intelligent personal assistant to guide the user to a destination location. In this example, the user tells the intelligent personal assistant "Go to 123 Hill Street."

In response to this voice command, the intelligent personal assistant in some embodiments launches the integrated application and directs the integrated application to guide the user to the destination location. In some embodiments, the integrated application shows a set of routes to the destination location. This set of routes may include both driving routes and walking routes in some embodiments, with the fastest driving route selected by default because the default means of transportation is set to driving as shown at the first stage 1105. In other embodiments, the integrated application shows a set of driving routes only, with the fastest route selected by default.

Alternatively, instead of showing the routes, the integrated application of some embodiments directly enters a navigation mode. Specifically, in some such embodiments, the integrated application enters a navigation mode based on the default means of transportation set for the integrated application. As shown at the third stage 1115, the integrated application shows a beginning of a driving route in the driving mode of some embodiments because the default means of transportation set for the integrated application is driving. That is, for instance, the map view is shown in 3D and the navigation instruction is tailored for driving. The route is one of the several routes (not shown) identified by the integrated application and is selected by default.

The fourth stage 1120 illustrates the device after several different UI pages have been displayed on the device since the previous stage 1115, indicated by a dotted arrow from the first stage 1115 to the second stage 1120. At the fourth stage 1120, the user switches the default means of transportation to walking by selecting "Walking" item on the UI page 855. The steps to reach the UI page 855 are not illustrated for the simplicity of illustration.

The fifth stage 1125 illustrates the device after several different UI pages have been displayed on the device since the previous stage 1120, indicated by a dotted arrow from the first stage 1120 to the second stage 1125. At the fifth stage 1125, the device is displaying the UI 845. The user presses the home button 1135 to launch the intelligent personal assistant. The UI window 1140 has slid in. The user tells the intelligent personal assistant to guide the user to a destination location. In this example, the user tells the intelligent personal assistant "Go to 111 D Street."

At the sixth stage 1130, the integrated application enters the pedestrian mode of some embodiments, in response to the voice command received at the previous stage 1125 through the intelligent personal assistant, because the default means of transportation set for the integrated application is walking. As shown, the map view is shown in 2D and the navigation instruction is tailored for walking. The route is one of the several routes (not \ shown) identified by the integrated application and is selected by default.

Having described the integrated application that presents the navigation instructions and the map views in several different navigation modes, the next Section II now describes presenting notifications of an upcoming turn to the user.

II. Notifications in Pedestrian Mode

In some embodiments, the integrated application presents several notifications to the user in order to alert the user for an upcoming turn. This section describes presenting several different notifications to the user for an upcoming turn and allowing the user to select an audio output apparatus through which to present the audible notifications.

A. Presenting Audible Notifications to User

Figure 12:
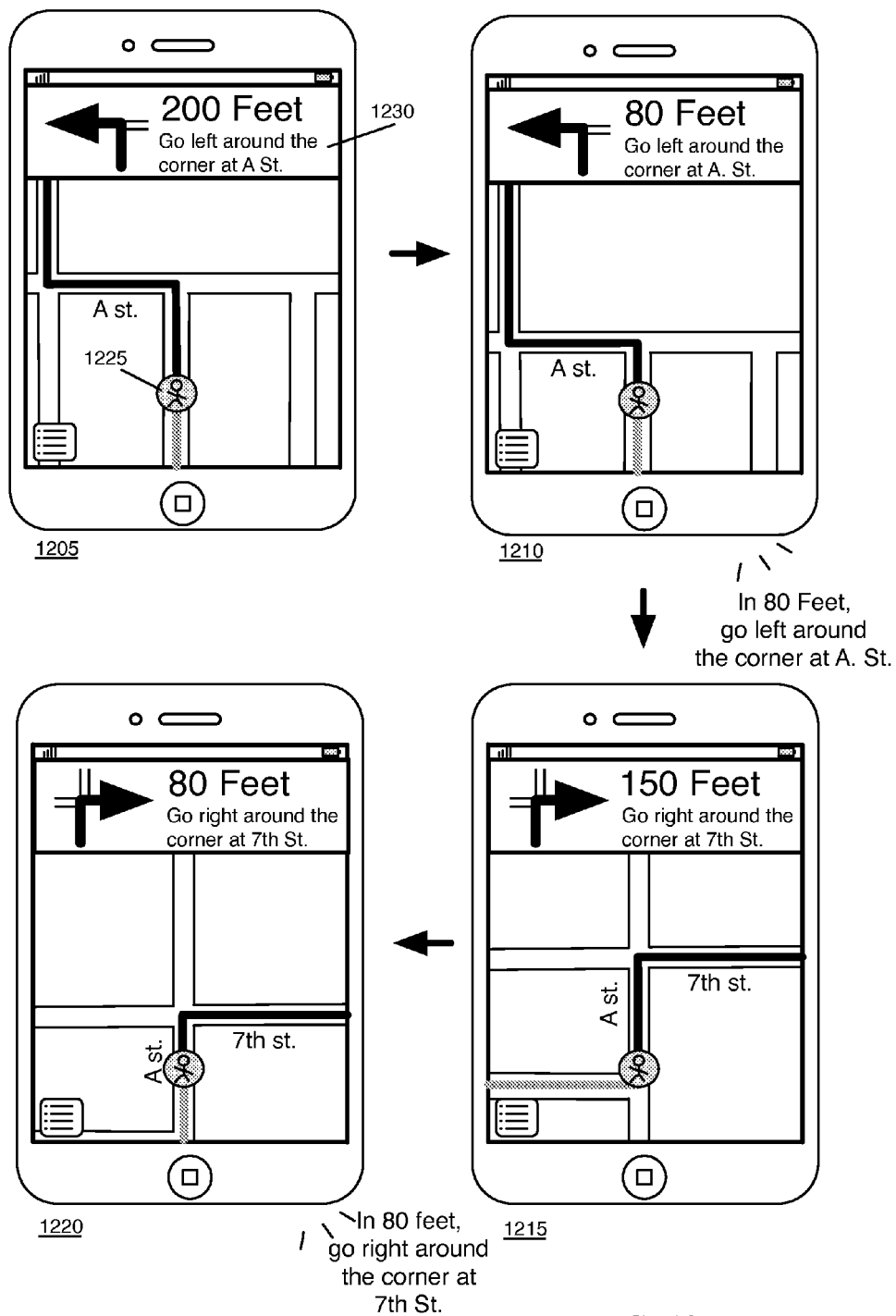
FIG. 12 illustrates that the integrated application of some embodiments provides an audible notification.

FIG. 12 illustrates in terms of four stages 1205-1220 that the integrated application of some embodiments provides an audible notification as the user of the device executing the integrated application approaches a location for a turn. In some embodiments, the integrated application provides the audible notification when the integrated application is running at the foreground of the device (i.e., when the device is displaying the integrated application's UI pages). The audible notification is played back through speaker(s) of the device or any other audio output (e.g., a headphone, wireless or wired).

The first stage 1205 shows that the integrated application displays a navigation instruction for a location along a route being traveled by the user carrying the device. The current position of the user is represented by the puck 1225. As shown, the integrated application displays the navigation instruction in a sign 1230, which indicates the next turn for the user to make is in 200 feet. The integrated application also aligns the map view such that the current direction of the travel points to the top of the screen of the device. The integrated application is in the pedestrian mode.

The second stage 1210 shows that the user has walked closer to the location for the next turn. In some embodiments, the integrated application updates the navigation instruction as the user approaches the next turn. The second stage 1210 shows that the integrated application has updated the sign 1230 in order to show that the user has about 80 feet to walk to the location of the next turn. In some embodiments, the integrated application plays back an audible notification to the user to let the user know about the imminent turn as the user's current position falls within a certain distance (e.g., 80 feet) from the location for the next turn.

The third stage 1215 shows that the user has made a turn and advances toward the next turn of the route. The integrated application displays a different sign for the next turn. As shown, the next turn is 150 feet away from the current position of the user.

The fourth stage 1220 shows that the user has come within a threshold distance (e.g., 80 feet) from the next turn. The integrated application therefore plays back the audible notification, which says that the user is to make a right turn onto $7^{th}$ street in 80 feet.

Figure 13:
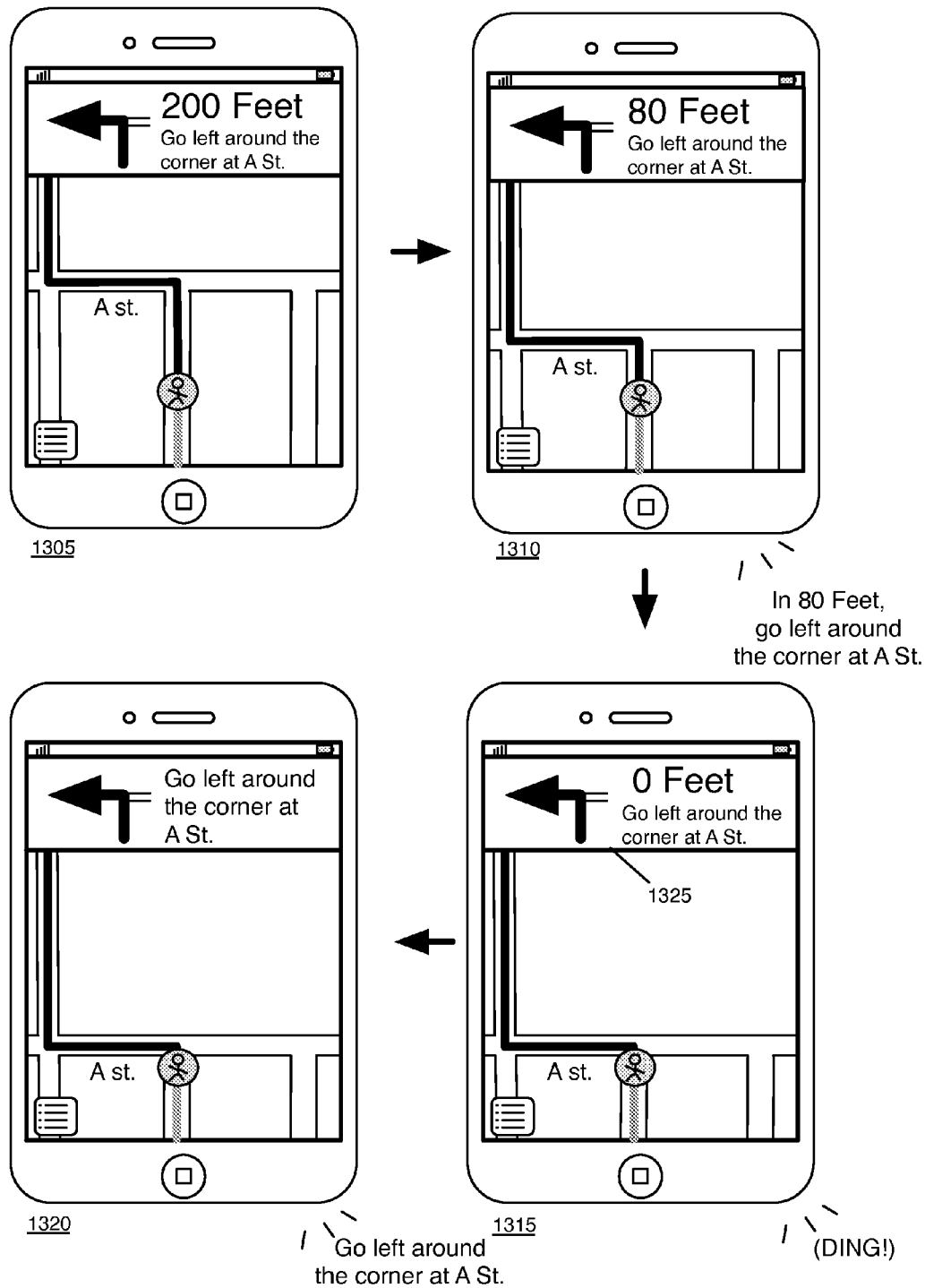
FIG. 13 illustrates that the integrated application of some embodiments provides several audible notifications.

FIG. 13 illustrates in terms of four stages 1305-1320 that the integrated application of some embodiments provides several audible notifications as the user of the device executing the integrated application approaches a location for a turn. For a particular turn, the integrated application provides a first audible notification when the user comes within a first threshold distance from the location for the particular turn. The integrated application provides a second audible notification when the user comes within a second threshold distance from the location. The second threshold distance is smaller than the first threshold distance. The integrated application provides a third audible notification when the user is at the location for the turn.

The first and second stages 1305 and 1310 are similar to the first and second stages 1205 and 1210 of FIG. 12 described above. The first stage 1305 shows that the user is 200 feet away from a turn. The second stage 1310 shows that the user is 80 feet away from the turn. In this example, the first threshold for the integrated application to provide the first audible notification is 80 feet and thus the integrated application plays back the first audible notification. In some embodiments, the first audible notification for a turn is a recitation of a navigation instruction for the turn. At the stage 1310, the integrated application reads the navigation instruction for the upcoming turn to the user.

The third stage 1315 shows that the user has come within the second threshold distance from the location for the turn. In some embodiments, the second threshold distance is set to a distance (e.g., five feet, one foot, etc.) that would indicate that the user is very close to the location for the turn or is at the location for the turn. At the third stage 1315, the integrated application plays the second audible notification for the turn. In some embodiments, the integrated application uses a short audible sound (e.g., "ding") as the second audible notification. The integrated application also updates a sign 1325 that displays the navigation instruction for the turn. As shown, the sign 1325 indicates that the user has come within less than one foot from the location for the turn.

The fourth stage 1320 shows that the integrated application has updated the sign 1325 to indicate that the user is at the location and should make the turn. At this stage 1320, the integrated application provides the third audible notification, which in some embodiments tells the user to make the turn.

Figure 14:
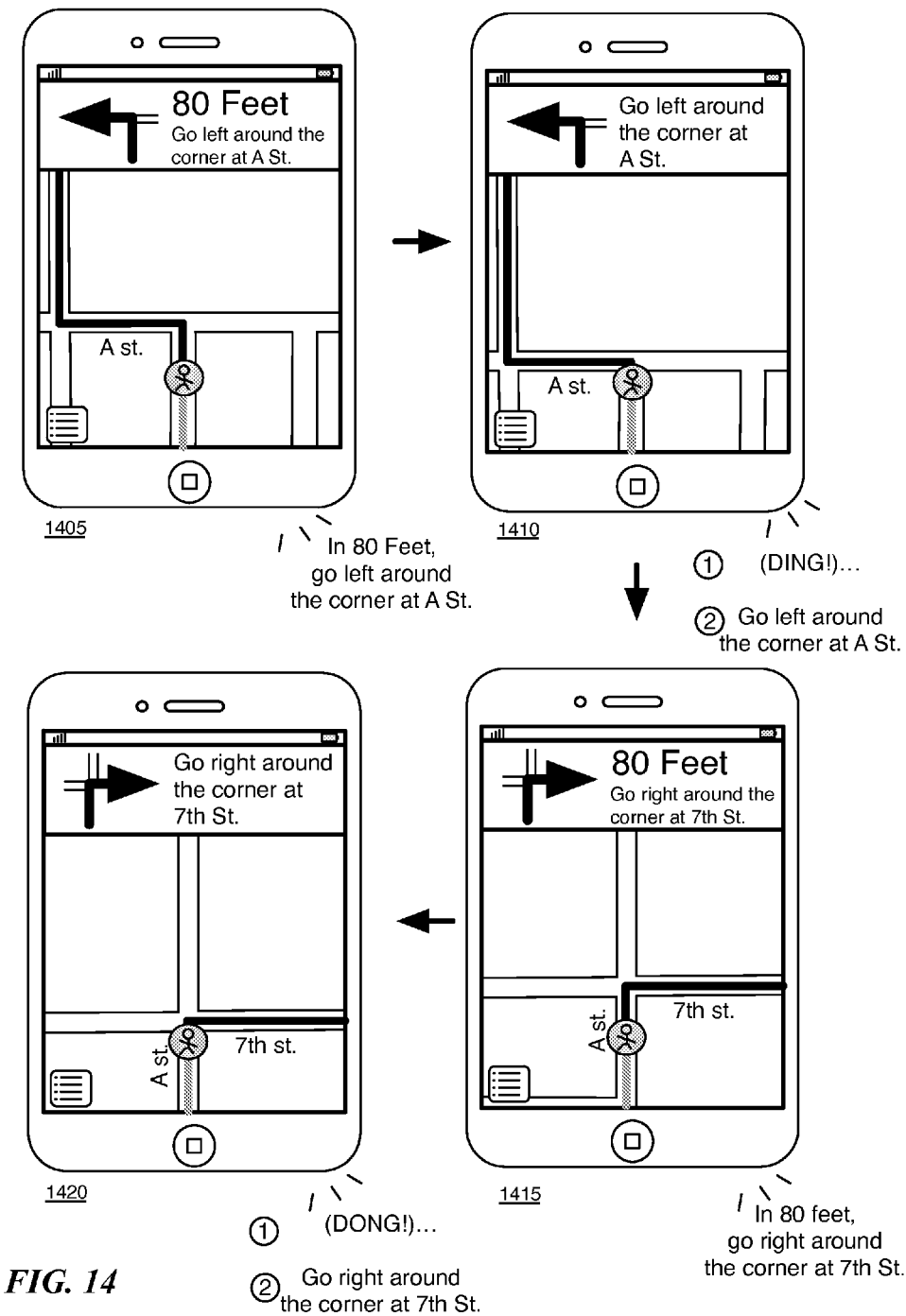
FIG. 14 illustrates that the integrated application of some embodiments provides several audible notifications.

FIG. 14 illustrates in terms of four stages 1405-1420 that the integrated application of some embodiments provides several audible notifications as the user of the device executing the integrated application approaches a location for a turn. As mentioned above, the integrated application provides several audible notifications at different distances from the location of the turn. In some embodiments, the integrated application uses different second audible notifications for different directions of the turn. For instance, the integrated application uses a first short audible sound (e.g. "ding") when the turn is a left turn and uses a second different audible sound (e.g., "dong") when the turn is a right turn.

The first stage 1405 shows that the user is within the first threshold distance from the location for a turn. The integrated application of some embodiments thus reads the navigation instruction for the turn at this stage 1405.

The second stage 1410 shows that the user is within the second threshold distance from the location for the turn. Because the turn is a left turn, the integrated application plays back the first short audible sound (e.g., "ding") as the second audible notification. The integrated application also tells the user to make the turn, as the third audible notification, when the user reaches the location for the turn.

The third stage 1415 shows that the user has advanced along the route to another location for another turn. For this turn, the user has reached within the first threshold distance at this stage 1415. The integrated application thus reads the navigation instruction to the user.

The fourth stage 1420 shows that the user is within the second threshold distance from the location for the next turn. The integrated application plays back the second short audible sound (e.g. "dong") as the second audible notification because this turn is a right turn. The integrated application also tells the user to make the right turn, as the third audible notification, when the user reaches the location for the right turn.

B. Presenting Notifications While Running in the Background

1. Running in the Background, with a Headset Connected

Figure 15:
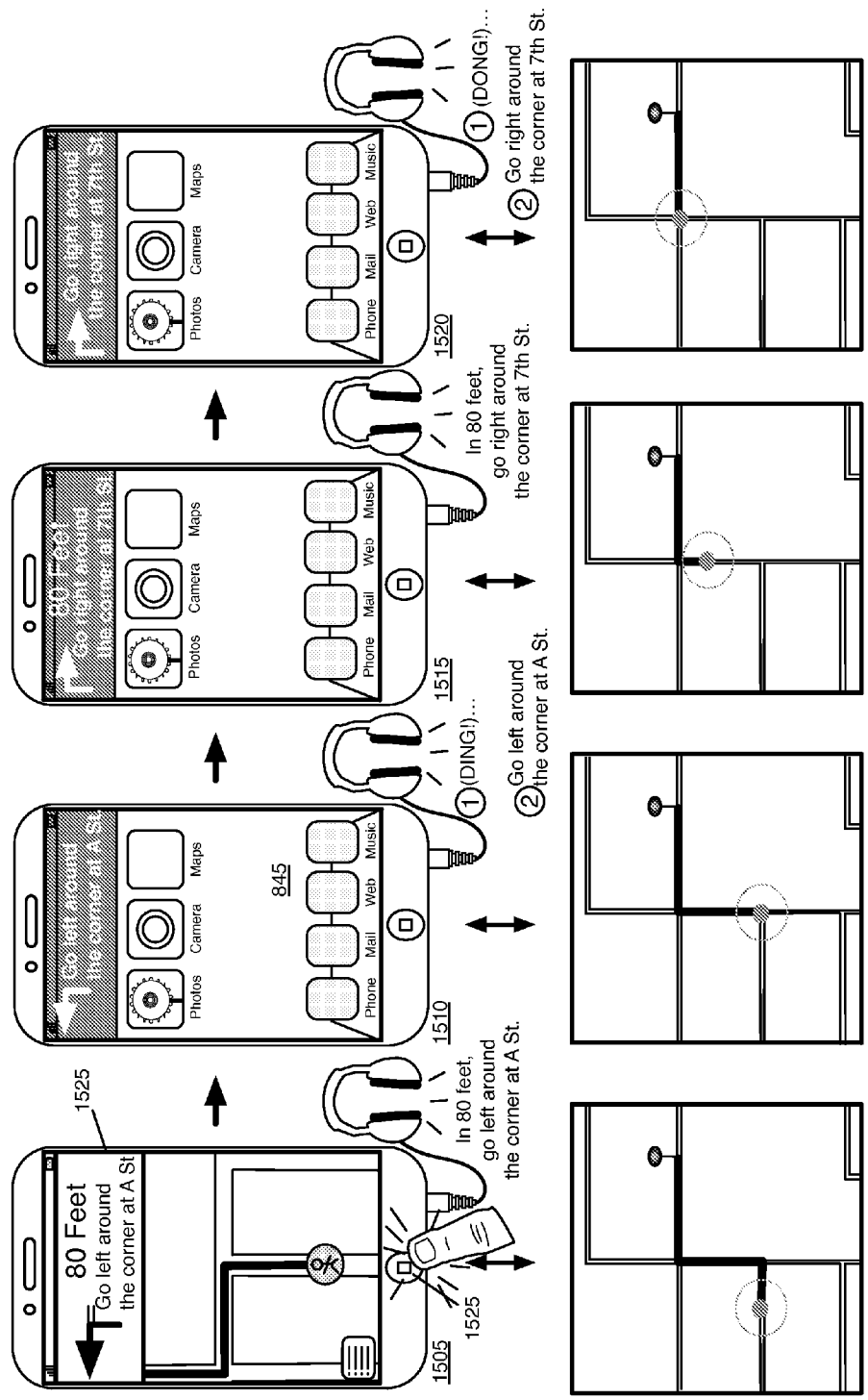
FIG. 15 illustrates that the integrated application provides audible notifications when the integrated application is running in the background.

FIG. 15 illustrates in terms of four stages 1505-1520 that the integrated application provides audible notifications when the integrated application is running in the background (e.g., when the integrated application's UI pages are not displayed). When running in the background, the integrated application of some embodiments provides audible notifications only if the device on which the integrated application runs is connected to an audio output apparatus other than the device's own speaker(s). In other embodiments, the integrated application provides the audible notification regardless of the integrated application running in the foreground or in the background, as long as the screen of the device is not off.

In some embodiments, the audio output apparatuses include earphones, headphones and speakers of wired and wireless kinds The top half of this figure shows the device in the four stages 1505-1520. The bottom half of this figure illustrates the map and the route that is being navigated by the user to show where the user carrying the device is positioned. The map shown in the bottom half of the figure is not actually displayed on the screen of the device.

The first stage 1505 shows that the integrated application is in the pedestrian mode, displaying a navigation instruction and a map view for the current position of the user on the route being navigated. The map illustrated below the device at this stage 1505 shows the current position of the user and the destination of the route. At the first stage 1505, the user is within the first threshold distance from the location for a turn. The first stage 1505 also shows that a headset that the user is using is connected to the device. The integrated application of some embodiments thus reads the navigation instruction for the turn at this stage 1505 through the headset. The first stage 1505 also shows that the user presses the home button 1525.

The second stage 1510 shows that the integrated application is running in the background. The device is displaying the device's UI 845, which includes several icons of several applications in a dock area 850 and on a page of the UI. This UI page is displayed in response to user's selection of the home button 1525 at the previous stage 1505. In some embodiments, the device still displays navigation instructions on a banner 1530 that translucently overlays on the UI 845 or on UI pages of other application that is running in the foreground of device.

The map illustrated at the bottom half of the figure for this stage 1510 shows that the user came within the second threshold distance from the location for a turn. The integrated application of some embodiment would not play back the second audible notification because the integrated application is running in the background. However, because the device is connected to the headset, the integrated application plays back the second audible notification. The integrated application plays back the first short audible sound (e.g., "ding") as the second audible notification because the upcoming turn is a left turn. The integrated application also tells the user to make the turn, as the third audible notification, when the user reaches the location for the turn. The integrated application of some embodiments would not have presented the third audible notification if the headset had not been connected to the device.

The map illustrated at the bottom half of the figure for the third stage 1515 that the user has advanced along the route to another location for another turn. For this turn, the user has reached within the first threshold distance at this stage 1515. Because the headset is connected to the device, the integrated application reads the navigation instruction to the user through the headset.

The map illustrated at the bottom half of the figure for the fourth stage 1520 shows that the user has reached within the second threshold distance from the location for the next turn. The integrated application plays back the second short audible sound (e.g. "dong") as the second audible notification because this turn is a right turn. The integrated application also tells the user to make the right turn, as the third audible notification, when the user reaches the location for the right turn. The integrated application presents the second and third audible notifications because the device is connected to the headset.

FIG. 15 illustrates that the integrated application running in the background provides the audible notifications through the headset while the device's screen is on. In some embodiments, the device may turn off the screen to save the battery power. In some such embodiments, the integrated application still provides the audible notifications when the device's screen is turned off as long as the device is connected to an audio output apparatus.

2. Non-Audiovisual Notification While Running in the Background

Figure 16:
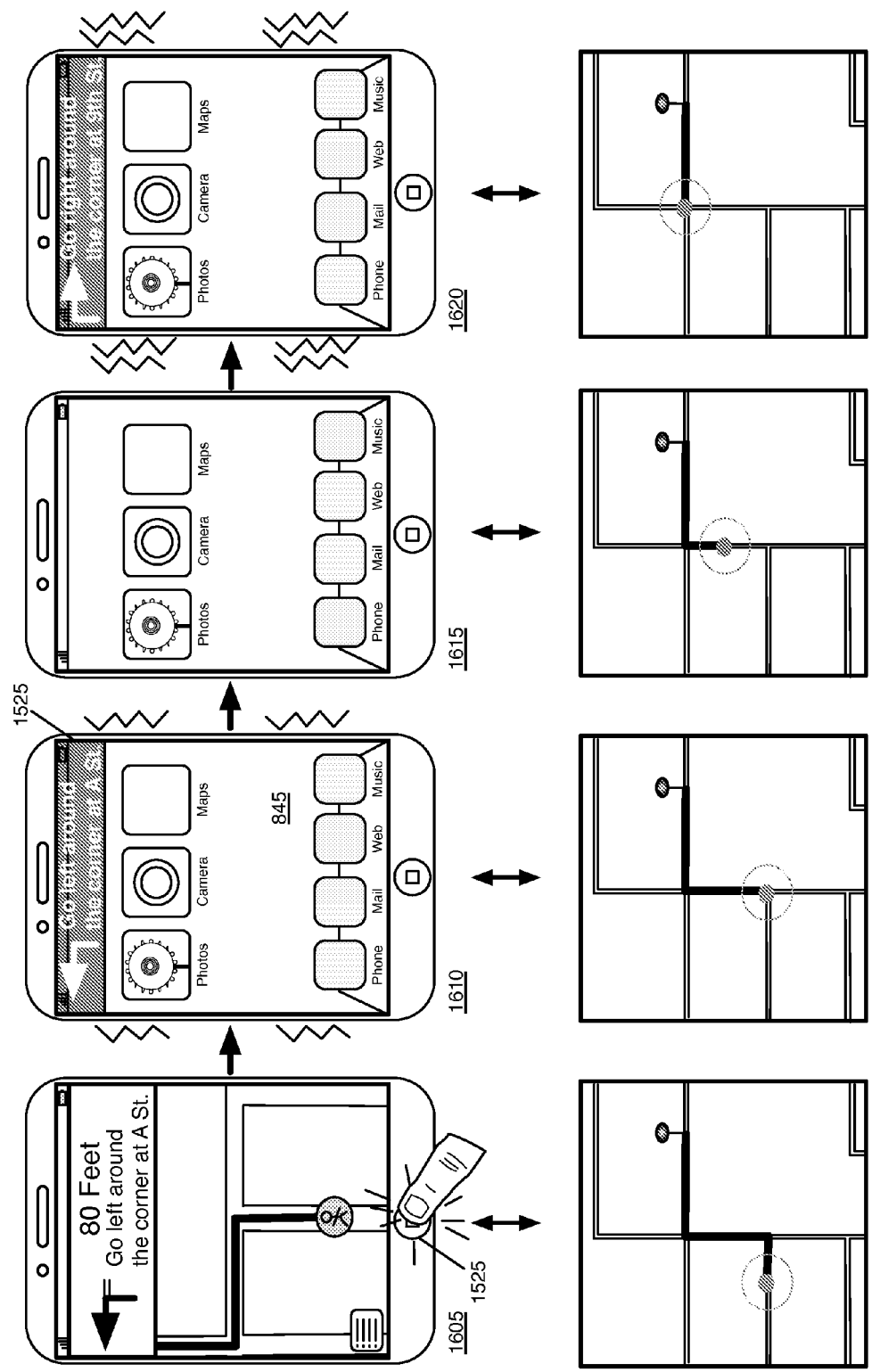
FIG. 16 illustrates that the integrated application of some embodiments provides non-audiovisual notifications to alert the user for an incoming turn to make.

FIG. 16 illustrates in terms of four stages 1605-1620 that the integrated application of some embodiments provides non-audiovisual notifications to alert the user for an incoming turn to make. The integrated application of some embodiments provides non-audiovisual notifications (e.g., vibrations) when the integrated application is running in the background and the device on which the integrated application is not connected to an audio output apparatus. In some embodiments, the integrated application provides the non-audiovisual notification as the user comes within a threshold distance from the location for the turn and/or when the user reaches the location. In some such embodiments, the integrated application provides different non-audiovisual notifications for different directions of the turn.

The top half of this figure shows the device in the four stages 1605-1620. The bottom half of this figure illustrates the map and the route that is being navigated by the user to show where the user carrying the device is positioned. The map shown in the bottom half of the figure is not actually displayed on the screen of the device.

The first stage 1605 shows that the integrated application is in the pedestrian mode, displaying a navigation instruction and a map view for the current position of the user on the route being navigated. The map illustrated below the device at this stage 1605 shows the current position of the user and the destination of the route. The first stage 1605 also shows that the user is pressing the home button 1525.

The second stage 1610 shows that the device is displaying the UI 845 and the integrated application is not running in the foreground. The device is not connected to an audio output device. The map illustrated at the bottom half of the figure for this stage 1610 shows that the user arrived at the location for a left turn. The integrated application displays a navigation instruction on the banner 1530. In addition, the integrated application provides a non-audiovisual notification to the user by, for example, causing the device to vibrate. In some embodiments, the integrated application also uses different vibrations for the left and right turns. For instance, the integrated application of some embodiments uses a short vibration for the left turn and a long vibration for the right turn or vice versa. The integrated application may also use different combination of vibrations to differentiate notifications for the left and right turns—e.g., a long-short-long vibration combination for one of the left and right turns and a short-long-short vibration combination for the other turn, etc. The single wavy lines depicted by the device at the second stage 1610 represent a vibration combination for the left turn.

The third stage 1615 shows that the device is displaying the UI 845 but does not display the banner 1530 that was displayed at the previous stage 1610. The map illustrated in the bottom half of the figure for the stage 1615 shows that the user has advanced along the route to another location for a right turn.

At the fourth stage 1620, the map illustrated in the bottom half of the figure for this stage shows that the user has arrived at the location for the right turn. The integrated application displays a navigation instruction on the banner 1530. The integrated application provides a non-audiovisual notification that is different than the notification used at the second stage 1610 for the left turn. The double wavy lines depicted by the device at the fourth stage 1620 represent a different vibration combination for the right turn.

3. Short Audible Sound While Running in the Background

Figure 17:
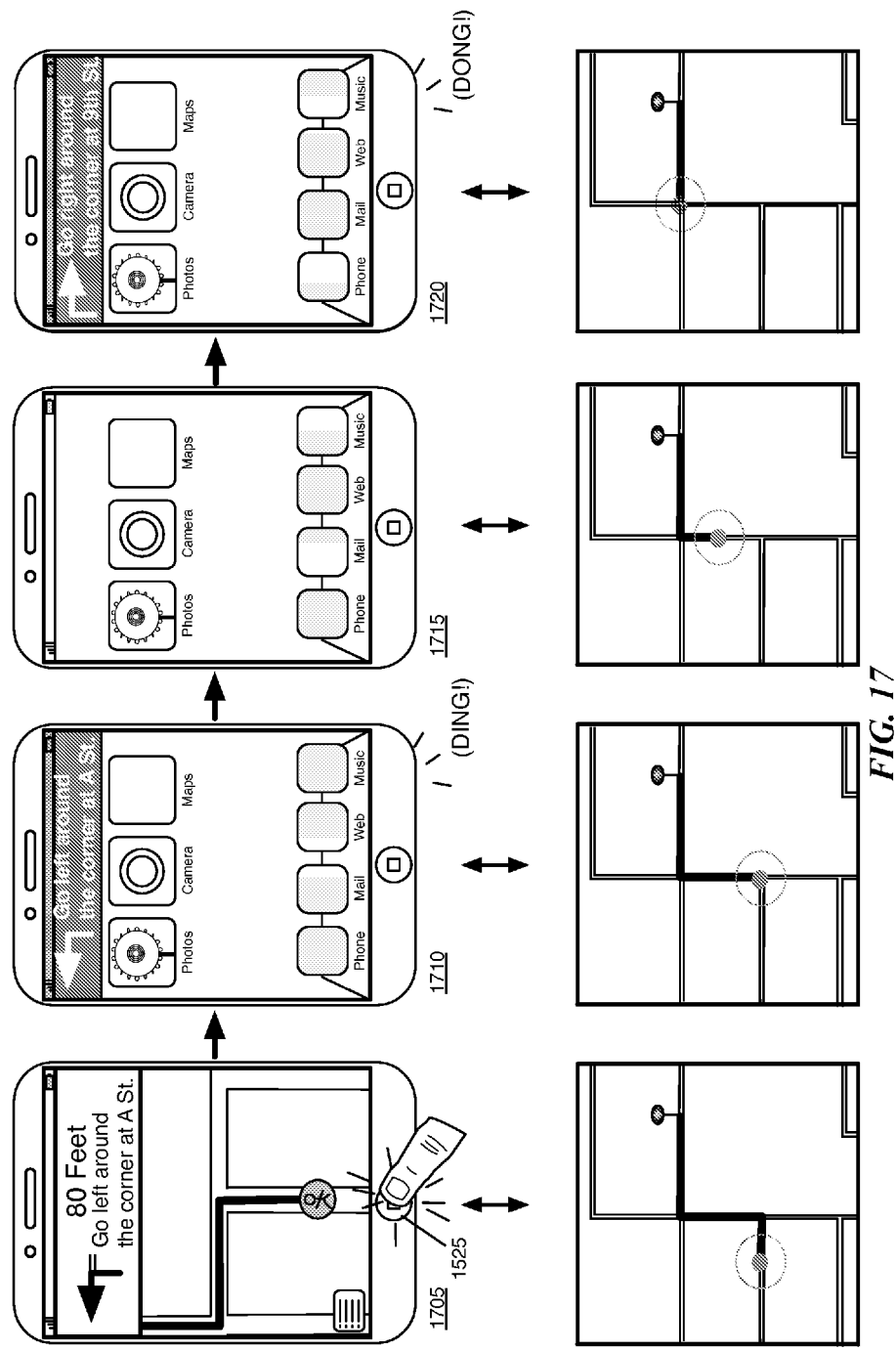
FIG. 17 illustrates that the integrated application provides short audible notifications when the integrated application is running in the background.

FIG. 17 illustrates in terms of four stages 1705-1720 that the integrated application provides short audible notifications when the integrated application is running in the background. In some embodiments, the integrated application provides a short audible notification when the user carrying the device reaches the location for a turn. The top half of this figure shows the device in the four stages 1705-1720. The bottom half of this figure illustrates the map and the route that is being navigated by the user to show where the user carrying the device is positioned. The map shown in the bottom half of the figure is not actually displayed on the screen of the device.

The first stage 1705 shows that the integrated application is in the pedestrian mode, displaying a navigation instruction and a map view for the current position of the user on the route being navigated. The map illustrated below the device at this stage 1705 shows the current position of the user and the user is approaching a location for a left turn. The first stage 1705 also shows that the user is pressing the home button 1525.

The second stage 1710 shows that the device is displaying the UI 845 in response to user pressing the home button 1525 at the previous stage 1705 and the integrated application is not running in the foreground. The map illustrated at the bottom half of the figure for this stage 1710 shows that the user reaches the location for the left turn. The integrated application displays a navigation instruction on the banner 1530. In addition, the integrated application plays back a short audible sound (e.g., "ding") as a short audible notification for reminding the user to make the left turn. As mentioned above, the integrated application of some embodiments uses different short audible notifications (e.g., "ding" and "dong") for the left and right turns.

The third stage 1715 shows that the device is displaying the UI 845 but does not display the banner 1530 that was displayed at the previous stage 1710. The map illustrated in the bottom half of the figure for the stage 1715 shows that the user has advanced along the route to another location for a right turn.

At the fourth stage 1720, the map illustrated in the bottom half of the figure for this stage shows that the user has reaches the location for the right turn. The integrated application displays a navigation instruction on the banner 1530. The integrated application plays back another short audible sound that is different than the notification used at the second stage 1710 for the left turn.

In some embodiments, the integrated application may combine the short audible notifications with non-audiovisual notification described above by reference to FIG. 16. That is, the integrated application may cause the device to make a first vibration combination when playing back the short audible notification at the stage 1710 and cause the device to make a second vibration combination when playing back the different short audible notification at the stage 1720.

4. All Audible Notifications While Running in the Background with the Screen On

Figure 18:
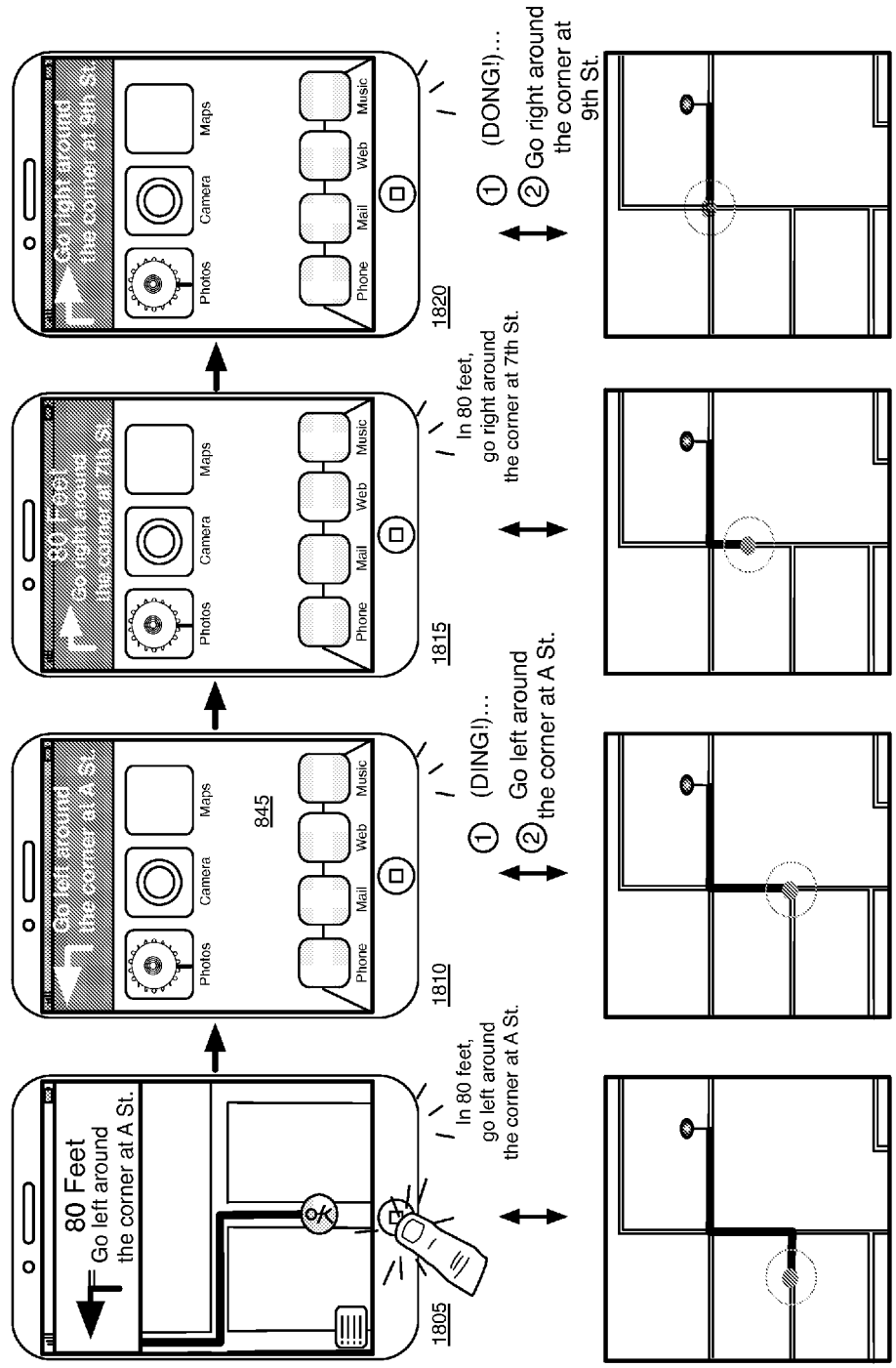
FIG. 18 illustrates the integrated application of some embodiments that provides all of the audible notifications.

FIG. 18 illustrates in terms of four stages 1805-1820 the integrated application of some embodiments that provides all of the audible notifications regardless of whether or not the integrated application is running in the foreground or in the background, as long as the screen of the device is not off. The integrated application of these embodiments does not require an audio output apparatus to be connected to the device.

The first stage 1805 shows that the integrated application is in the pedestrian mode, displaying a navigation instruction and a map view for the current position of the user on the route being navigated. The map illustrated below the device at this stage 1805 shows the current position of the user and the destination of the route. At the first stage 1805, the user is within the first threshold distance from the location for a turn. The integrated application of some embodiments thus reads the navigation instruction for the turn at this stage 1805 through the device's speaker(s). The first stage 1805 also shows that the user presses the home button 1825.

The second stage 1810 shows that the integrated application is running in the background. The device still displays navigation instructions on a banner 1830 that translucently overlays on the UI 845. The map illustrated at the bottom half of the figure for this stage 1810 shows that the user came within the second threshold distance from the location for a turn. Accordingly, the integrated application plays back the second audible notification through the device's speaker(s). The integrated application plays back the first short audible sound (e.g., "ding") as the second audible notification because the upcoming turn is a left turn. The integrated application also tells the user to make the turn, as the third audible notification, when the user reaches the location for the turn.

The map illustrated at the bottom half of the figure for the third stage 1815 that the user has advanced along the route to another location for another turn. For this turn, the user has reached within the first threshold distance at this stage 1815. Accordingly, the integrated application reads the navigation instruction to the user.

The map illustrated at the bottom half of the figure for the fourth stage 1820 shows that the user has reached within the second threshold distance from the location for the next turn. The integrated application plays back the second short audible sound (e.g. "dong") as the second audible notification because this turn is a right turn. The integrated application also tells the user to make the right turn, as the third audible notification, when the user reaches the location for the right turn.

5. Non-Audiovisual Notification When the Screen is Off

Figure 19:
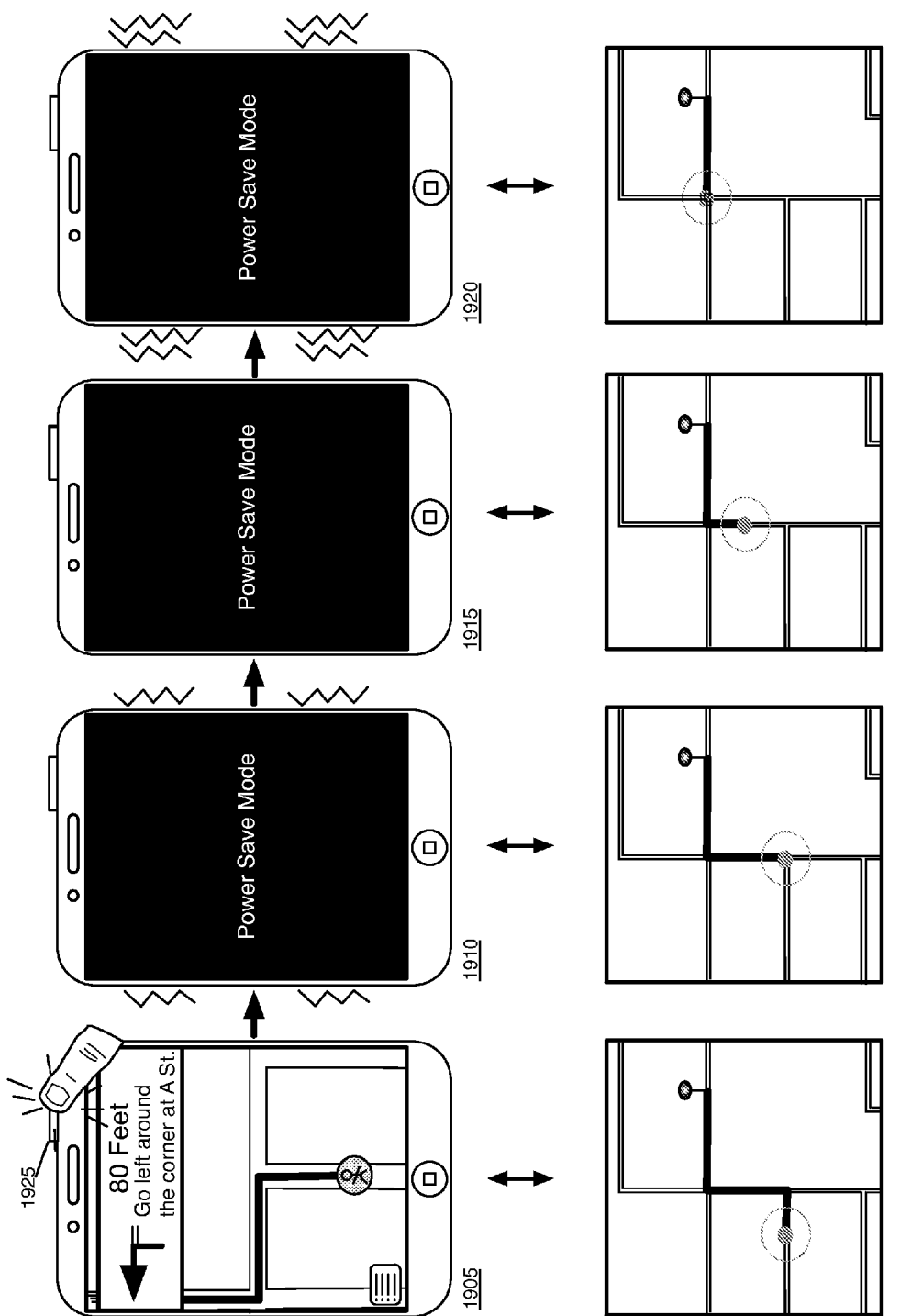
FIG. 19 illustrates that the integrated application provides non-audiovisual notifications to alert the user for an incoming turn.

FIG. 19 illustrates in terms of four stages 1905-1920 that the integrated application provides non-audiovisual notifications to alert the user for an incoming turn. In some embodiments, the integrated application does not provide any audible notifications for the turn when the screen of the device on which the integrated application runs is turned off. Instead, the integrated application of some of these embodiments provides non-audiovisual notifications (e.g., vibrations) when the screen is turned off. The top half of this figure shows the device in the four stages 1905-1920. The bottom half of this figure illustrates the map and the route that is being navigated by the user to show where the user carrying the device is positioned. The map shown in the bottom half of the figure is not actually displayed on the screen of the device.

The first stage 1905 shows that the integrated application is in the pedestrian mode, displaying a navigation instruction and a map view for the current position of the user on the route being navigated. The map illustrated below the device at this stage 1905 shows the current position of the user and the destination of the route. The first stage 1905 also shows that the user is pressing a control 1925, which when pressed causes the device to turn off the screen. Pressing the control 1925 is one of several ways to cause the device to turn off the screen. In some embodiments, the device may automatically turn off the screen when a defined period of time elapses since the last user activity (e.g., touching the screen or pressing the controls on the device).

The second stage 1910 shows that the device has shut off its screen and thus does not display anything. The map illustrated at the bottom half of the figure for this stage 1910 shows that the user arrived at the location for a left turn. The integrated application provides a non-audiovisual notification to the user by, for example, causing the device to vibrate. As mentioned above, the integrated application uses different vibrations for the left and right turns. The single wavy lines depicted by the device at the second stage 1910 represent a vibration combination for the left turn.

The third stage 1915 shows that the device is not displaying anything because the screen is still off. The map illustrated in the bottom half of the figure for this stage shows that the user has advanced along the route to another location for a right turn.

At the fourth stage 1920, the map illustrated in the bottom half of the figure for this stage shows that the user has arrived at the location for the right turn. The integrated application does not display anything as the screen is still off. The integrated application provides a non-audiovisual notification that is different than the notification used at the second stage 1910 for the left turn. The double wavy lines depicted by the device at the fourth stage 1920 represent a different vibration combination for the right turn.

6. Non-Audiovisual Notification and Short Audible Sound When the Screen is Off

Figure 20:
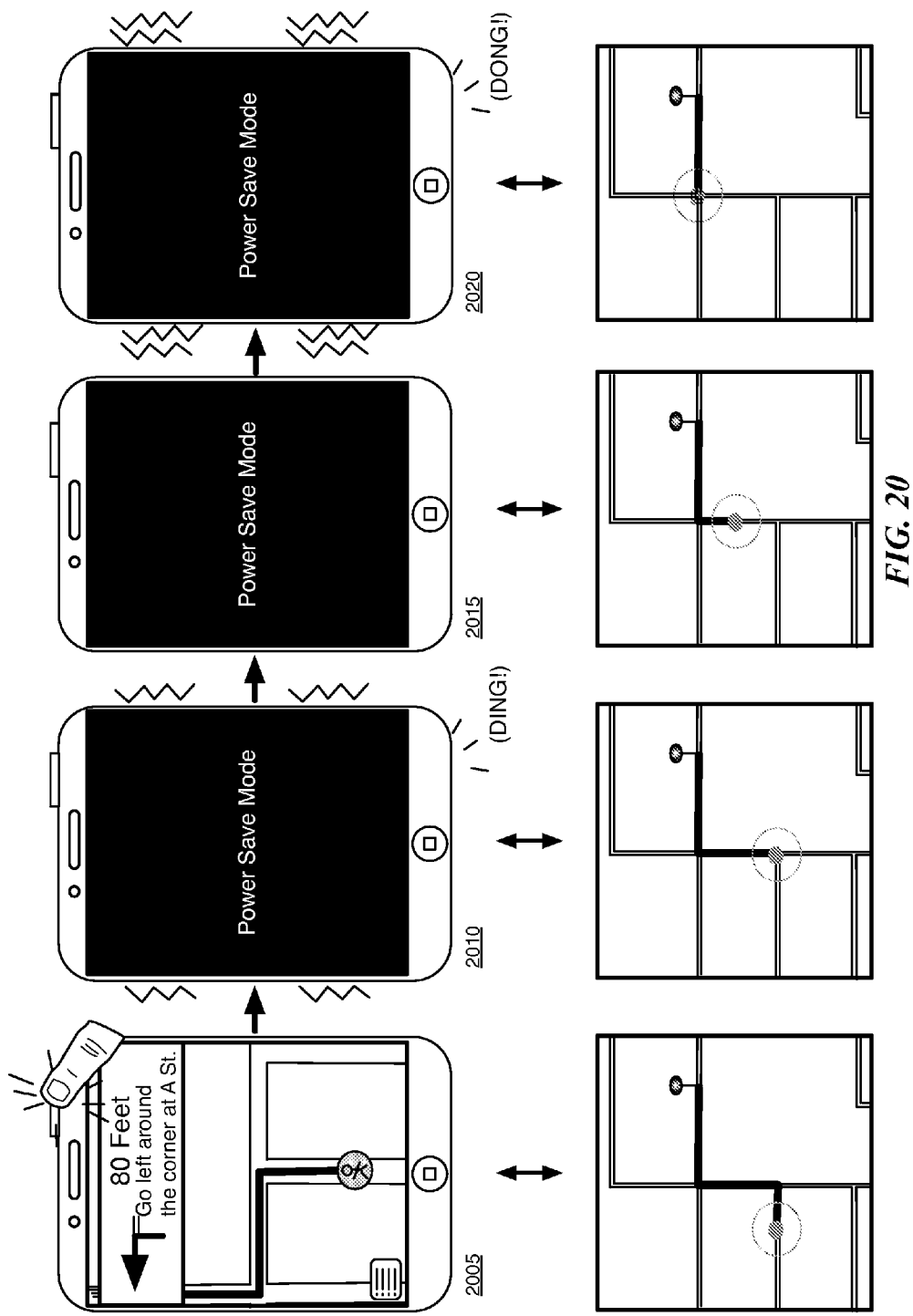
FIG. 20 illustrates that the integrated application provides non-audiovisual notification.

FIG. 20 illustrates in terms of four stages 2005-2020 that the integrated application provides non-audiovisual notification when the device on which the integrated application runs shuts off the screen and does not display anything. Specifically, this figure illustrates that the non-audiovisual notification can be combined with a short audible notification when the device's screen is turned off. The top half of this figure shows the device in the four stages 2005-2020. The bottom half of this figure illustrates the map and the route that is being navigated by the user to show where the user carrying the device is positioned. The map shown in the bottom half of the figure is not actually displayed on the screen of the device.

The first and second stages 2005 and 2010 are similar to the first and second stages 1905 and 1910 described above by reference to FIG. 19. The second stage 2010, however, shows that the integrated application plays back a short audible notification (e.g., "ding") as the integrated application causes the device to make a first vibration combination to remind the user to make the left turn.

The third and fourth stages 2015 and 2020 are similar to the third and fourth stages 1915 and 1920 described above by reference to FIG. 19. The fourth stage 2020, however, shows that the integrated application plays back a different short audible notification (e.g., "dong") as the integrated application causes the device to make a second different vibration combination to remind the user to make the right turn.

7. All Audible Notifications When the Screen is Off

Figure 21:
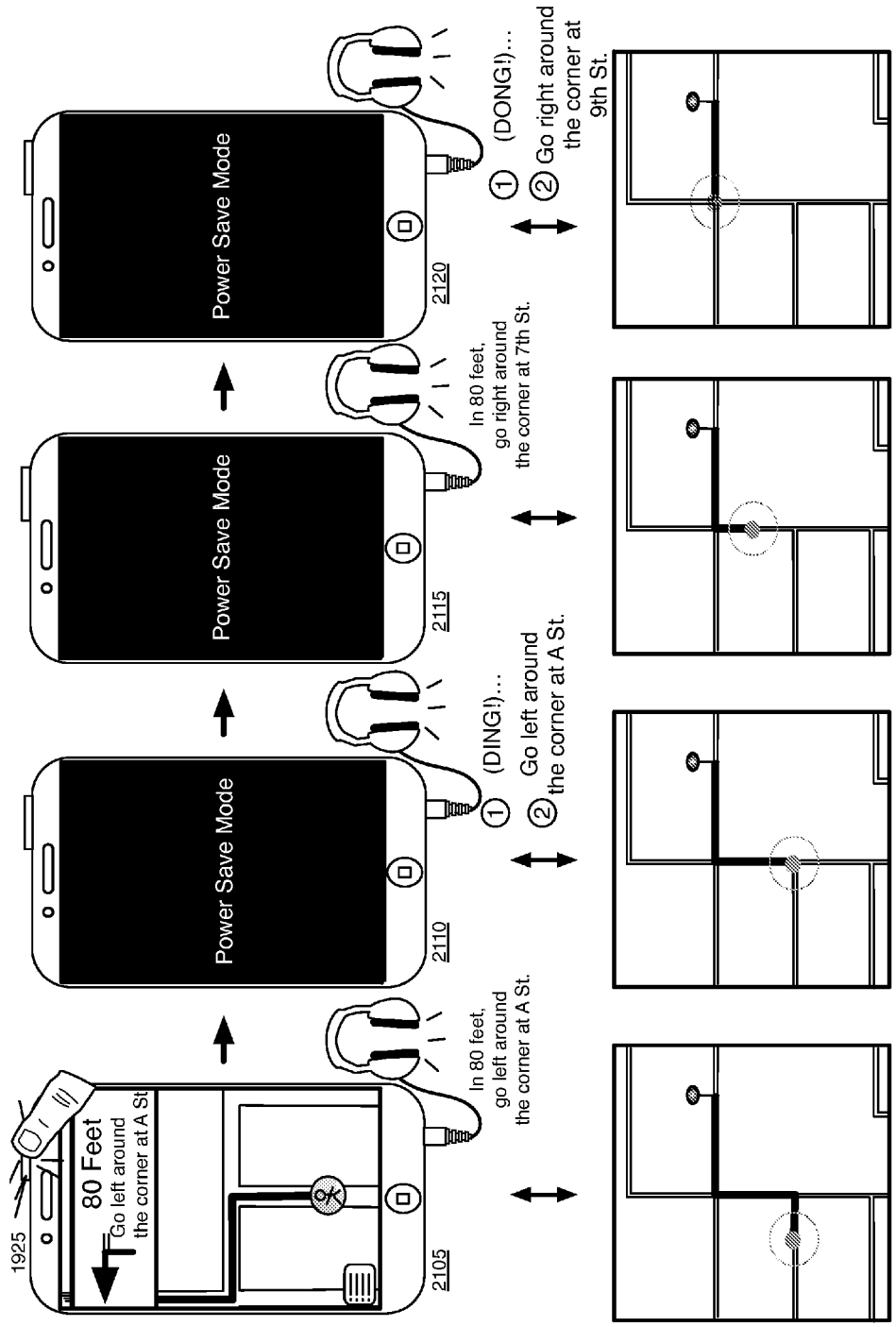
FIG. 21 illustrates that the integrated application provides audible notifications when the screen of the device on which the integrated application executes is turned off.

FIG. 21 illustrates in terms of four stages 2105-2120 that the integrated application provides audible notifications when the screen of the device on which the integrated application executes is turned off. When the screen is turned off, the integrated application of some embodiments does not provide any audible notifications. The integrated application of these embodiments provides the audible notifications only if the device on which the integrated application runs is connected to an audio output apparatus other than the device's own speaker(s). The top half of this figure shows the device in the four stages 2105-2120. The bottom half of this figure illustrates the map and the route that is being navigated by the user to show where the user carrying the device is positioned. The map shown in the bottom half of the figure is not actually displayed on the screen of the device.

The first stage 2105 shows that the integrated application is in the pedestrian mode, displaying a navigation instruction and a map view for the current position of the user on the route being navigated. The map illustrated below the device at this stage 2105 shows the current position of the user and the destination of the route. At the first stage 2105, the user is within the first threshold distance from the location for a turn. The first stage 2105 also shows that a headset that the user is using is connected to the device. The integrated application of some embodiments thus reads the navigation instruction for the turn at this stage 2105 through the headset. The first stage 2105 also shows that the user is pressing a control 1925, which when pressed causes the device to turn off the screen.

The second stage 2110 shows that the device has shut off its screen and thus does not display anything. The map illustrated at the bottom half of the figure for this stage 2110 shows that the user came within the second threshold distance from the location for a turn. The integrated application of some embodiment would not play back the second audible notification because the screen is not on. However, because the device is connected to the headset, the integrated application plays back the second audible notification. The integrated application plays back the first short audible sound (e.g., "ding") as the second audible notification because the upcoming turn is a left turn. The integrated application also tells the user to make the turn, as the third audible notification, when the user reaches the location for the turn. The integrated application of some embodiments would not have presented the third audible notification if the headset had not been connected to the device.

The map illustrated at the bottom half of the figure for the third stage 2115 that the user has advanced along the route to another location for another turn. For this turn, the user has reached within the first threshold distance at this stage 2115. Because the headset is connected to the device, the integrated application reads the navigation instruction to the user through the headset.

The map illustrated at the bottom half of the figure for the fourth stage 2120 shows that the user has reached within the second threshold distance from the location for the next turn. The integrated application plays back the second short audible sound (e.g. "dong") as the second audible notification because this turn is a right turn. The integrated application also tells the user to make the right turn, as the third audible notification, when the user reaches the location for the right turn. The integrated application presents the second and third audible notifications because the device is connected to the headset even though the screen of the device is turned off.

FIG. 21 illustrates that the integrated application provides the audible notifications while the device's screen is off because the device is connected to a headset. In some embodiments, the integrated application still provides the audible notifications when the device's screen is turned off even when no audio output apparatus is attached to the device. Specifically, when the navigation application is in the driving mode, the navigation application provides all of the audible notifications for a turn regardless of whether the application is running in the foreground or in the background and regardless of whether the screen of the device is turned on or off.

8. Process

Figure 22:
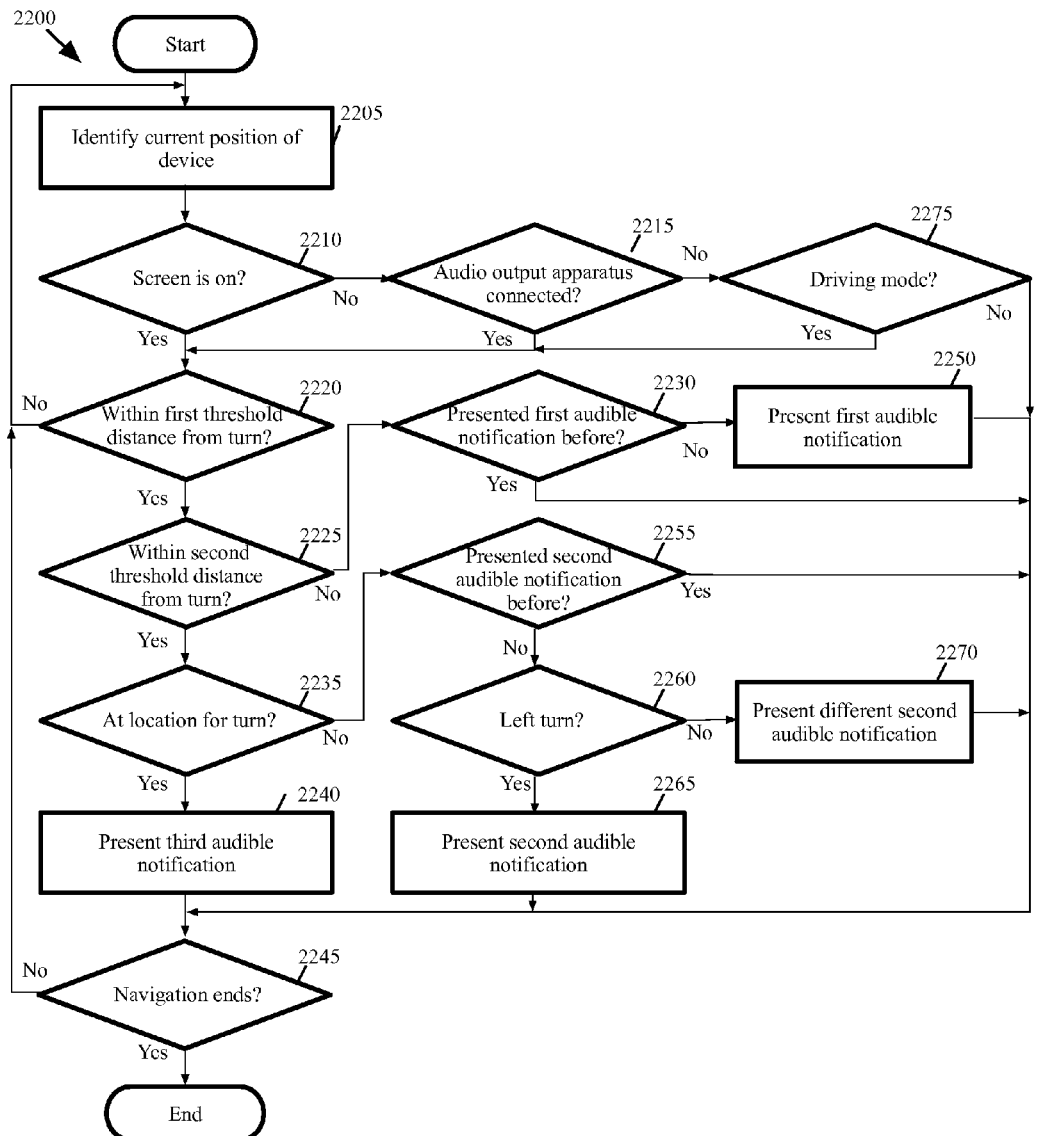
FIG. 22 conceptually illustrates a process performed by the integrated application of some embodiments to provide notifications to the user.

FIG. 22 conceptually illustrates a process 2200 performed by the integrated application of some embodiments to provide notifications to the user. The process 2200 of some embodiments starts when the integrated application is in a navigation mode (e.g., the pedestrian mode) to present the navigation instructions and the map views for a route to a destination that is being traveled by the user.

The process 2200 begins by identifying (at 2205) the current position of the device in the map. Different embodiments use different techniques to identify the current position of the device. For instance, in some embodiments, the process uses GPS coordinates received through the device's GPS receiver. The process may also utilize the Wi-Fi triangulation technique to identify the current position of the device.

Next, the process 2200 determines (at 2210) whether the screen of the device on which the integrated application executes is on. When the process 2200 determines (at 2210) that the integrated application is on, the process 2200 proceeds to 2220, which is described further below. When the process 2200 determines (at 2210) that the screen of the device is turned off, the process 2200 determines (at 2215) whether an audio output apparatus other than the device's speaker(s) is connected to the device. The audio output apparatuses include earphones, headphone and speakers of wired and wireless kinds in some embodiments. The process 2200 determines (at 2215) whether such audio output apparatus is connected to device because the process can present the audible notifications to the user through the audio output apparatus even if the device's screen is turned off.

When the process 2200 determines (at 2215) that an audio output apparatus other than the device's speaker(s) is connected to the device, the process 2230 proceeds to 2220, which is described further below. When the process 2200 determines (at 2215) that no audio output apparatuses other than the device's speaker(s) are connected to the device, the process 2200 determines (at 2275) whether the integrated application is in the driving mode.

When the process 2200 determines (at 2275) that the integrated application is not in the driving mode, the process 2200 proceeds to 2245, which is described further below. When the process 2200 determines (at 2275) that the integrated application is in the driving mode, the process 2200 proceeds to 2220.

At 2220, the process 2200 determines whether the current position of the device is within a first threshold distance from a location at which the user is to make a turn. The first threshold distance is for determining whether the current position is close enough to the location for the integrated application to notify the user of the turn. The first threshold distance is preconfigured for the integrated application or the integrated application lets the user to provide the first threshold distance. When the integrated application is in the pedestrian mode, the first threshold distance is set to a distance (e.g., 80 feet) that is suitable for to giving the first notification to a walking user. When the integrated application is in the pedestrian mode, the first threshold distance is set to a distance (e.g., 1 mile) that is suitable for to giving the first notification to a driving user.

When the process 2200 determines (at 2220) that the current position of the device is not within the first threshold distance from the location for the turn, the process 2200 loops back to 2205 to identify the updated current position of the device. When the process 2200 determines (at 2220) that the current position of the device is within the first threshold distance from the location for the turn, the process 2200 determines (at 2225) whether the current position of the device is within a second threshold distance from the location for the turn. The second threshold distance is for determining whether the current position is close enough to the location for the integrated application to notify the user of the imminent turn. The second threshold distance is preconfigured for the integrated application or the integrated application lets the user to provide the second threshold distance. In some embodiments, the second threshold distance is much shorter than the first threshold distance to determine the imminence of the upcoming turn. When the integrated application is in the pedestrian mode, the second threshold distance is set to a distance (e.g., 5 feet) that is suitable for to giving the second notification to a walking user. When the integrated application is in the pedestrian mode, the second threshold distance is set to a distance (e.g., 500 feet) that is suitable for to giving the second notification to a driving user.

When the process 2200 determines (at 2225) that the current position is within the second threshold distance, the process 2200 proceeds to 2235, which is described further below. When the process 2200 determines (at 2225) that the current position is not within the second threshold distance, the process determines (at 2230) whether a first audible notification has been previously presented to the user. When the process 2200 determines (at 2230) that the first audible notification has been previously presented to the user, the process 2200 proceeds to 2245, which is described further below. When the process 2200 determines (at 2230) that the first audible notification has not been previously presented to the user, the process 2200 presents (at 2250) the first audible notification to the user. This is because at this point, the current position is within the first threshold distance from the location for the turn but is not yet within the second threshold distance from the location for the turn and the first audible notification has not been previously presented to user. In some embodiments, the first audible notification is an audible recitation of the navigation instruction for the current position of the device (e.g., "In 80 feet, go left around the corner at A St.").

When the process 2200 determines (at 2225) that the current position is within the second threshold distance, the process 2200 determines (at 2235) whether the current position is at the location for the turn (i.e., whether the device has reached the location for the turn).

When the process 2200 determines (at 2235) that the current position is at the location for the turn, the process 2200 proceeds to 2240, which is described further below. When the process 2200 determines (at 2235) that the current position is not at the location for the turn, the process determines (at 2255) whether a second audible notification has been previously presented to the user. The process checks whether the second audible notification has been previously given, because at this point the current position is within the second threshold distance from the location for the turn but is not yet at the location for the turn.

When the process 2200 determines (at 2255) that the second audible notification has been previously presented to the user, the process 2200 proceeds to 2245, which is described further below. When the process 2200 determines (at 2255) that the second audible notification has not been previously presented to the user, the process 2200 determines (at 2260) whether the turn is a left turn or a right turn.

When the process 2200 determines (at 2260) that it is a right turn to make, the process 2200 presents (at 2265) a second audible notification (e.g. a short audible sound such as "ding"). When the process 2200 determines (at 2260) that the turn is not a left turn (i.e., the turn is a right turn), the process 2200 presents (at 2270) a different second audible notification (e.g. a short audible sound such as "dong"). The process 2200 then proceeds to 2245, which is described further below.

When the process 2200 determines (at 2235) that the current position is at the location for the turn, the process 2200 presents (at 2240) a third audible notification to the user. In some embodiments, the third audible notification just tells the user to make the turn because the user has reached the location for the turn.

Next, the process 2200 determines (at 2245) whether the navigation of the route has ended. Different embodiments end the navigation of the route differently. For instance, in some embodiments, the integrated application ends the navigation when the integrated application receives a selection of an end control while the route is being navigated. The integrated application may also end the navigation of the route when the user reaches the destination of the route. When the process 2200 determines (at 2245) that the navigation of the route has not ended, process 2200 loops back to 2205 to identify the updated current position of the device. Otherwise, the process 2200 ends.

The specific operations of the process 2200 may not be performed in the exact order shown and described. Also, not all of operations of the process 2200 have to be performed in some embodiments. For instance, the process 2200 of some embodiments do not perform at least one of the operations 2250, 2270, and 2265. That is, the integrated application of some embodiments that performs the process 2200 do not have to present all of the first, second, and third notifications.

C. Volume Control and Audio Output Selection

Figure 23:
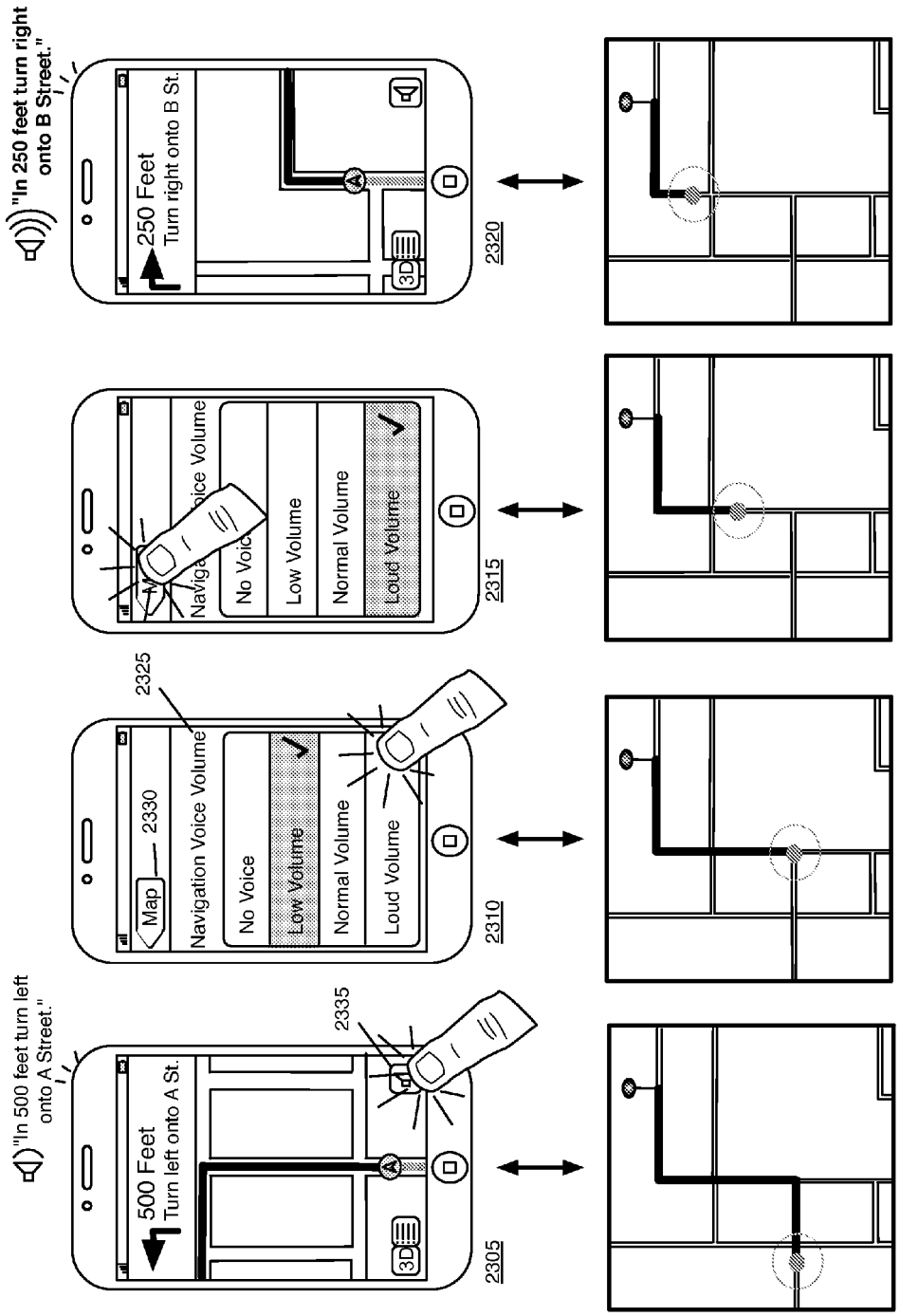
FIG. 23 illustrates an example of a UI page of the integrated application of some embodiments that allows the user to change volume level for the audible notifications.

FIG. 23 illustrates in terms of four stages 2305-2320 an example of a UI page of the integrated application of some embodiments that allows the user to change volume level for the audible notifications that the integrated application plays back during a navigation mode. The top half of this figure shows the device in the four stages 2305-2320. The bottom half of this figure illustrates the map and the route that is being navigated by the user to show where the user carrying the device is positioned. The map shown in the bottom half of the figure is not actually displayed on the screen of the device.

The first stage 2305 shows that the integrated application is in the driving mode, displaying a navigation instruction and a map view. The integrated application also displays a floating control 2335 in the map view while the integrated application is in a navigation mode. In some embodiments, the floating control 2335, when selected, cause the integrated application to display a UI page for allowing the user to change volume settings for the audible notifications. At the first stage 2305, the user selects the floating control 2335. The integrated application also plays back the current navigation instruction through the speaker(s) of the device at a low volume level that is represented by a speaker symbol with a single curved line depicted at the first stage 2305.

The second stage 2310 shows that the integrated application displays a UI page 2325 in response to the selection of the floating control 2335 at the previous stage 2305. The UI page 2325 of some embodiments includes a list of selectable volume levels for the audible notifications played back during a navigation mode. In this example, different volume levels that are listed in the UI page 2325 include four different levels of volume—a no volume (mute) and low, medium and high volume levels dubbed as "No Voice," "Low Volume," "Normal Volume," and "Loud Volume," respectively. The UI page 2325 also includes a return control 2330, which when selected causes the integrated application to close the UI page 2325 and display the map view for the navigation mode. At the second stage 2310, the UI page 2325 indicates that the volume level is set to the low volume level. The second stage 8210 also shows a selection of the loud volume level.

The third stage 2315 shows that the volume level is set to the high volume level as a result of a selection made at the previous stage 2310. At the third stage 2315, the user selects the return control 2330. The fourth stage 2320 shows that the integrated application displays the map view in response to the selection of the return control 2330 at the previous stage 2315. The integrated application also plays back the navigation instruction for the current position of the user on the route at the high volume level, as represented by a speaker symbol with the three curved lines depicted at the fourth stage 2320.

Figure 24:
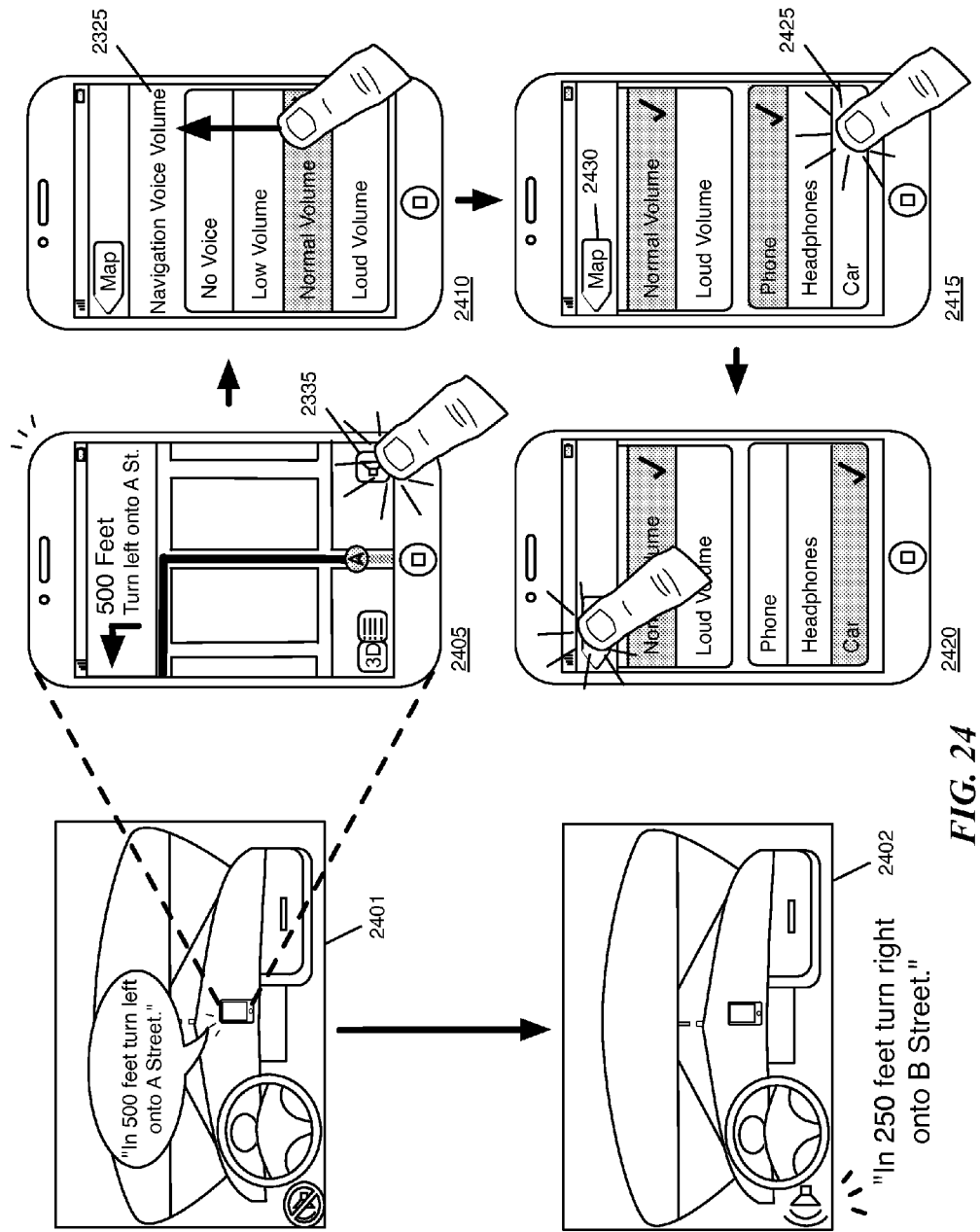
FIG. 24 illustrates that the integrated application allows the user to send the audible notifications to an audio output apparatus.

FIG. 24 illustrates in terms of four stages 2405-2420 that the integrated application allows the user to send the audible notifications to an audio output apparatus. In some embodiments, the device on which the integrated application runs communicatively connects (e.g., through the Bluetooth technology) to one or more audio output apparatuses. When the device is connected to the audio output apparatuses, the integrated application of some embodiments allows the user to select an audio output apparatus from the connected audio output apparatuses. The integrated application presents the audible notifications through the selected audio output apparatus.

The first stage 2405 shows that the integrated application is in the driving mode, displaying a navigation instruction and a map view. A scene 2401 that is depicted on the left side of the first stage 2405 in this figure conceptually shows that the integrated application is providing an audible notification through the speaker(s) of the device at the first stage

2405. The integrated application displays the floating control 2335 in the map view. The user selects the floating control 2335.

The second stage 2410 shows that the integrated application displays the UI page 2325 in response to the selection of the floating control 2335 at the previous stage 2405. As described above by reference to FIG. 82, the UI page 2325 of some embodiments includes a list of selectable volume levels for the audible notifications played back during a navigation mode. At the second stage 2310, the UI page 2325 indicates that the volume level is set to the medium volume level. In some embodiments, the UI page 2325 includes other UI items for setting other attributes of the audible notifications. The UI page 2325 in some of these embodiments is scrollable and reveals these other UI items when scrolled. At the second stage, the user scrolls up the UI page 2325.

The third stage 2415 illustrates the additional UI items of the UI page 2325 for the audio output apparatuses through which to present the audible notifications. As shown, one UI item is for selecting the device's own speaker(s). Another UI item is for selecting the headphones that are connected to the device. Another UI item 2425 is for sending the audible notifications to the car's speaker(s). In some embodiments, the integrated application displays these UI items dynamically. That is, the integrated application displays these UI items only for the audio output apparatuses that are currently connected to the device. That is, in this example, the toggle button for sending the audible notifications to the car speaker(s) would not appear in the UI page 2325 when the device is not connected to the car speaker(s). At the third stage 2415, the user selects the UI item 2425 to select the car speaker(s).

The fourth stage 2420 shows that the integrated application displays the map view in response to the selection of the return control 2330. The integrated application plays back the navigation instruction for the current position of the user on the route through the car's speaker(s) as shown in a scene 2402 that is depicted on the left side of the fourth stage 2420 in this figure.

Having described presenting different notifications for different positions in a route, the next Section III describes switching between different navigation modes.

III. Switching Between Different Navigation Modes

As described above, the integrated application of some embodiments have different navigation modes to present the navigation instructions and the map views differently. This section describes detecting user activity, finding routes based on the detected user activity, and automatically or manually switching between navigation modes based on the user activity detected while navigating a route.

A. Finding Routes Based on User Activity

Figure 25:
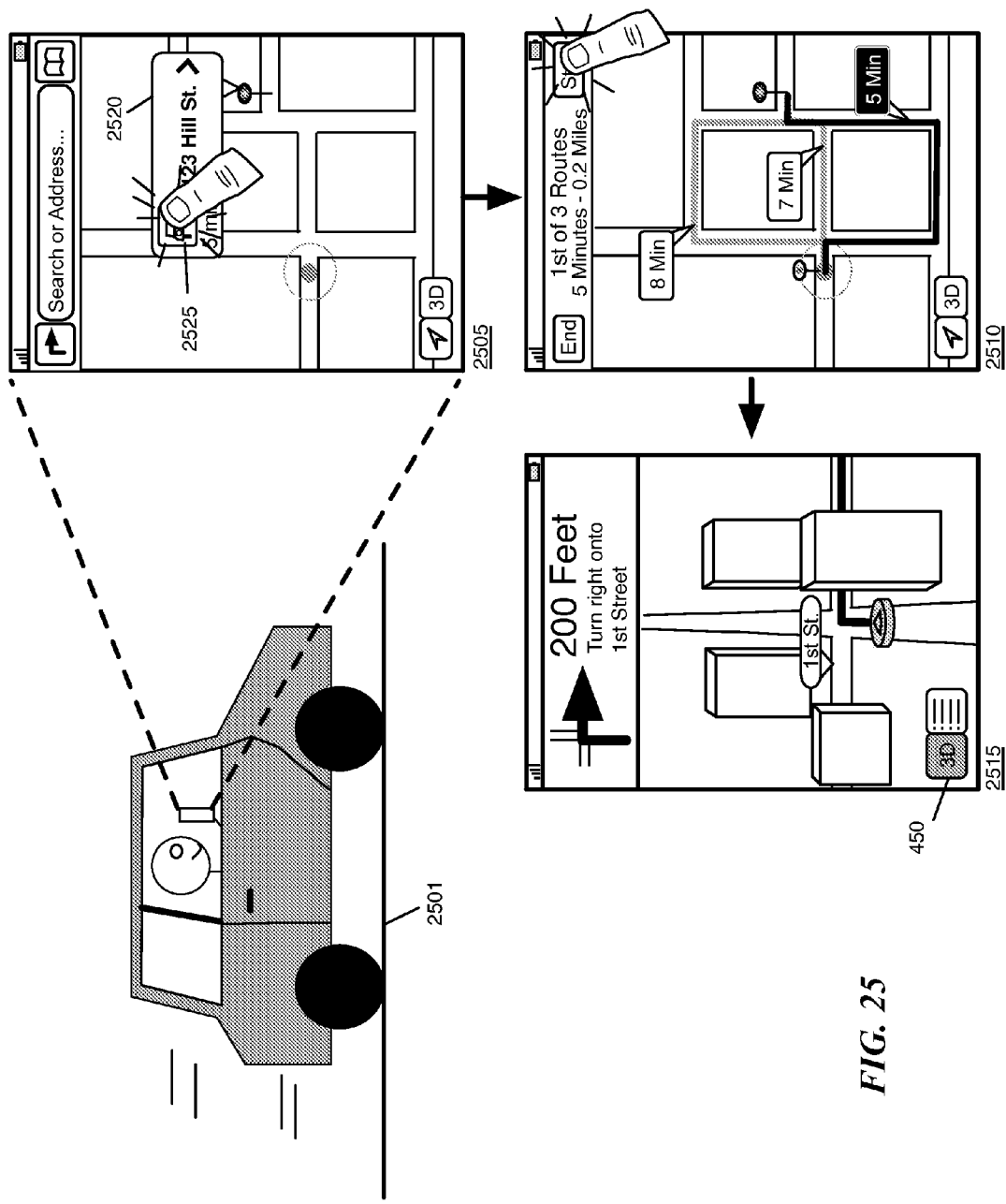
FIG. 25 illustrates an example of the integrated application that detects the activities of the user of the device and provides routes suitable for the detected activities.

FIG. 25 illustrates in terms of three stages 2505-2515 an example of the integrated application that detects the activities of the user of the device on which the integrated application is running and provides routes suitable for the detected activities. In some embodiments, the integrated application determines the activities that the user is performing, based on the motion data supplied by a set of detection apparatuses of the device. For instance, the integrated application determines that the user is driving when the motion data indicates that the device is moving faster than a threshold speed (e.g., five miles per hour). The integrated application determines that the user is walking when the motion data indicates that the device is moving slower than a threshold speed or that the device's vertical distance with respect to the ground is fluctuating. In some embodiments, the detection apparatuses of the device include one or more of an accelerometer, a gyroscope, a magnetometer, a GPS receiver, etc.

The first stage 2505 shows that the integrated application displays an informational banner 2520 for a location in the map. As mentioned above, an informational banner for a location displays various information, including an estimated amount of time to arrive at the location by certain means of transportation and a selectable icon that represents the means of transportation. As shown, the informational banner 2520 includes a selectable icon 2525, which when selected causes the integrated application to provide one or more routes to the destination from the current position of the user.

A scene 2501 depicted on the left side of the first stage 2505 shows that the user is driving in a car at the first stage 2505. The detection apparatuses of the device generate various motion data including proper acceleration, orientation and/or the direction of the magnetic field with respect to the device as the device is moving. The detection apparatuses supply these motion data to the integrated application periodically or the integrated application polls the detection apparatuses to get the motion data periodically. Based on the motion data, the integrated application at the stage 2505 determines that the user is driving. The integrated application of some embodiments presents driving routes only when the determined user activity is driving. The integrated application does not present routes for other means of transportation whether the default means of transportation is set to driving or not, because the determined user activity is driving in a car.

The second stage 2510 shows that the integrated application presents driving routes only. This is because the integrated application determined at the previous stage 2505 that the user is driving. The integrated application has also selected the route that takes five minutes to arrive at the destination, by default. The second stage 2510 also shows user's selection of the start control to direct the integrated application to enter a navigation mode. In some embodiments, the integrated application can be configured to show only driving routes.

The third stage 2515 shows that the integrated application enters the driving mode for the selected route, in response to the user's selection of the start control at the previous stage 2510. The 3D control 450 is depicted in grey in this example to indicate that the map view is in 3D because in some embodiments the integrated application presents the map view in 3D when the integrated application is in the driving mode.

Figure 26:
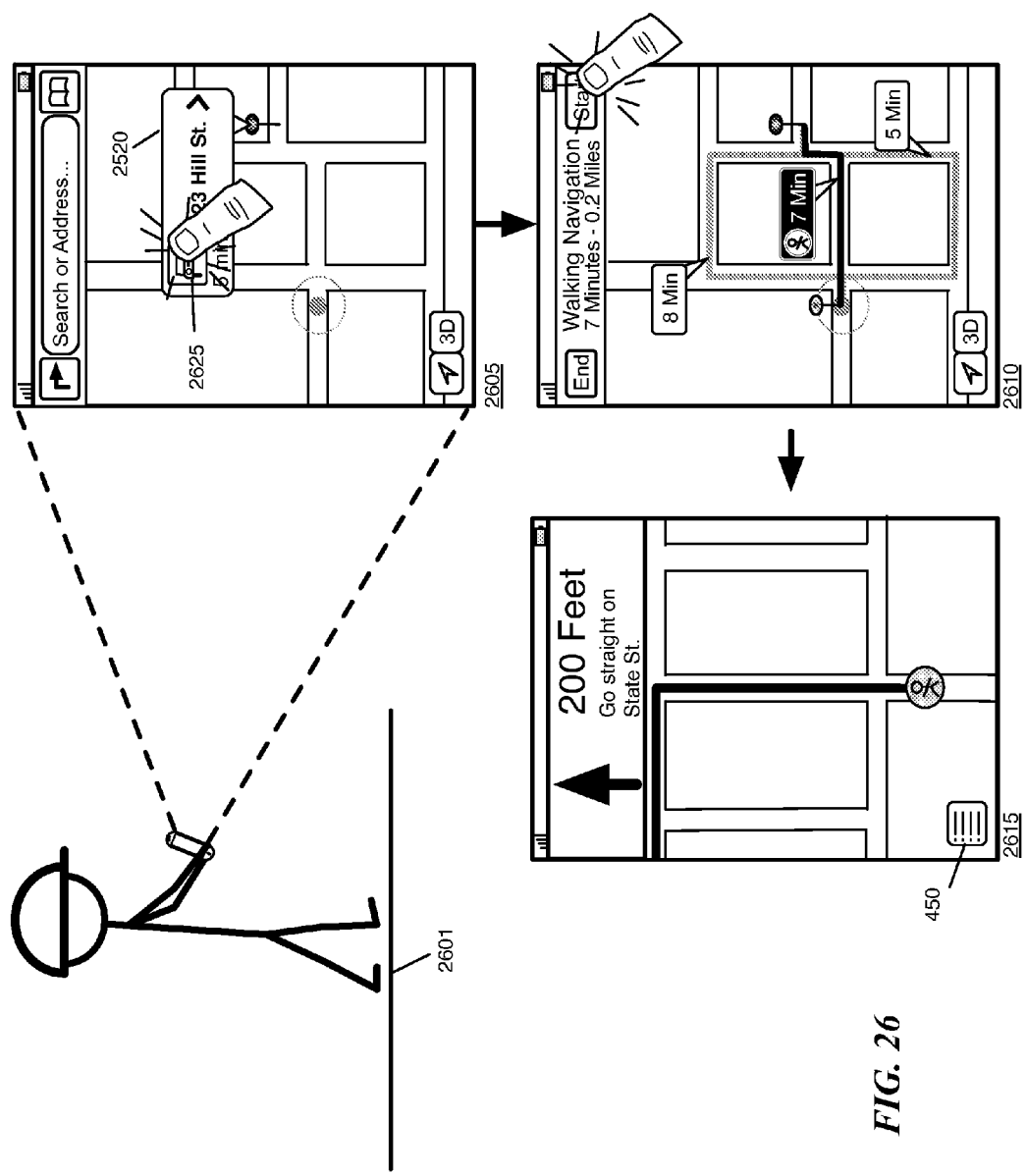
FIG. 26 illustrates an example of the integrated application that detects the activities of the user of the device and provides routes suitable for the detected activities.

FIG. 26 illustrates in terms of three stages 2605-2615 an example of the integrated application that detects the activities of the user of the device on which the integrated application is running and provides routes suitable for the detected activities. When the detected user activities is walking, the integrated application of some embodiments presents walking routes as well as driving routes to a destination location even if the default means of transportation is set to driving.

At the first stage 2605, the default means of transportation for presenting the routes to the user is driving. An informational banner 2620 that the integrated application displays for a destination location in the map includes a selectable icon 2625. The selectable icon 2625 indicates that the default means of transportation is driving and the informational banner indicates that it takes five minutes to arrive at the location by car.

A scene 2601 depicted on the left side of the first stage 2605 shows that the user carrying the device is walking on the street. Based on the motion data received from the set of detection apparatuses, the integrated application at the stage 2605 determines that the user is walking. The integrated application of some embodiments presents walking routes in addition to driving routes when the determined user activity is walking and the default means of transportation is set to driving.

The second stage 2610 shows that the integrated application presents walking and driving routes to the destination location. The integrated application of some embodiments also selects a walking route when the determined user activity is walking. As shown, the walking route that takes seven minutes to the destination is selected instead of the other two driving routes including the routes that take a less amount of time to the destination. The third stage 2615 shows that the integrated application enters the pedestrian mode for the selected route, in response to the user's selection of the start control at the previous stage 2610.

B. Finding Routes Based on Proximity of Destination to Current Position

Figure 27:
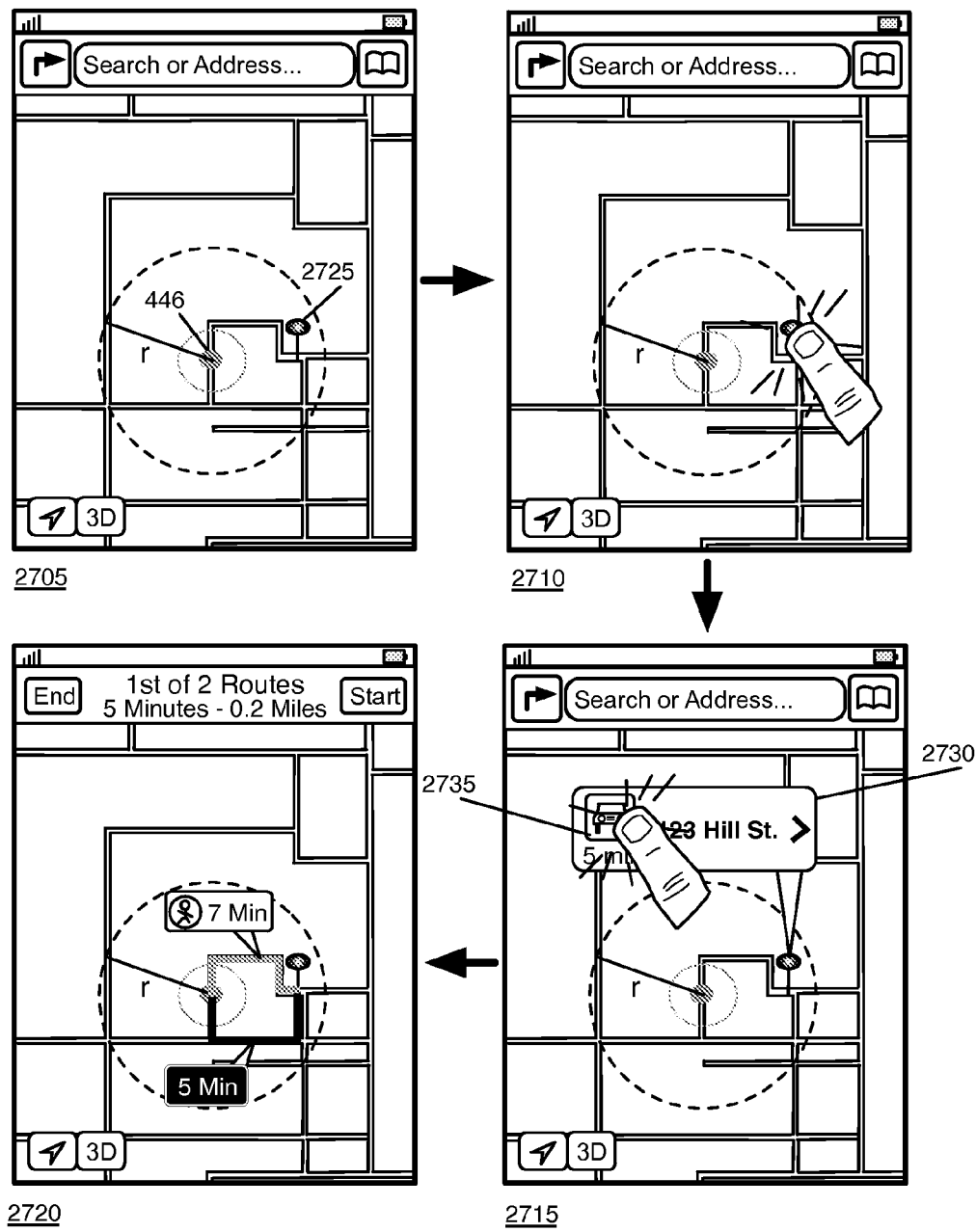
FIG. 27 illustrates an example of the integrated application that presents a set of routes to a destination location based on the distance to the destination location.

FIG. 27 illustrates in terms of four stages 2705-2720 an example of the integrated application that presents a set of routes to a destination location based on the distance to the destination location from the current position of the user. The user is carrying the device on which the integrated application runs. In some embodiments, the integrated application provides walking routes to the destination location when the destination location is within a threshold distance (e.g., five miles) from the current position of the user, whether or not the default means of transportation is set to walking.

The first stage 2705 shows that the integrated application displays a pin 2725 that represents a location in the map displayed by the integrated application. As mentioned above, the integrated application of some embodiments displays a number of pins on different locations of the map as a result of running a search on the map. A current position indicator 446 indicates the current position of the device on which the integrated application executes.

The dotted circle depicted at the first stage 2710 represents an area that falls within a threshold distance from the current position of the user. The solid line labeled with an "r" represents the radius of the dotted circle. The integrated application of some embodiments does not actually display the dotted circle and the solid line in the map view. As shown at the first stage 2705, the pin 2725 is within the threshold distance from the current position of the user because the pin 2725 is within the dotted circle.

The second stage 2710 shows that the user selects the pin 2725. At the next stage 2715, the default means of transportation for presenting the routes to the user is driving. An informational banner 2730 that the integrated application displays for the pin 2725 in the map includes a selectable icon 2735. The selectable icon 2735 indicates that the default means of transportation is driving and the informational banner indicates that it takes five minutes to arrive at the location by car.

The fourth stage 2720 shows that the integrated application presents walking and driving routes to the destination location. The fourth stage 2720 also shows that the integrated application has selected the driving route by default because that route takes the least amount of time to arrive at the destination location.

Figure 28:
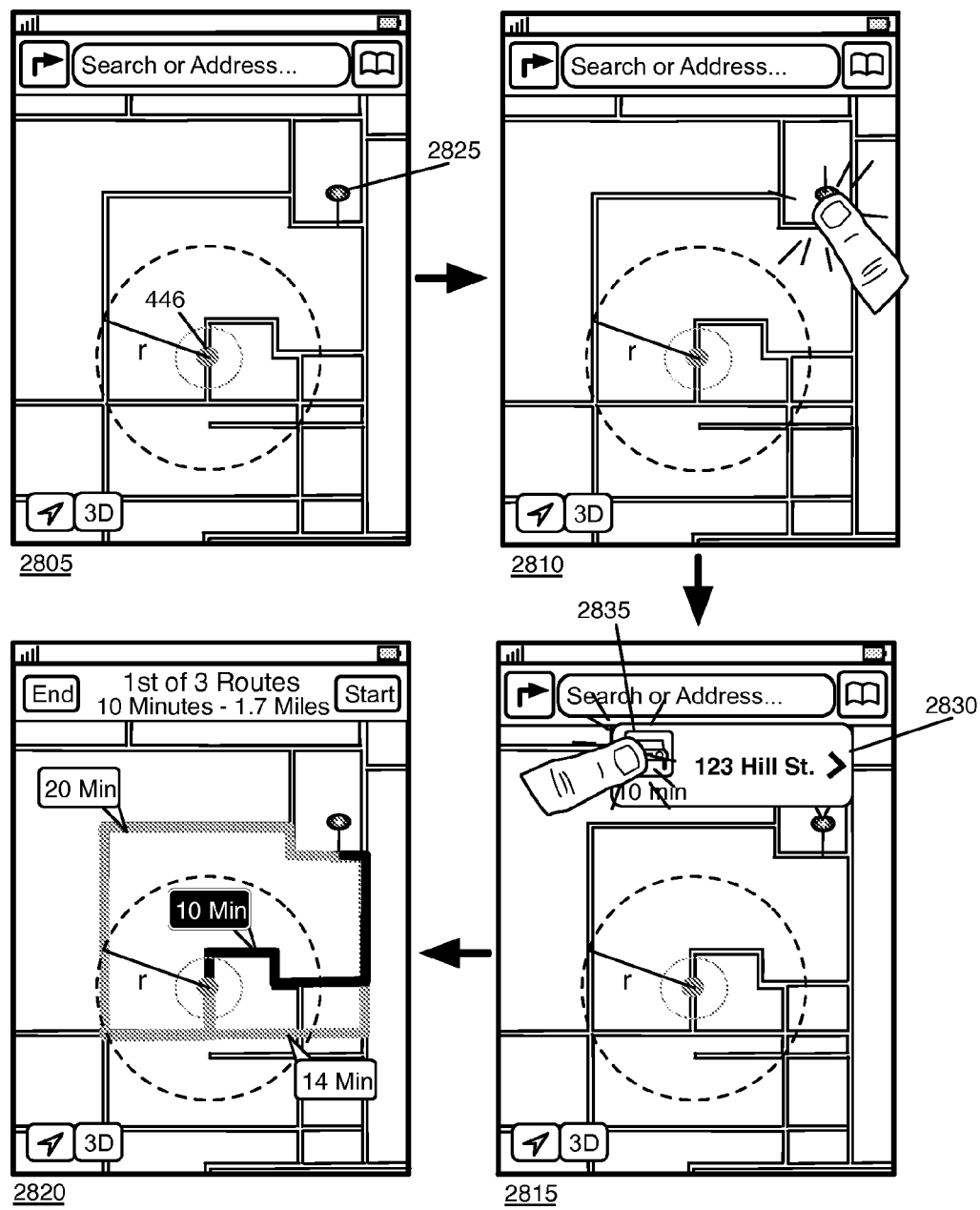
FIG. 28 illustrates an example of the integrated application that presents a set of routes to a destination location based on the distance to the destination location.

FIG. 28 illustrates in terms of four stages 2805-2820 an example of the integrated application that presents a set of routes to a destination location based on the distance to the destination location from the current position of the user. The user is carrying the device on which the integrated application runs. In some embodiments, the integrated application does not present walking routes when the destination location is not within a threshold distance (e.g., five miles) from the current position of the user.

The first stage 2805 shows that the integrated application displays a pin 2825 that represents a location in the map displayed by the integrated application. As mentioned above, the integrated application of some embodiments displays a number of pins on different locations of the map as a result of running a search on the map. A current position indicator 446 indicates the current position of the device on which the integrated application executes.

The dotted circle depicted at the first stage 2805 represents an area that falls within a threshold distance from the current position of the user. The solid line labeled with an "r" represents the radius of the dotted circle. The integrated application of some embodiments does not actually display the dotted circle and the solid line in the map view. As shown at the first stage 2805, the pin 2825 is not within the threshold distance from the current position of the user because the pin 2825 is not within the dotted circle.

The second stage 2810 shows that the user selects the pin 2825. At the next stage 2815, the default means of transportation for presenting the routes to the user is driving. An informational banner 2830 that the integrated application displays for the pin 2825 in the map includes a selectable icon 2835. The selectable icon 2835 indicates that the default means of transportation is driving and the informational banner indicates that it takes ten minutes to arrive at the location by car. The fourth stage 2815 shows that the integrated application presents only the driving routes to the destination location.

Figure 29:
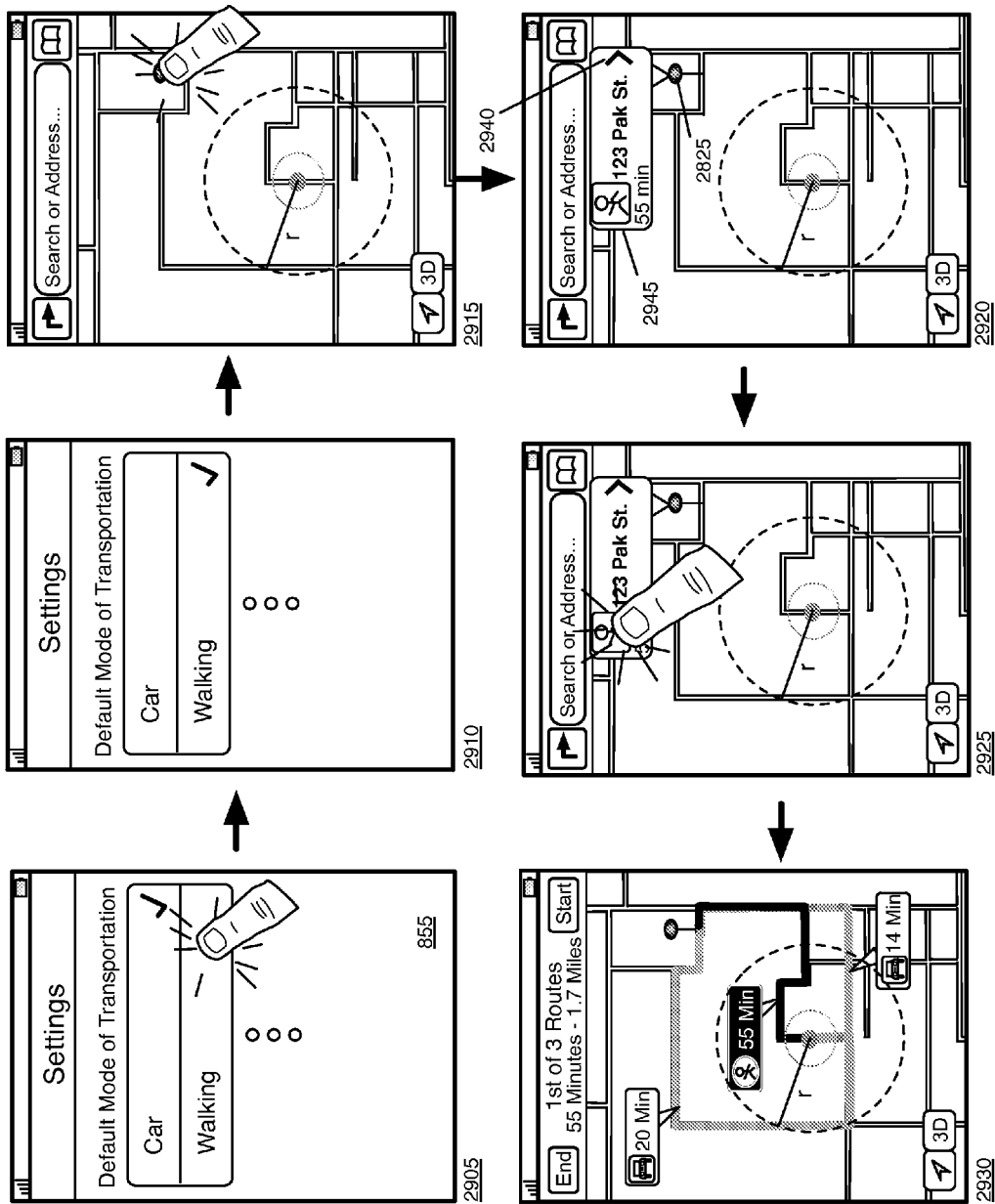
FIG. 29 illustrates an example of the integrated application that presents a set of routes to a destination location based on the distance to the destination location.

FIG. 29 illustrates in terms of six stages 2905-2930 an example of the integrated application that presents a set of routes to a destination location based on the distance to the destination location from the current position of the user. The user is carrying the device on which the integrated application runs. In some embodiments, the integrated application provides driving routes as well as walking routes to the destination location when the destination location is not within a threshold distance (e.g., five miles) from the current position of the user even if the default means of transportation is set to walking.

The first stage 2905 shows the UI page 855, which the device displays in response to a selection (not shown) of the integration application. The current default means of transportation is set to driving as indicated by the check mark for "Car." The user selects "Walking" in order to change the default means of transportation from driving to walking. The second stage 2910 shows that the default means of transportation has been changed to walking as indicated by a check mark for "Walking."

The third and fourth stages 2915 and 2920 are similar to the first and second stages 2805 and 2810 of FIG. 28 described above. At the fourth stage 2920, an informational banner 2940 for the pin 2825 in the map includes a selectable icon 2945. The selectable icon 2945 indicates that the default means of transportation is walking. The informational banner indicates that it takes 55 minutes to arrive at the location by car. The fifth stage 2925 shows that the user selects the icon 2945 to cause the integration application to present routes to the destination location (i.e., the pin 2825).

The sixth stage 2930 shows that the integrated application of some embodiments presents both walking and driving routes to the destination location even though the default means of transportation is set to walking. In some embodiments, the integrated application presents one fastest walking route and presents all other routes as driving routes when the destination is not within the threshold distance from the current position. The sixth stage 2930 also shows that the integrated application has selected a walking route by default over the driving routes because this route is the fastest walking route and the default modes of transportation is walking.

Figure 30:
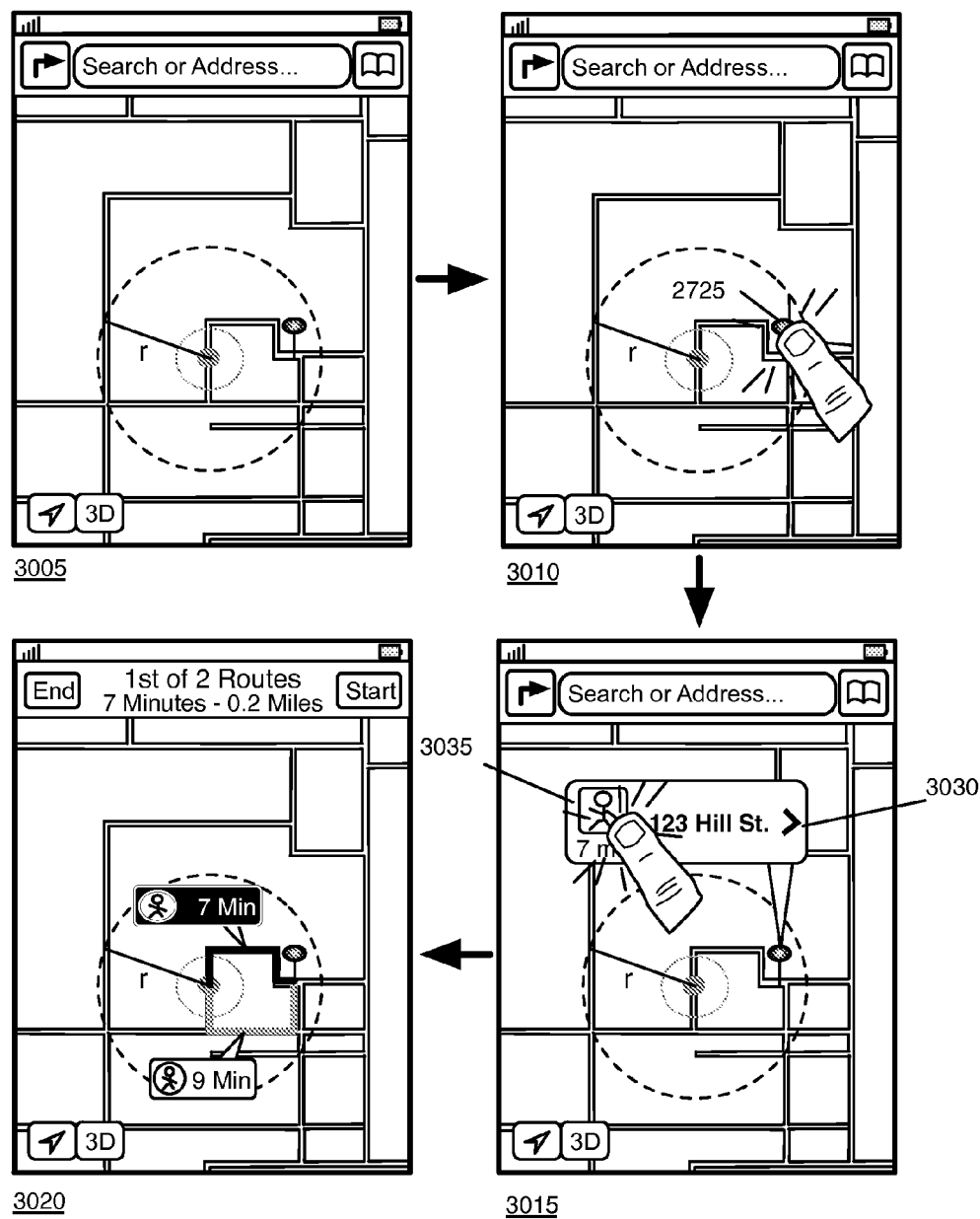
FIG. 30 illustrates an example of the integrated application that presents a set of routes to a destination location based on the distance to the destination location.

FIG. 30 illustrates in terms of four stages 3005-3020 an example of the integrated application that presents a set of routes to a destination location based on the distance to the destination location from the current position of the user. The user is carrying the device on which the integrated application runs. In some embodiments, the integrated application provides only the walking routes to the destination location when the destination location is within a threshold distance (e.g., five miles) from the current position of the user, if the default means of transportation is set to walking.

The first and second stage 3005 and 3010 are similar to the first and second stages 2705 and 2710 of FIG. 27 described above. At the third stage 3015, the default means of transportation for presenting the routes to the user is walking. An informational banner 3030 that the integrated application displays for the pin 2725 in the map includes a selectable icon 3035. The selectable icon 3035 indicates that the default means of transportation is walking and the informational banner indicates that it takes five minutes to arrive at the location by car.

The fourth stage 3020 shows that the integrated application presents walking routes only. The fourth stage 3020 also shows that the integrated application has selected the fastest walking route by default.

FIGS. 27-30 illustrate that the integrated application uses an invisible dotted circle to determine whether a location falls within the threshold distance from the current position of the user. Thus, the threshold distance used by the integrated application is a displacement (i.e., the length of a straight line between the current position and the destination location). However, in some embodiments, the integrated application may use the actual distance (i.e., the length of the route from the current position of the user to the destination location) to determine whether to present walking routes or not.

Figure 31:
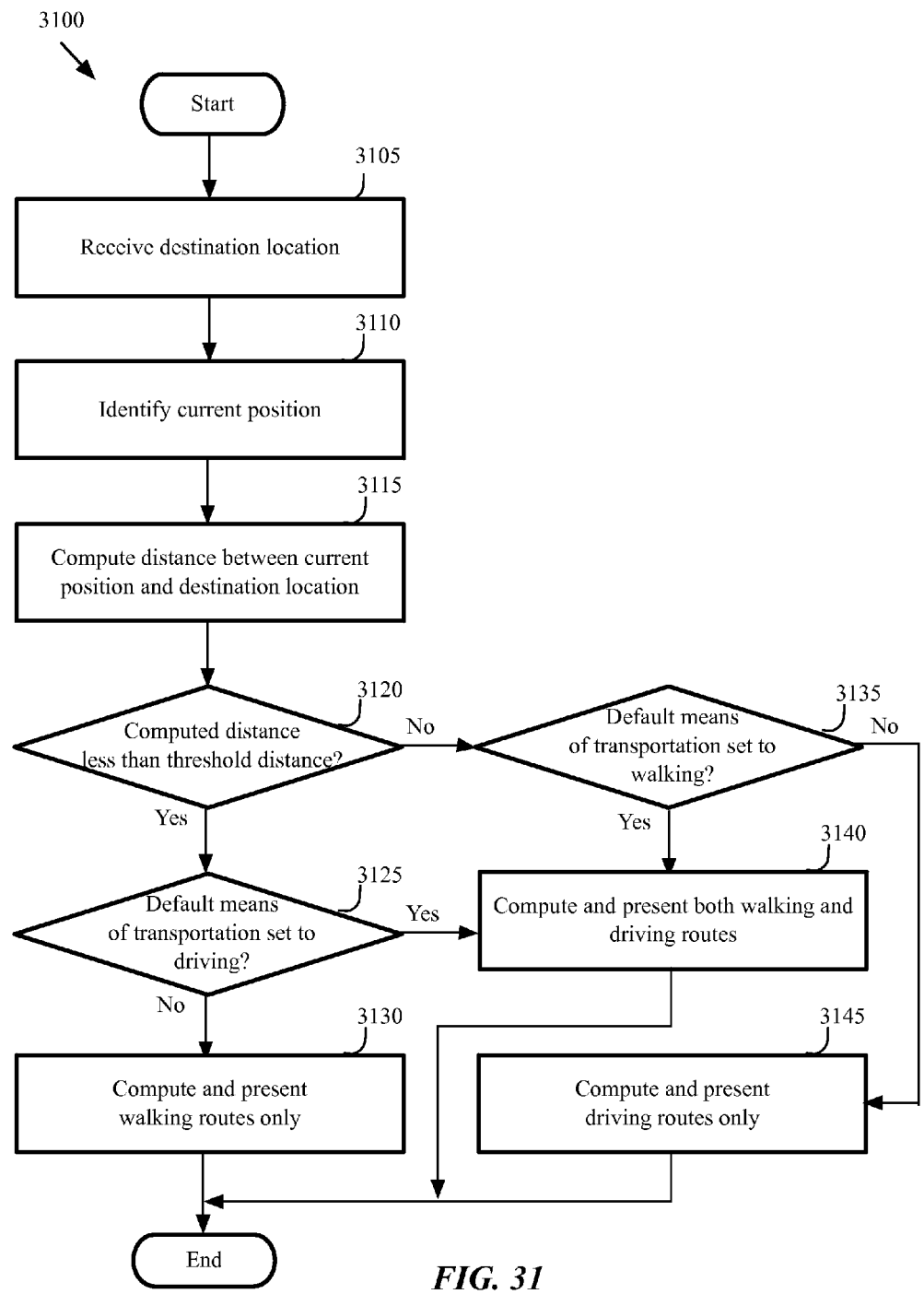
FIG. 31 conceptually illustrates a process performed by the integrated application of some embodiments.

FIG. 31 conceptually illustrates a process 3100 performed by the integrated application of some embodiments. The process 3100 begins by receiving (at 3105) a destination location to compute a set of routes from the current position of the device in the map. The process receives the destination location in several different ways. For instance, the process receives the destination location when the user selects a selectable icon in an informational banner for the destination location in a map. The process may also receive the destination location when the user selects an item in an auto-populated table in a direction-entry page (such as the direction-entry page 455 described above by reference to FIG. 455).

The process 3100 then identifies (at 3110) the current position of the device in the map. Different embodiments use different techniques to identify the current position of the device. For instance, in some embodiments, the process uses GPS coordinates received through the device's GPS receiver. The process may also utilize the Wi-Fi triangulation technique to identify the current position of the device.

Next, the process 3100 computes (at 3115) the distance between the current position and the destination. In some embodiments, the distance the process computes is a displacement. In other embodiments, the distance the process computes is an actual length of the shortest route to the destination location from the current position.

The process 3100 then determines (at 3120) whether the computed distance is less than a threshold distance. The threshold distance is for determining whether the destination is a distance to which is too far for the user to walk. This threshold distance is preconfigured for the integrated application or the integrated application lets the user to provide the threshold distance. In some embodiments, the threshold distance is set to five miles.

When the process 3100 determines (at 3120) that the computed distance is not less than the threshold distance, the process proceeds to 3135, which is described further below. When the process 3100 determines (at 3120) that the computed distance is less than the threshold distance, the process determines (at 3125) whether the default means of transportation for which the integrated application computes the routes is driving. In some embodiments, the integrated application allows the user to change the default means of transportation. The different means of transportation that the process identifies include at least driving and walking in some embodiments.

When the process determines (at 3125) that the default means of transportation is not set to driving, the process computes (at 3130) and presents only the walking routes to the destination location. This is because the integrated application of some embodiments computes and presents only the walking routes to the destination when the distance to the destination is a walking distance and the default means of transportation is not driving. In some embodiments the process computes the routes locally at the device. In other embodiments, the process sends the information about starting and ending locations to a remote server to obtain the routes. The process 3100 ends after 3130.

When the process determines (at 3125) that the default means of transportation is set to driving, the process computes (at 3140) and presents both the walking routes and the driving routes to the destination location. This is because the integrated application of some embodiments provides the walking routes in addition to the driving routes when the distance to the destination is considered a walking distance even if the default means of transportation is set to driving. The process ends after 3140.

When the process 3100 determines (at 3120) that the computed distance is not less than the threshold distance, the process determines (at 3135) whether the default means of transportation for which the integrated application computes the routes is walking. When the process determines (at 3135) that the default means of transportation is set to walking, the process computes (at 3140) and presents both the walking routes and the driving routes to the destination location. This is because the integrated application of some embodiments provides the driving routes in addition to the walking routes when the distance to the destination is not considered a walking distance even if the default means of transportation is set to walking.

When the process determines (at 3135) that the default means of transportation is not set to walking, the process computes (at 3145) and presents only the driving routes to the destination location. This is because the integrated application of some embodiments computes and presents only the driving routes to the destination when the distance to the destination is not considered a walking distance and the default means of transportation is not walking. The process ends after 3145.

C. Prompting User for Switching to Different Navigation Mode

Figure 32:
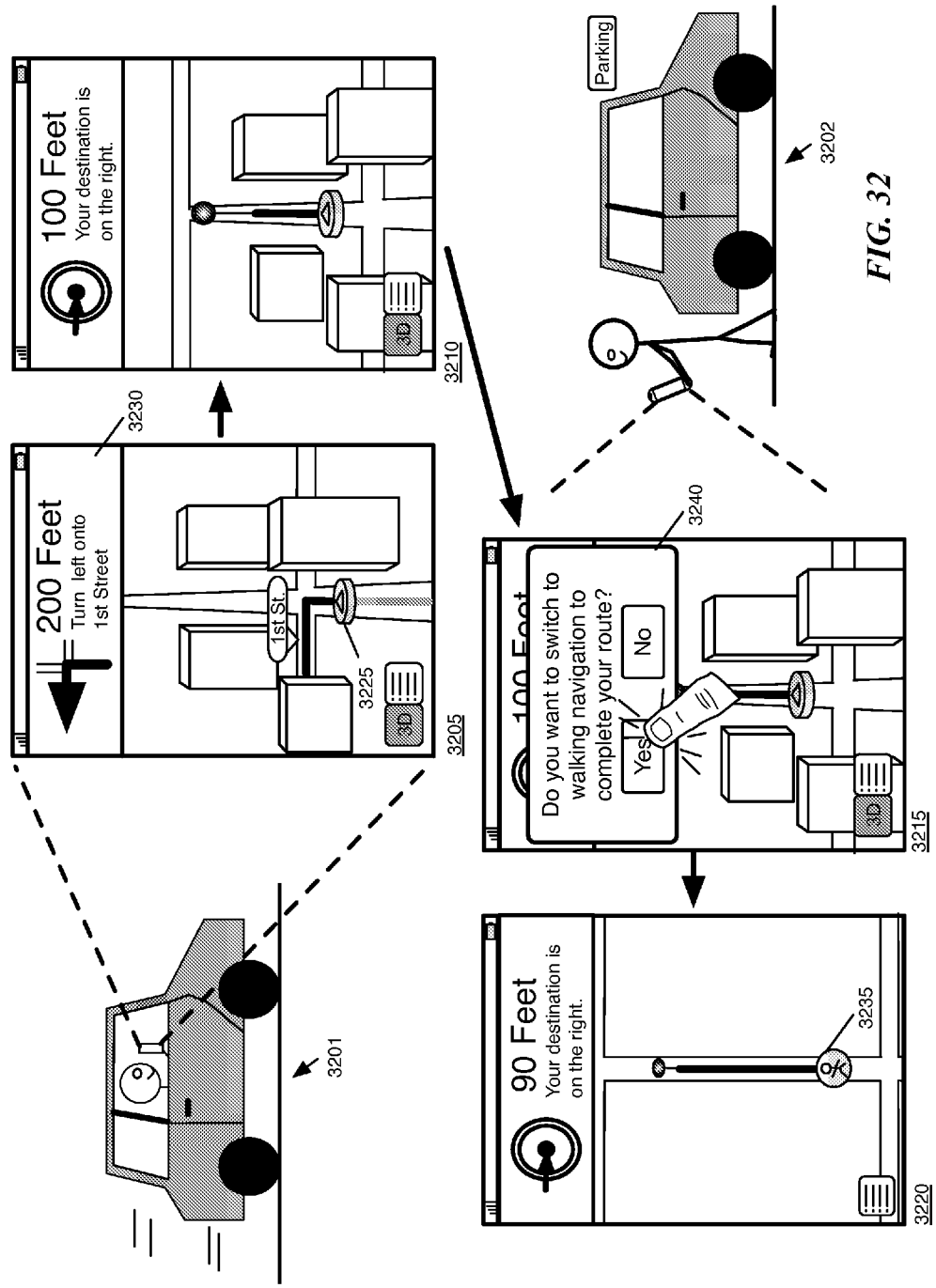
FIG. 32 illustrates an example of the integrated application that switches from one navigation mode to another while a user is traveling along a route to a destination location.

FIG. 32 illustrates in terms of four stages 3205-3220 an example of the integrated application that switches from one navigation mode to another while a user is traveling along a route to a destination location. In some embodiments, the integrated application makes the switch based on the activities of the user and the remaining distance to the destination location of the route from the current position of the user on the route being navigated. The integrated application of some such embodiments switches from the driving mode to the pedestrian mode when the user stops driving and the remaining distance from the current position to the destination location is less than a threshold distance (e.g., 100 feet). In some embodiments, the integrated application offers the user a choice to switch from one navigation mode to another navigation mode.

The first stage 3205 shows that the integrated application displays a navigation instruction for the current position along a route being traveled by the user carrying the device. The current position of the user is represented by the puck 3225. As shown, the integrated application displays the navigation instruction and the map view in the driving mode of some embodiments. That is, the map view is in 3D and the puck 3225 has an appearance for the driving mode. The integrated application displays the navigation instruction in a sign 3230, which indicates that the next turn for the user to make is in 200 feet.

A scene 3201 depicted on the left side of the first stage 3205 shows that the user carrying the device is driving in a car. Based on the motion data received from the set of detection apparatuses, the integrated application at the stage 3205 determines that the user is driving.

The second stage 3210 shows that the user has advanced to a position on the route that is closer to the destination. The sign 3230 at this stage indicates that the user is within 100 feet from the destination. The integrated application is still in the driving mode at this stage 3210.

A scene 3202 depicted below the second stage 3210 shows that the user has parked the car and walks out of the car. As mentioned above, the integrated application receives the motion data periodically. The integrated application at the second stage 3210 determines that the user is no longer driving based on the received motion data.

At the third stage 3215, the integrated application asks the user whether the user wishes to change the navigation mode for the integrated application to the pedestrian mode. Different embodiments differently ask the user whether the user wishes to make the switch differently. For instance, the integrated application of some embodiments uses a pop-up window 3240. The pop-up window 3240 of some embodiments includes several selectable UI items for taking user's answer. The third stage 3215 shows that the user indicates that the user wishes to change the navigation mode to the pedestrian mode.

The fourth stage 3220 shows that the integrated application switches the navigation mode to the pedestrian mode, by displaying the navigation instruction and the map view in 2D mode and using a different puck 3235 that has an appearance for the pedestrian mode. The 3D floating control also has been removed from the map view because the integrated application is in the pedestrian mode in some embodiments.

Figure 33:
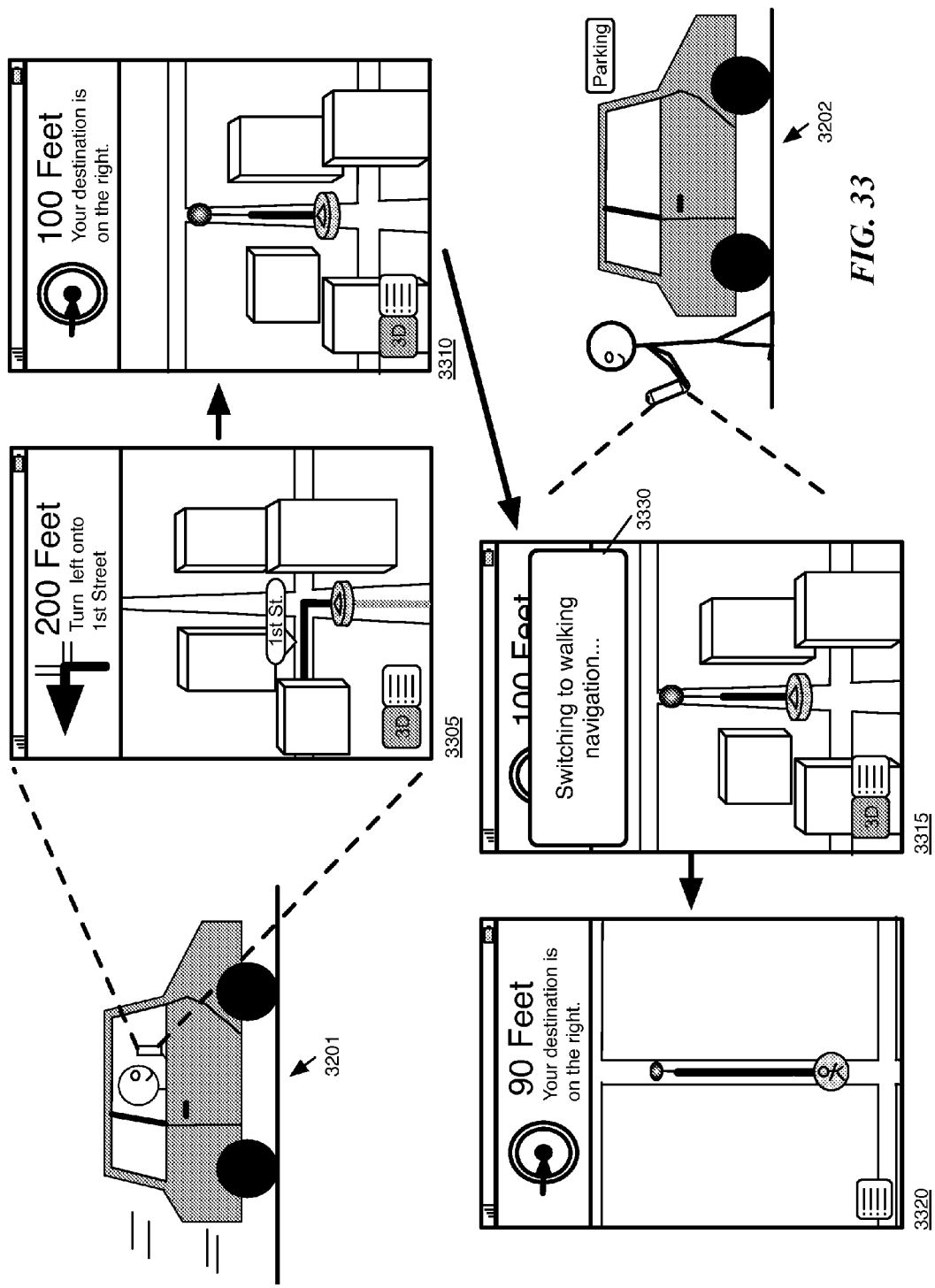
FIG. 33 illustrates an example of the integrated application that automatically switches from one navigation mode to another.

FIG. 33 illustrates in terms of four stages 3305-3320 an example of the integrated application that automatically switches from one navigation mode to another while a user is traveling along a route to a destination location. As mentioned above, the integrated application of some embodiments makes the switch based on the activities of the user and the remaining distance to the destination location of the route from the current position of the user on the route being navigated. The integrated application of some such embodiments automatically switches from the driving mode to the pedestrian mode when the user stops driving and the remaining distance from the current position to the destination location is less than a threshold distance (e.g., 100 feet). In some of these embodiments, the integrated application notifies the user of the automatic switch but does not offer the user a choice to accept or deny the switch.

The first and second stages 3305 and 3310 are similar to the first and second stages 3205 and 3210 of FIG. 32 described above. At the third stage 3315, the integrated application notifies the user that the integrated application is switching the navigation mode from the driving mode to the pedestrian mode. Different embodiments differently notify the user of the switch to the pedestrian mode from the driving mode. For instance, the integrated application of some embodiments uses a pop-up window 3330. The pop-up window 3330 of some embodiments indicates that the integrated application is switching to the pedestrian mode. The fourth stage 3320 is similar to the fourth stage 3220 of FIG. 32.

Figure 34:
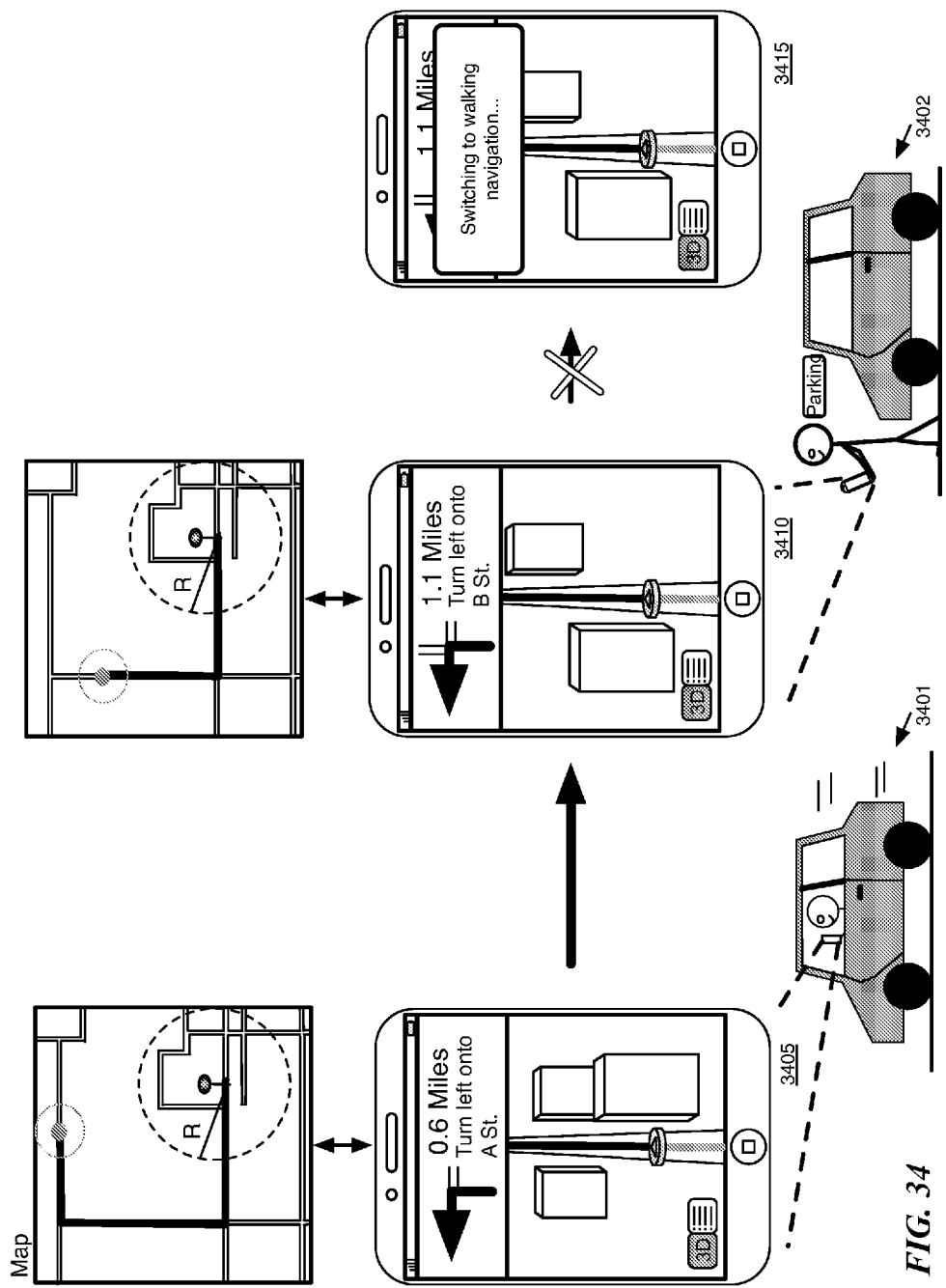
FIG. 34 illustrates an example of the integrated application that does not switch from the driving mode to the pedestrian mode.

FIG. 34 illustrates in terms of two stages 3405 and 3410 an example of the integrated application that does not switch from the driving mode to the pedestrian mode even if the integrated application detects that the user has stopped driving on a route being navigated by the user. In some embodiments, the integrated application does not make the switch to the pedestrian mode if the position along the route at which the user stops driving is not within a threshold distance (e.g., 100 feet) from the destination location of the route. This figure shows a stage 3415 that is an alternative stage to the second stage 341. This figure also shows in the top of the figure a map and the route that is being navigated by the user to show where the user carrying the device is positioned. The map shown on top of the device in this figure is not actually displayed on the screen of the device.

The first stage 3405 shows that the integrated application displays a navigation instruction for the current position along a route being traveled by the user carrying the device. The map illustrated above the device at this stage 3405 shows the current position of the user and the destination of the route. The dotted circle depicted in the map represents an area that falls within a threshold distance from the destination location of the route. The solid line labeled with an "r" represents the radius of the dotted circle. A scene 3401 depicted below the first stage 3405 shows that the user carrying the device is driving in a car. Based on the motion data received from the set of detection apparatuses, the integrated application at the stage 3205 determines that the user is driving (e.g., because the user is moving at a speed that is faster than five miles per hour).

At the second stage 3410, the map illustrated above the device at this stage indicates the user has advanced to a position on the route that is closer to the destination than the position of the user was at the previous stage 3405. However, the position of the user at the stage 3410 is not yet within the threshold distance from the destination location of the route as indicated by the current position indicator that is not within the dotted circle in the map.

A scene 3402 depicted below the second stage 3410 shows that the user has parked the car and walks out of the car. The user may have stopped the car to refuel the car. As mentioned above, the integrated application receives the motion data periodically. The integrated application at this stage 3410 determines that the user is no longer driving based on the received motion data. However, the integrated application of some embodiments does not automatically switch from the navigation mode to the pedestrian mode as the integrated application would have done as shown at the alternative second stage 3415. This is because the integrated application of some embodiments does not switch to the pedestrian mode from the driving mode when the current position of the user is not within the threshold distance from the destination of the route.

FIG. 34 illustrates that the integrated application uses the dotted circle to determine whether the user's current position on the route falls within the threshold distance from the destination of the route being traveled. Thus, the threshold distance used by the integrated application is a displacement. However, in some embodiments, the integrated application may use the actual distance to determine whether to switch to the pedestrian mode or not.

Figure 35:
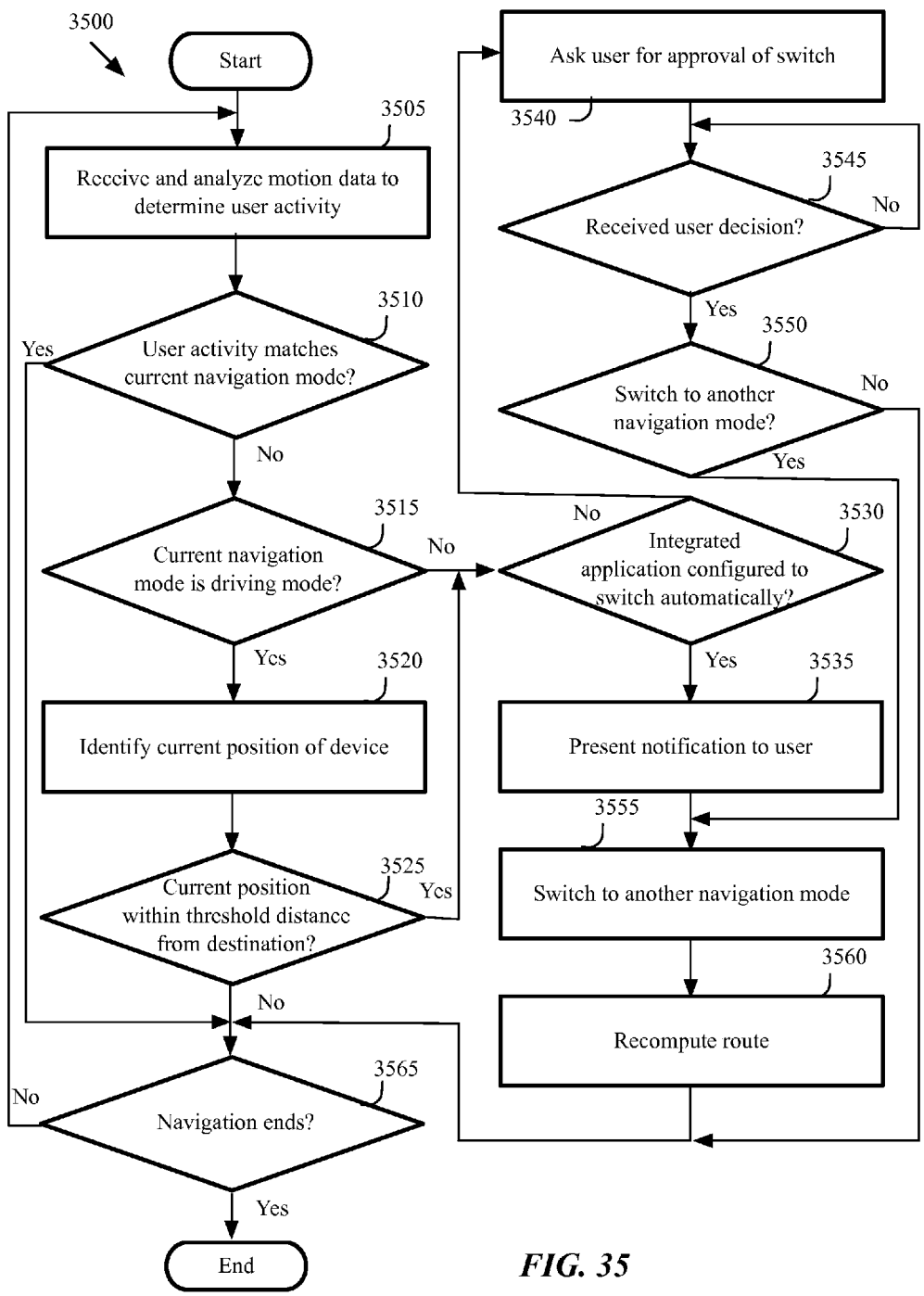
FIG. 35 conceptually illustrates a process that integrated application of some embodiments performs to switch between different navigation modes.

FIG. 35 conceptually illustrates a process 3500 that integrated application of some embodiments performs to switch between different navigation modes. The integrated application runs on a device such as smartphones and tablet computers in some embodiments. The process 3500 of some embodiments starts when the integrated application is in a navigation mode to present the navigation instructions and the map views for a route to a destination location that is being traveled by the user.

The process 3500 begins by receiving (at 3505) motion data from a set of detection apparatuses and analyze the motion data to determine the activities of the user of the device. In some embodiments, the process determines the activities that the user is performing, based on the motion data supplied by a set of detection apparatuses of the device. For instance, the process determines that the user is driving when the motion data indicates that the device is moving faster than a threshold speed (e.g., five miles per hour). The process also determines that the user is walking when the motion data indicates that the device is moving slower than the threshold speed or that the device's vertical distance with respect to the ground is fluctuating. In some embodiments, the detection apparatuses of the device include one or more of an accelerometer, a gyroscope, a magnetometer, a GPS receiver, etc. The detection apparatuses supply these motion data to the integrated application periodically or the integrated application polls the detection apparatuses to get the motion data periodically Next, the process 3500 determines (at 3510) whether the determined activity and the current navigation mode in which the process is presenting the navigation instructions and the map views are matching. The determined user activity and the current navigation mode is matching when, for example, the determined user activity is driving and the current navigation mode is the driving mode. Also, the determined activity and the current navigation mode is matching when the determined activity is walking and the current navigation mode is the pedestrian mode.

When the process 3500 determines (at 3510) that the determined activity and the current navigation mode are matching, the process 3500 does not switch to another navigation mode from the current navigation mode and proceeds to 3565, which is described further below. When the process 3500 determines (at 3510) that the determined activity and the current navigation mode not are matching (e.g., when the current navigation mode is the driving mode and the determined activity is walking), the process 3500 determines (at 3515) whether the current navigation mode is the driving mode.

When the process 3500 determines (at 3515) that the current navigation mode is not the driving mode, the process 3500 proceeds to 3530, which is described further below. When the process 3500 determines (at 3515) that the current navigation mode is the driving mode, the process 3500 identifies (at 3520) the current position of the device in the map. Different embodiments use different techniques to identify the current position of the device. For instance, in some embodiments, the process uses GPS coordinates received through the device's GPS receiver. The process may also utilize the Wi-Fi triangulation technique to identify the current position of the device.

The process 3500 then determines (at 3525) whether the current position of the device is within a threshold distance from the destination location. This threshold distance is for determining whether the user is near enough to the destination for the integrated application to switch to the pedestrian mode. In some embodiments, the threshold distance is preconfigured for the integrated application or the integrated application lets the user to provide the threshold distance. In some embodiments, the threshold distance is set to 200 feet.

When the process 3500 determines (at 3525) that the current position of the device is not within the threshold distance from the destination location, the process 3500 proceeds to 3565, which is described further below. When the process 3500 determines (at 3525) that the current position of the device is within the threshold distance from the destination location, the process 3500 proceeds to 3530.

At 3530, the process 3500 determines whether the integrated application is configured to switch between navigation modes automatically or with the user's approval. In some embodiments, the integrated application allows the user to configure the integrated application (1) to make the switch automatically or (2) to ask for user's approval of the switch.

When the process 3500 determines (at 3530) that the integrated application is configured to switch between navigation modes automatically, the process 3500 optionally presents (at 3535) a notification of the switch to the user. This notification may be visual (e.g., a pop-up window), audible (e.g., reciting "Switching to walking navigation . . . "), and/or non-audiovisual (e.g., a combination of vibrations). The process 3500 then switches (at 3555) from the current navigation to another navigation mode that matches the determined (at 3505) user activity in order to present the navigation instructions and the map views for the switched navigation mode.

The process 3500 then optionally computes (at 3560) the route from the current position of the device to the destination location. When the route being navigated is a driving route and the switched navigation mode is the pedestrian mode or when the route being navigated is a walking route and the switched navigation mode is the driving mode, the process re-computes the route (1) to take advantage of the shorter (or faster) route and/or (2) to make the route appropriate for the navigation mode. For instance, when there is an ally way to the destination that can be part of a walking route only, the process can re-compute the route to include this ally way if the switched navigation mode is the pedestrian mode. As another example, the process may re-compute the route when the route is a walking route that instructs the user to walk along the one-way street for the cars in the direction that the cars are not allowed to be driven when the switched navigation mode is the driving mode. The process 3500 then proceeds to 3565, which is described further below.

When the process 3500 determines (at 3530) that the integrated application is to switch between navigation modes with the user's approval, the process 3500 asks (at 3540) whether the user wishes to approve or disapprove the switch from the current navigation mode to another navigation mode. In some embodiments, the process prompts the user by using a UI page or a pop-up window that includes a set of UI items for receiving user's approval or disapproval. The process 3500 then waits (at 3545) for user's decision to approve or disapprove. When the process 3500 receives (at 3550) an approval, the process 3500 proceeds to 3555 to switch to the other navigation mode. When the process 3500 receives (at 3550) a disapproval, the process does not make the switch and proceeds to 3565.

At 3565, the process 3500 determines whether the navigation of the route has ended. Different embodiments end the navigation of the route differently. For instance, in some embodiments, the integrated application ends the navigation when the integrated application receives a selection of an end control while the route is being navigated. The integrated application may also end the navigation of the route when the user reaches the destination of the route. When the process 3500 determines (at 3565) that the navigation of the route has not ended, process 3500 loops back to 3505 to receive the current motion data. Otherwise, the process 3500 ends.

D. Switching Between Different Navigation Modes

Figure 36:
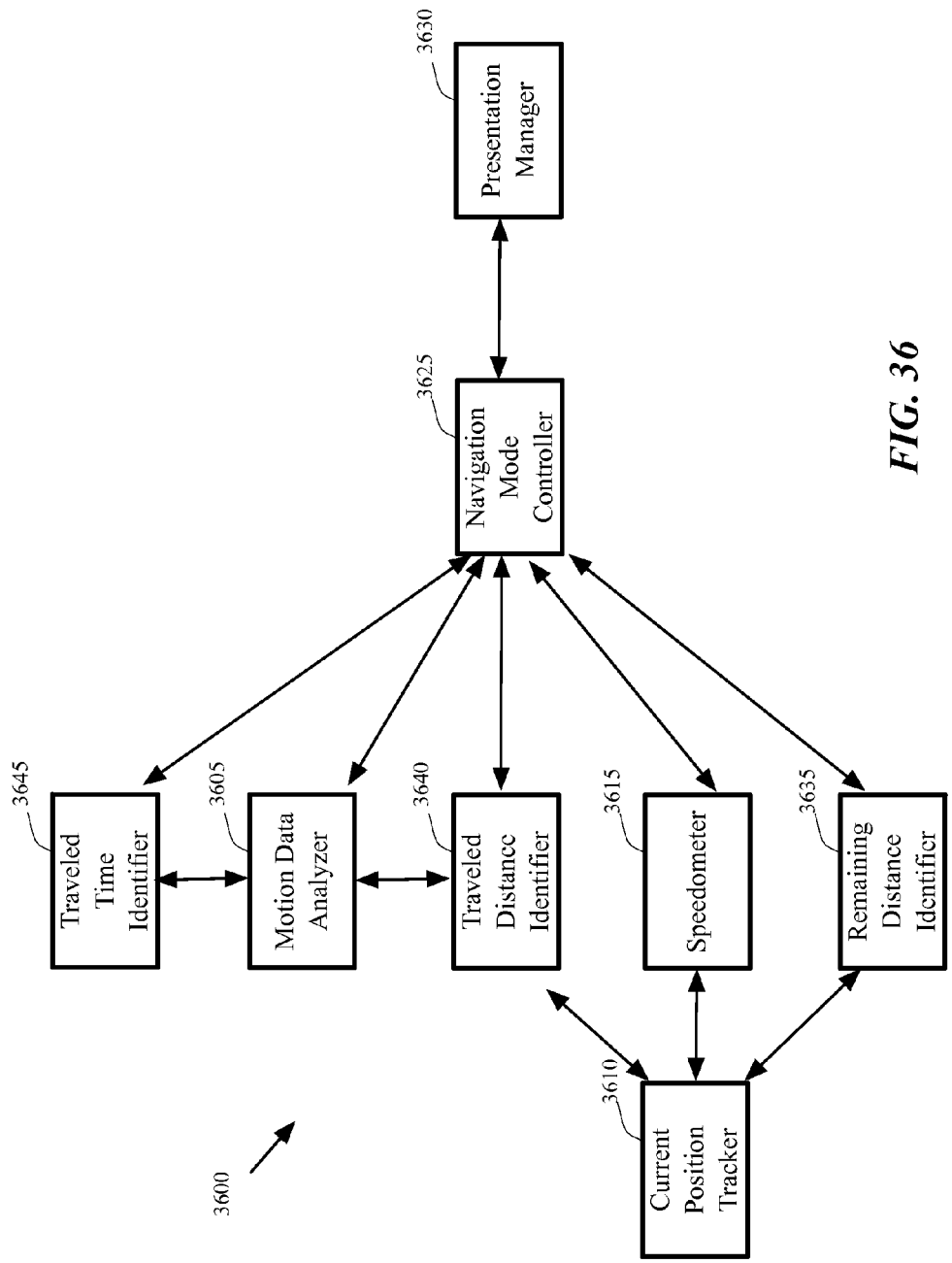
FIG. 36 conceptually illustrates a processing pipeline performed by the integrated application of some embodiments.

FIG. 36 conceptually illustrates a processing pipeline 3600 performed by the integrated application of some embodiments executed in a device in order to switch from one navigation mode to another navigation mode. Specifically, the processing pipeline 3600 is performed to determine whether to switch between the driving mode and the pedestrian mode. As illustrated, the processing pipeline 3600 includes motion data analyzer 3605, a current position tracker 3610, a traveled distance identifier 3640, a traveled time identifier 3645, a speedometer 3615, a remaining distance identifier 3635, and a navigation mode controller. This figure also illustrates a presentation manager 3630.

The current position tracker 3610 identifies the current position of the user (i.e., the current position of the device). In some embodiments, the current position tracker 3610 receives current position information and identifies the current position in a map. The current position tracker 3610 may receive the current position information from one or more different sources. For instance, the current position tracker 3610 receives a set of GPS coordinates from the device's GPS receiver (not shown). The current position tracker 3610 may also receive the current position information from a remote server (not shown) that employs Wi-Fi Positioning System (WPS). The current position tracker 3610 of some embodiments periodically sends the identified current position in the map to the speedometer 3615 and the remaining distance identifier 3635.

The speedometer 3615 computes the speed at which the user carrying the device is moving. The speedometer 3615 of different embodiments computes the speed differently. For instance, in some embodiments, the speedometer 3615 uses the current position identified and supplied by the current position tracker 3610. That is, the speedometer 3615 computes the speed by identifying the change of the current position in distance and dividing it by the time interval between the identified current positions used for identifying the distance. Alternatively or conjunctively, the speedometer 3615 receives the speed from a speedometer of a car that the user is driving if the device is communicatively connected (e.g., via the Bluetooth®) to the car.

The remaining distance identifier 3635 identifies the distance from the current position of the device to the destination of a route being traveled by the user. The remaining distance identifier 3635 receives the location information about the destination of the route and the current position of the user in the map, and computes the remaining distance to the destination. In some embodiments, the remaining distance identifier 3635 identifies the remaining length of the route or the length of the straight line between the current position to the destination location of the route. The remaining distance identifier 3635 sends the identified remaining distance to the navigation mode controller 3625.

The motion data analyzer 3605 determines a mode of transportation in which the user is, based on motion data for the device. The motion data analyzer 3605 receives the motion data from a set of motion sensors. Some of the motion sensors include a gyroscope, an accelerometer, and a magnetometer of the device. The motion data analyzer 3605 analyzes the motion data received from these different motion sensors and identifies a mode of transportation that the user of the device appears to be using. Specifically, the motion data analyzer 3605 of some embodiments determines whether the user carrying the device is walking, driving a car, or riding a bicycle. The motion data analyzer 3605 then sends the determined mode of transportation to the user to the navigation mode controller 3625.

In some embodiments, the motion data analyzer 3605 computes a confidence score of the analysis, which indicates how confident or accurate the analysis is. The motion data analyzer 3605 sends the confidence score along with the analysis to the navigation mode controller 3625. In some embodiments, the motion data analyzer 3605 sends the analysis and the confidence score periodically to the navigation mode controller 3625. A more detailed description of identifying whether the user carrying the device is walking or driving based on the motion data is described in U.S. patent application Ser. No. 13/913,234, entitled "Motion Fencing," filed Jun. 7, 2013, now published as U.S. Patent Publication 2014/0365803. This U.S. Patent Application is incorporated herein by reference.

The traveled distance identifier 3640 identifies the distance the user has traveled using a mode of transportation identified by the motion data analyzer 3605. In some embodiments, the traveled distance identifier 3640 records the current position when the identified mode of transportation switches from one mode to another mode of transportation. The traveled distance identifier 3640 then computes the distance from the recorded position to the updated current position as the user moves. The traveled distance identifier 3640 supplies the computed traveled distance to the navigation mode controller 3625.

The traveled time identifier 3645 identifies the length of time that the user has used a mode of transportation to travel identified by the motion data analyzer 3605. In some embodiments, the traveled time identifier 3645 records the time at which the identified mode of transportation switches from one mode to another mode of transportation. The traveled distance identifier 3645 then computes the time elapse since the user started using the mode of transportation by subtracting the recorded time from the current time. The traveled time identifier 3645 receives the current time information from a system clock (not shown) of the device. The traveled time identifier 3650 sends the computed traveled time to the navigation mode controller 3625.

The navigation mode controller 3625 determines whether to switch to another navigation mode from the current navigation mode in which the navigation application currently is. The navigation mode controller 3625 identifies the current navigation mode and then determines whether the current navigation mode matches to the mode of transportation identified by the motion data analyzer 3605. For instance, the navigation mode controller 3625 determines that the driving mode matches to the mode of transportation when the mode of transportation identified by the motion data analyzer 3605 is driving.

When the navigation mode controller 3625 determines that the current navigation mode (e.g., the driving mode) does not match to the identified mode of transportation (e.g., walking), the navigation mode controller 3625 analyzes the information received from other components of the processing pipeline 3600 to determine whether to switches to the identified mode of transportation.

For instance, the navigation mode controller 3625 analyzes the speed at which the user is moving, received from the speedometer 3615. The navigation mode controller 3625 of some embodiments decides not to switch from the driving mode to the pedestrian mode when the speed is above a threshold speed (e.g., 5 miles per hour, 15 miles per hour, etc.) because the user is moving too fast to be walking. Conversely, the navigation mode controller 3625 of some embodiments decides not to switch from the pedestrian mode to the driving mode when the speed is below the threshold speed because the user is moving too slow to be driving.

The navigation mode controller 3625 analyzes the remaining distance to the destination of the route, received from the remaining distance identifier 3635. For instance, the navigation mode controller 3625 of some embodiments does not switch from the driving mode to the pedestrian mode when the destination is more than a threshold distance away from the current position because it is too far to walk to the destination from the current position.

The navigation mode controller 3625 analyzes the distance that the user has traveled using the identified mode of transportation, received from the traveled distance identifier 3640. For instance, the navigation mode controller 3625 of some embodiments does not switch from the driving mode to the pedestrian mode when the user is deemed to have been walking for less than a threshold distance (e.g., 5 meters) because it is too short a distance to switch from one navigation mode to another.

The navigation mode controller 3625 analyzes the amount of time elapsed since the user started using the mode of transportation, received from the traveled time identifier 3640. For instance, the navigation mode controller 3625 of some embodiments does not switch from the driving mode to the pedestrian mode when the user is deemed to have been walking for a threshold time (e.g., 5 seconds) because it is too short an amount of time to switch from one navigation mode to another.

The navigation mode controller 3625 also uses the confidence score received from the motion data analyzer to determine whether to switch from one navigation mode to another. For instance, the navigation mode controller 3625 does not switch to the driving mode from the pedestrian mode when the identified mode of transportation is driving but the confidence score is below a threshold score and some of the information from other components of the processing pipeline 3600 indicates the user is walking.

When the navigation mode controller 3625 switches the current navigation mode to a different navigation mode, the navigation mode controller 3625 notifies of the switch to the presentation manager 3630. The presentation manager 3630 then presents the GUI items and the map views according to the definition of the switched navigation mode.

It is to be noted that, in some embodiments, the threshold values (e.g., threshold periods of time, threshold distances, threshold speeds, etc.) may be different for different modes of transportation. For instance, the threshold distance for the traveled distance for driving may be longer than the threshold distance for the traveled distance for walking.

E. Use Cases

Figure 37:
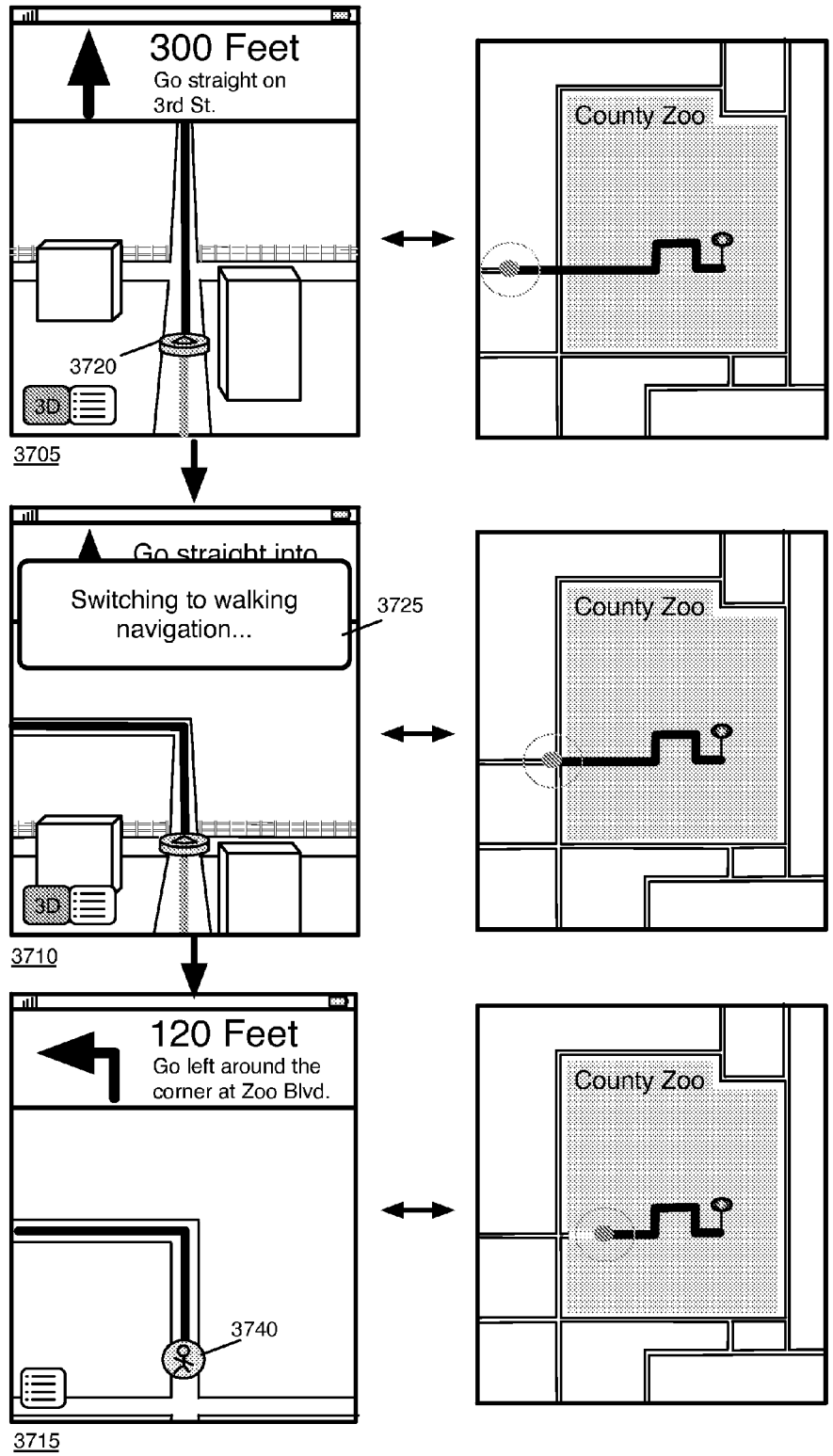
FIG. 37 illustrates an example of the integrated application that switches from the driving mode to the pedestrian mode.

FIG. 37 illustrates in terms of three stages 3705-3715 an example of the integrated application that switches from the driving mode to the pedestrian mode when the user reaches the beginning of a portion of the route that is not for driving. The left half of this figure shows the device on which the integrated application runs in the three stages 3705-3715. The right half of this figure illustrates the map and the route that is being navigated by the user to show where the user carrying the device is positioned. The map shown in the right half of the figure is not actually displayed on the screen of the device.

The first stage 3705 shows that the integrated application displays a navigation instruction for the current position along a route being traveled by the user carrying the device. As shown, the integrated application displays the navigation instruction and the map view in the driving mode of some embodiments. That is, the map view has an appearance for the driving mode. For instance, the map view is in 3D and the puck 3720 has an appearance for the driving mode.

The map illustrated in the right half of the figure for this stage 3705 shows the current position of the user and the destination of the route. In some cases, a location in the map is not reachable by car and is reachable by walking. When the destination of a route is such a location, the route may have a driving portion and a walking portion. When the integrated application is in a navigation mode to present navigation instructions for the route, the integrated application of some embodiments switches from the driving mode to the pedestrian mode when the user reaches the end of the driving portion of the route.

In some embodiments, the integrated application gets the map data for the driving portion of the route from one map source and gets the map data for the walking portion of the route from another map source. In some embodiments, the integrated application uses the map data for the driving portion of the route to determine whether the user has reached the end of the driving portion of the route. For instance, when the map data does not have roads in a region of the map that includes the destination location of the route and a particular portion of the route that leads into this region, the integrated application determines that the user has reached the end of the driving portion of the route when the user reaches the end of particular portion.

The integrated application of some embodiments switches from a first navigation mode to a second navigation mode when the user carrying the device reaches a location on a route that is at a border of a first map region and a second map region, where a first set of transportation modes are available in the first region while a different second set of transportation modes are available in the second region. Also, a transportation mode that is in one set of transportation modes but not the other set of transportation modes is a transportation mode that is a viable or available mode for one of the region but not the other region. A change in the viable or available set of transportation modes as the device reaches or passes the border location is a reason for the integrated application of some embodiments to identify or switch to the second transportation mode.

As shown by the map for the stage 3705, the destination of this route in this example is in the middle of a zoo and is not reachable by car. Thus, the driving portion of this route ends at the border of the zoo that meets the road that is part of the route.

At the second stage 3710, the map illustrated in the right half of the figure for this stage indicates that the user has reached the end of the driving portion of the route. The second stage 3710 shows that the integrated application displays a pop-up window that indicates that the integrated application is switching to the pedestrian mode from the driving mode.

The third stage 3715 indicates the user has advanced to a position on the route that is closer to the destination than the position of the user was at the previous stage 3705. This stage also shows that the integrated application has switched to the pedestrian mode, by displaying the navigation instruction and the map view in the pedestrian mode of some embodiments. That is, the map view has an appearance for the pedestrian mode. For instance, the map view is in 2D and the puck 3740 has an appearance for the pedestrian mode.

Figure 38:
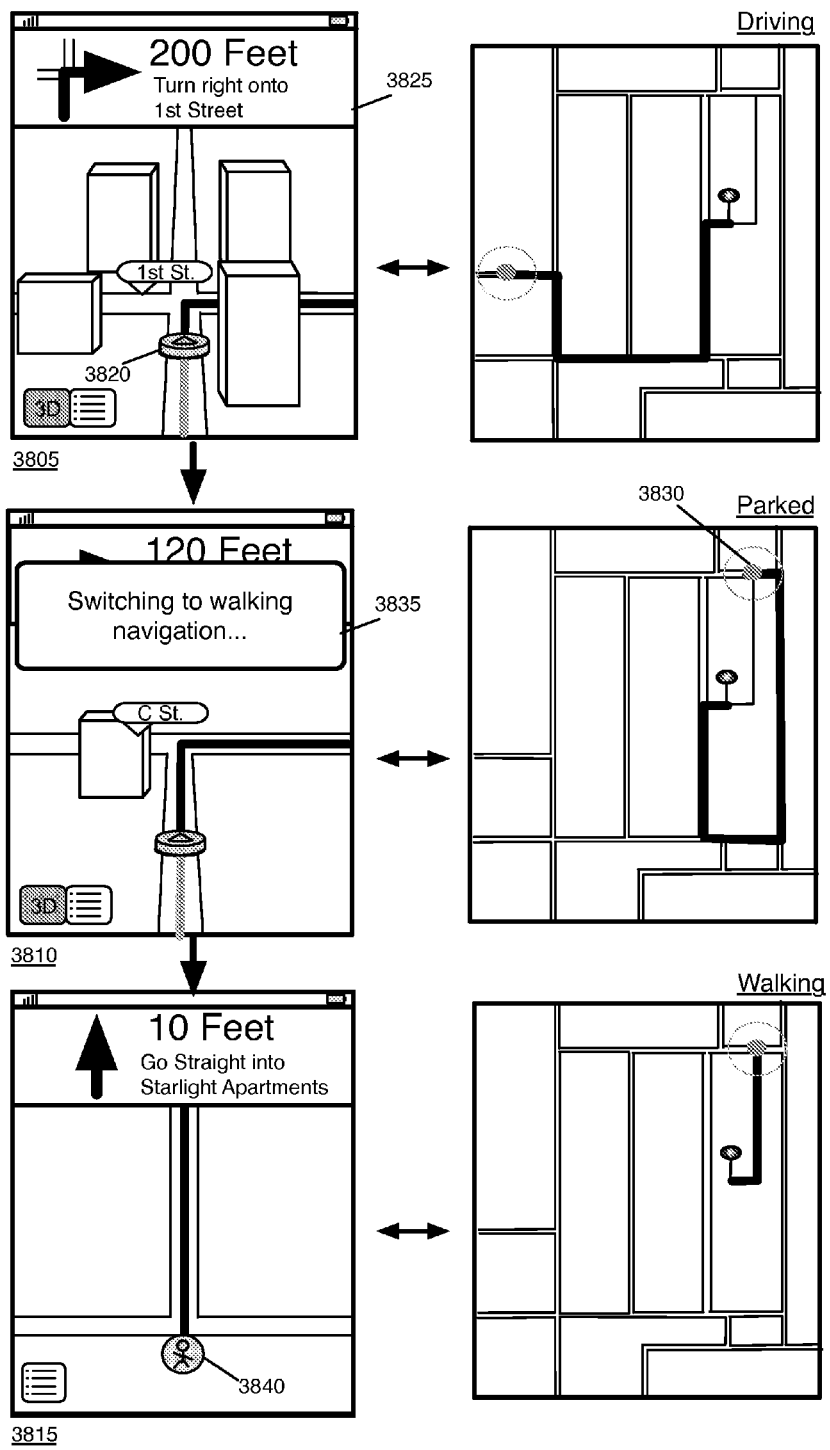
FIG. 38 illustrates an example of the integrated application that switches from one navigation mode to another and re-computes the route to the destination.

FIG. 38 illustrates in terms of three stages 3805-3815 an example of the integrated application that switches from one navigation mode to another and re-computes the route to the destination for the switched navigation mode. In some embodiments, the integrated application of some embodiments switches from the driving mode to the pedestrian mode when the user stops driving at a location that is within a threshold distance (e.g., 100 feet) from the destination of the route. In these embodiments, the location at which the user stopped driving does not have to be on the driving route to the destination.

The integrated application of some such embodiments also computes and presents a walking route as the integrated application switches to the pedestrian mode. The left half of this figure shows the device on which the integrated application runs in the three stages 3805-3815. The right half of this figure illustrates the map and the route that is being navigated by the user to show where the user carrying the device is positioned. The map shown in the right half of the figure is not actually displayed on the screen of the device.

The first stage 3805 shows that the integrated application displays a navigation instruction for the current position along a route being traveled by the user carrying the device. As shown, the integrated application displays the navigation instruction and the map view in the driving mode of some embodiments. That is, the map view is in 3D and a puck 3820 representing the current position of the device has an appearance for the driving mode. The integrated application displays the navigation instruction in a sign 3825, which indicates the next turn for the user to make is in 200 feet. The map illustrated in the right half of the figure for this stage 3805 shows the current position of the user and the destination of the route. In this example, the user is not within the threshold distance from the destination at this stage 3805.

At the second stage 3810, the map shown at the right half of this figure for the stage shows that the user has deviated from the route and the integrated application has recomputed the route to the destination. The recomputed route is still driving route. The user has also stopped driving the car at the position indicated by the current position indicator 3830. The integrated application determines that the user has stopped driving, based on the motion data received from the detection apparatuses (not shown) of the device. Because the current position of the user is within the threshold distance from the destination location, the integrated application of some embodiments notifies the user that the integrated application is switching to the pedestrian mode. In this example, the integrated application uses a pop-up window 3835 to notify the user of the switch to the pedestrian mode.

As the integrated application switches to the pedestrian mode, the integrated application of some embodiments computes a walking route to the destination. In some embodiments, the integrated application gets the map data for driving roads from one source and gets the map data for walking roads from another source. The driving roads and the walking roads overlap in some cases. The integrated application of some embodiments uses both the map data for the walking roads to compute walking routes to the destinations. As the integrated application switches from the driving mode to the pedestrian mode, the integrated application of some embodiments computes a walking route and provides the navigation instructions and the map views in the pedestrian mode.

At the third stage 3815, the map shown at the right half of this figure for this stage shows that the newly computed walking road and the user is about to enter this newly computed route to arrive at the destination. The third stage 3815 also shows that the integrated application has switched to the pedestrian mode, by displaying the navigation instruction and the map view in 2D mode and using a different puck 3840 that has an appearance for the pedestrian mode. The 3D floating control also has been removed from the map view because the integrated application is in the pedestrian mode of some embodiments.

In some embodiments, a walking route and a driving route terminate at a particular destination but traverse along different paths to reach the particular destination. As shown by the map for the second and third stages 3810 and 3815, the driving route and the walking route terminates at the same destination but traverse along different paths to reach the same destination.

Moreover, a walking route and a driving route that share the same start and destination locations may have different sets of pathways. In some cases, a first set of pathways for the walking route may include at least one pathway in a second set of pathways for the driving route. Also, the first set of pathways for the walking route may include at least one pathway that is not in the second set of pathways. At least one pathway in the first set of pathways is a sidewalk and at least one pathway in the first set of pathways is a road in some cases.

Figure 39:
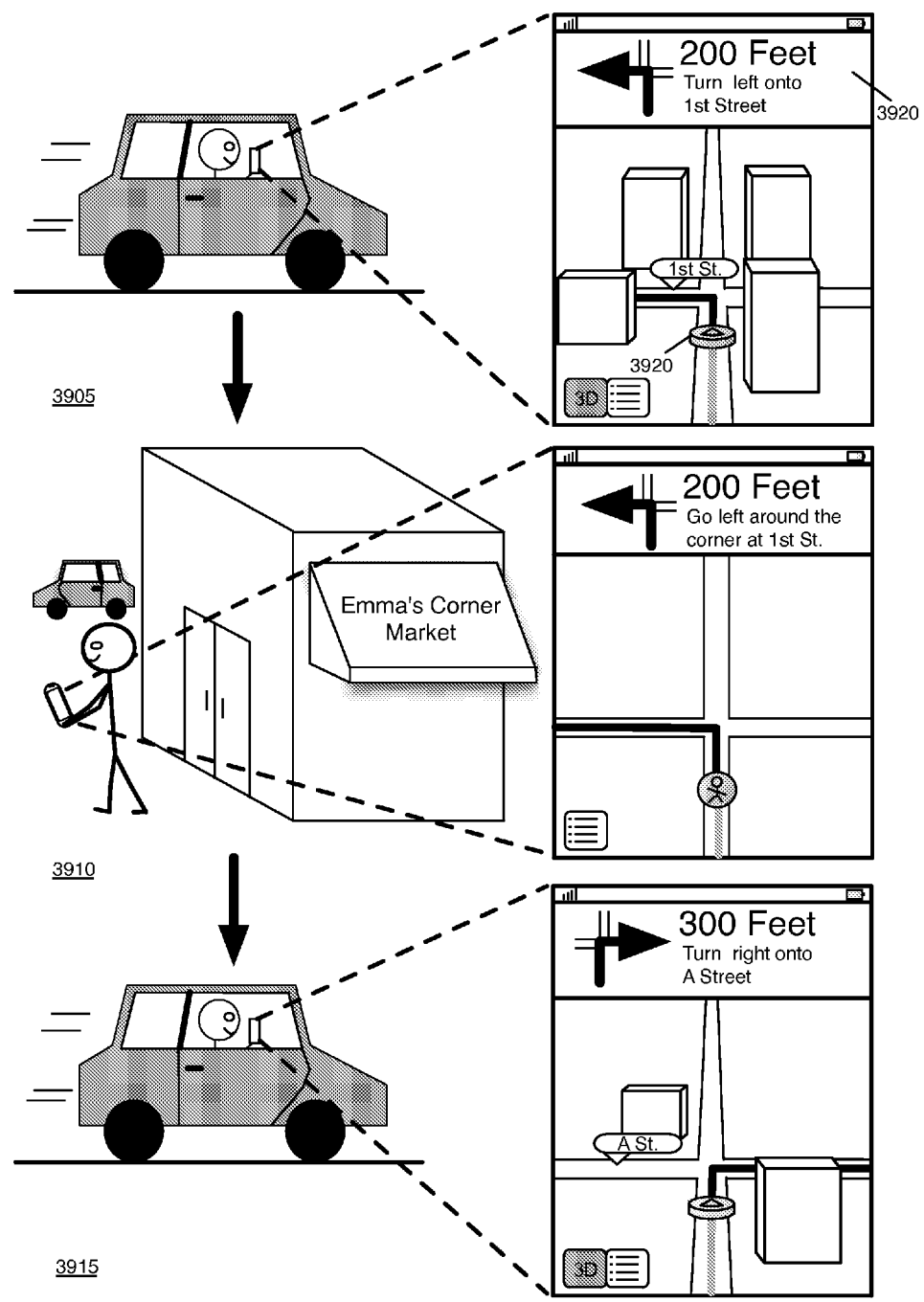
FIG. 39 illustrates an example of the integrated application that switches from the driving mode to the pedestrian mode and then switches back to the driving mode.

FIG. 39 illustrates in terms of three stages 3905-3915 an example of the integrated application that switches from the driving mode to the pedestrian mode and then switches back to the driving mode. The left half of each stage shows the activity that the user is performing and the right half of the stage shows a screen of the device on which the integrated application executes.

The first stage 3905 illustrates that the user is driving a car. The integrated application displays a navigation instruction for the current position along a route being traveled by the user carrying the device. The navigation application's motion data analysis indicates that the user is driving. The user is also moving faster than a threshold speed. The integrated navigation determines that it does not have to switch to another navigation mode. As shown, the integrated application displays the navigation instruction and the map view in the driving mode of some embodiments. That is, the map view is in 3D and the puck 3925 has an appearance for the driving mode.

The second stage 3910 illustrates that the user has parked the car, shopped in a store, and is walking in the parking lot to find the car near the location at which the user was driving at the previous stage 3905. In this example, the navigation application's motion data analysis indicates that the user is walking. The user has walked for more than a threshold period of time. Moreover, the distance to the destination of the route may be less than a threshold distance in this example. Therefore, the navigation application determines that the current navigation mode, which is the driving mode, should be switched to the pedestrian mode and switches to the pedestrian mode.

As shown in the right half of the second stage 3910, the integrated application displays the navigation instruction and the map view in the pedestrian mode. That is, the navigation instruction is tailored according to the pedestrian mode as the instruction recites "Go left around the corner . . . " rather than "Turn left onto . . . " Moreover, the map view is rendered in 2D rather than in 3D.

The third stage 3915 illustrates that the user is driving the car again. In this example, the navigation application's motion data analysis indicates that the user is driving. Also, the user has driven the car for more than a threshold distance for more than a threshold time to merit a switch to the driving mode from the pedestrian mode. As shown, the user has driven towards another junction for a different turn than the first stage 3905. Furthermore, the speed at which the user is traveling is also above a threshold speed. Therefore, the integrated application displays the navigation instruction and the map view in the driving mode.

Figure 40:
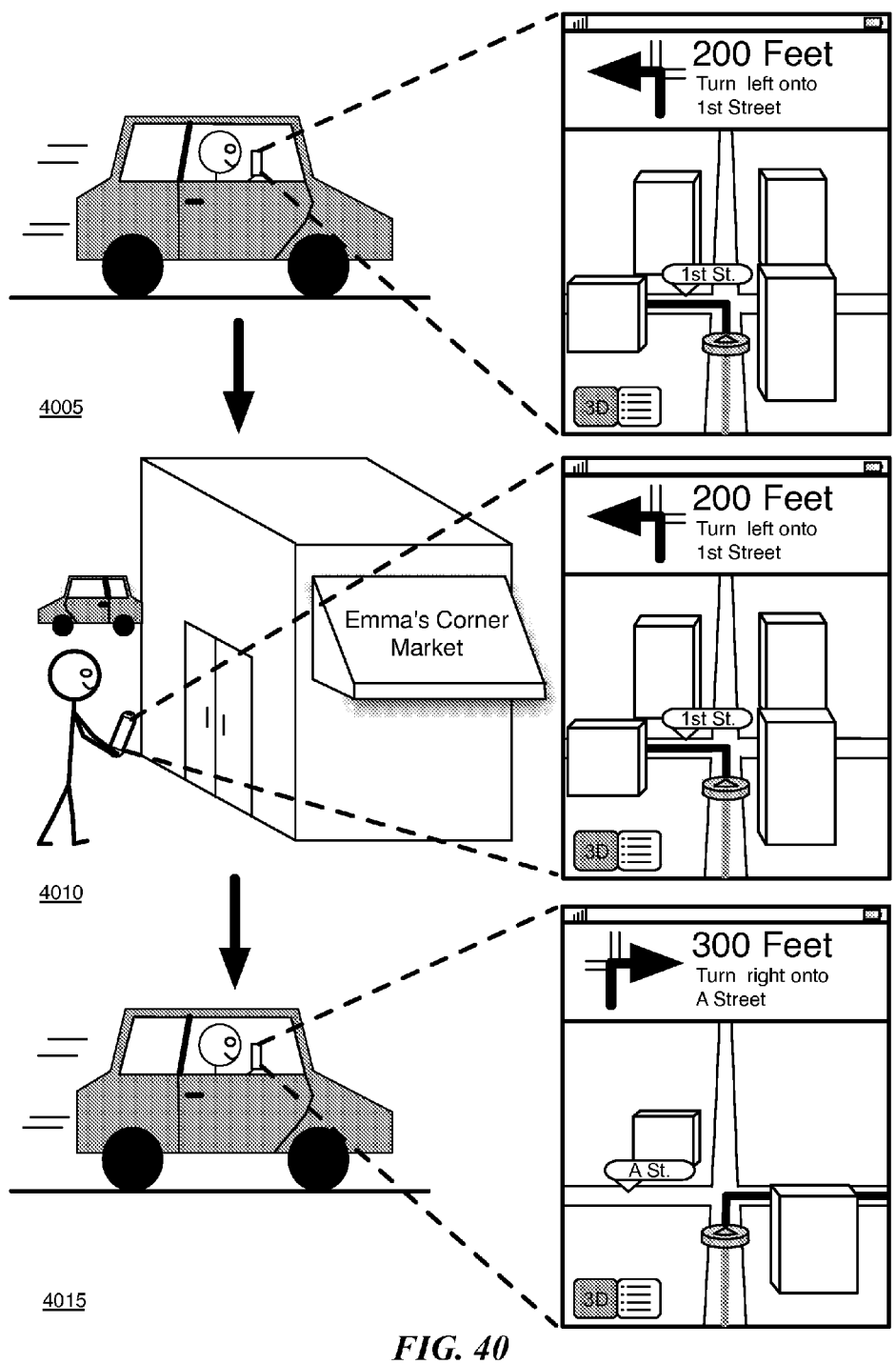
FIG. 40 illustrates an example of the integrated application that decides not to switch between the driving mode and the pedestrian mode.

In contrast to FIG. 39 described above, FIG. 40 illustrates in terms of three stages 4005-4015 an example of the integrated application that decides not to switch between the driving mode and the pedestrian mode. The left half of each stage shows the activity that the user is performing and the right half of the stage shows a screen of the device on which the integrated application executes.

The first stage 4005 is similar to the first stage 3905 described above. That is, the navigation application's motion data analysis indicates that the user is driving. The user is moving faster than a threshold speed. The integrated application displays the navigation instruction and the map view in the driving mode.

The second stage 4010 illustrates that the user has parked the car and is walking towards a store near the location at which the user was driving at the previous stage 4005. In this example, the navigation application's motion data analysis indicates that the user is walking. However, the user has not walked for more than a threshold period of time and not walked for more than a threshold distance. Therefore, the navigation application determines that the current navigation mode, which is the driving mode, should not be switched to the pedestrian mode.

In some embodiments, the map data for the current location of the user indicates that the user is at a shop. The integrated application of these embodiments identifies that the user is at the shop based on the map data and determines that the user has paused the navigation of the route. The integrated application therefore decides not to switch to the pedestrian mode. As shown in the right half of the second stage 4010, the integrated application displays the same navigation instruction and the map view as shown at the previous stage 4005.

The third stage 4015 illustrates that the user is driving the car again. In this example, the navigation application's motion data analysis indicates that the user is driving. Therefore, the integrated application determines that it does not have to switch to the pedestrian mode.

IV. Software Architecture

Figure 41:
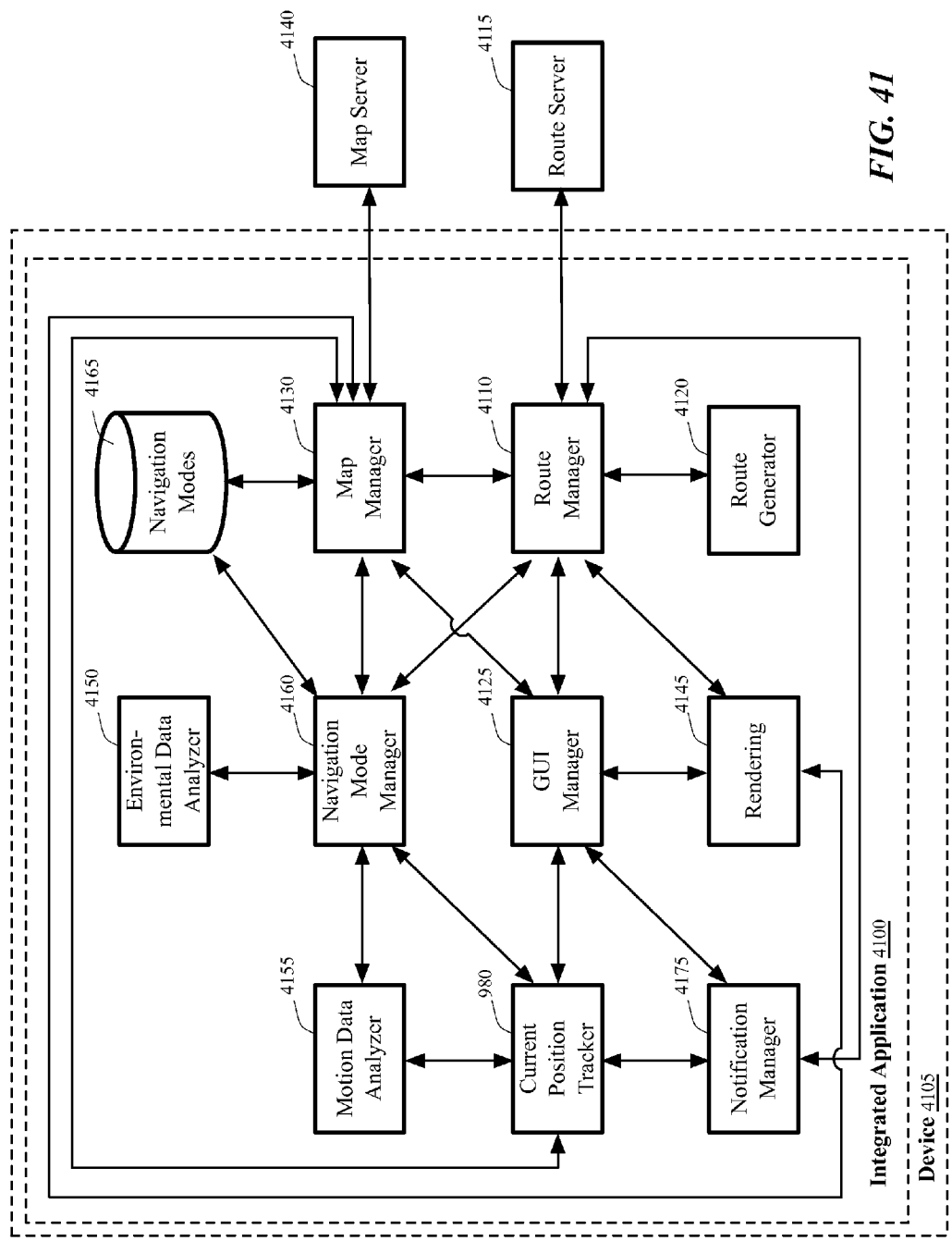
FIG. 41 illustrates example architecture of the integrated application of some embodiments.

FIG. 41 illustrates example architecture of the integrated application of some embodiments. In this example, an integrated application 4100 runs in a device 4105. As shown, the integrated application 4100 includes a route manager 4110, a router generator 4120, a route generator 4120, a GUI manager 4125, a map manager 4130, a rendering module 4145, an information analyzer 4150, a motion analyzer 4155, a mode manager 4160, a navigation modes 4165, a notification manager 4175. This figure also illustrates a device 4105, a map server 4140 and a route server 4115.

The device 4105 of some embodiments has a touch-sensitive screen (not shown) and/or a near-touch sensitive screen (not shown) that displays the output of the integrated application 4100. The device 4105 also facilitates the interaction between the integrated application and the map server 4140 and the route server 4115. In this figure, the device's own hardware and software architecture is not depicted for the simplicity of description and illustration. More details about a device on which the integrated application may execute will be described further below by reference to FIG. 42.

The route server 4115 is a remote server that provides route data to the integrated application 4100 upon request. In some embodiments, the integrated application 4100 sends information about a starting location and a destination location to the router server 4115 and the means of transportations for the routes to be computed. The route server 4115 computes a set of routes for different means of transportation and returns the routes to the integrated application 4100.

The route manager 4110 of the integrated application receives information about starting and destination locations and the means of transportation for finding routes. The route manager sends the information to the router server 4115 or to the route generator 4120 to obtain routes that includes sets of navigation instructions. In some embodiments, the route manager 4110 receives the information from the user through the GUI manager 4125, which receives user selection/or specification through GUI items that the GUI manager 4125 manages. The route manager 4110 receives the information about the means of transportation to use to find the routes from the navigation mode manager 4160.

The route manager 4110 of some embodiments uses one or both of the route generator 4120 and the route server 4115 to obtain the routes. The router manager 4110 of some embodiments also makes the default selection of a route based on the means of transportation.

The route generator 4120 generates routes based on the information about the starting and ending locations from the route manager. The route generator 4120 is a local equivalent of the route server 4115. The route generator 4120 is part of the integrated application 4100 in some embodiments. In some embodiments, however, the route generator 4120 is a stand-alone application that executes on the device 4105.

The GUI manager 4125 manages a set of GUI items of the integrated application. The GUI manager 4125 interacts with the route manager 4110. As mentioned above, the GUI manager 4125 provides the route manager with the user-specified information about routes to generate. The GUI manager 4125 also requests and receives navigation instructions and generates rendering instructions for drawing banners in the display area. The GUI passes the rendering instructions to the rendering module 4145 so that the rendering module 4145 renders the banner in the display area. The GUI manager 4125 generates rendering instructions for drawing other UI items (e.g., an end control, a list control, route selection banners, etc.) in the display area. The GUI manager 4125 also generates rendering instructions based on the user's interaction with the GUI items.

The map server 4140 is a remote server that provides map data to the integrated application 4100 that describes relative locations of streets, highways, points of interest (POI), etc., in the map per the integrated application 4100's request. The map data contains 2D and 3D map data at different zoom levels and perspectives.

The map manager 4130 sends requests for the map data to the map server 4140 and obtains the map data from the map server 4140. The map manager 4130 prepares the request based on the current position of the device and the location and juncture for the current navigation instruction of a route being traveled. The map manager also obtains information about different locations to present in the map based on the navigation mode definitions. The map manager also manages the movement of the virtual camera to present the map views.

The motion data analyzer 4155 receives motion data from different motion sensors of the device 4105 or of external sources (e.g., a car to which that the device is connected). Some of the motion sensors include a gyroscope, an accelerometer, a magnetometer, and a speedometer. The motion data analyzer also receives data about the current position of the device from the current position tracker 4180. The motion data analyzer 4155 analyzes these data from the motion sensors and the current position to identify the movement of the device. For instance, the motion data analyzer identify the speed at which the device is moving by analyzing the current position data and identify vertical fluctuation of the device by analyzing the data from the motion sensors.

The environmental data analyzer 4150 receives data about the environment in which the device is located, from the sensors of the device or of the external sources. The environmental data analyzer 4150 may also receive the environmental data from a remote server (e.g., a weather server) supplying the data. Some of the sensors include a light sensor, a sound sensor, and a thermometer. The environmental data analyzer 4150 analyzes these data and identifies information relevant for the navigation mode manager to use to find a navigation mode. For instance, the environmental data analyzer 4150 analyzes the brightness information to conclude whether it is daytime or nighttime.

The current position tracker 4180 identifies the current position of the device. In some embodiments, the current position tracker 4180 receives the GPS coordinates from the device's GPS receiver (not shown). The current position tracker 4180 may receive the current position information from a remote server (not shown) that employs Wi-Fi Positioning System (WPS).

The navigation mode repository 4165 stores the definitions of different navigation modes. In some embodiments, a definition of a navigation mode includes, among other thing, a set of conditions for the navigation mode and a presentation style for the navigation mode. The set of conditions for the navigation mode is used by the navigation mode manager 4160 to identify the current navigation mode. The navigation mode manager 4160 applies the set of conditions to the motion data analysis and/or the environmental data analysis and identifies the navigation mode as the current navigation mode if the motion and environmental data analysis meets the conditions. For instance, the navigation mode manager 4160 identifies the driving mode as the navigation mode when the motion data analysis indicates that the speed at which the device is moving meets a set of conditions (e.g., above a threshold speed).

The presentation style for a navigation mode specifies how the map and the GUI items should be presented. For instance, the presentation style may specify the colors to be used for rendering the constructs in the map and the banners showing the navigation instructions. The presentation style of the navigation mode may also specify whether the map should be displayed in 2D or 3D. The presentation style may also specify different types of POIs to show in the map for the navigation mode. For instance, the presentation style of the driving mode may specify that gas stations should be shown in the map and the presentation style of the pedestrian mode specify that shops should be shown in the map.

The navigation mode manager 4160 identifies a navigation mode based on the motion analysis received from the motion data analyzer 4155 and environmental information analysis received from the environmental data analyzer 4150. In some embodiments, the navigation mode manager 4160 also keeps track of the navigation mode being used so that the navigation mode manager 4160 can decide whether to switch from this navigation mode to the identified navigation mode.

The navigation mode manager 4160 receives the current position information from the current position tracker 4180 and the destination location information from the route manager 4180 and uses the received information to decide whether to switch from the driving mode to the pedestrian mode. The navigation mode manager 4160 also interacts with the map manager 4130 to see the device has reached an end of a driving road or a walking road to switch from the driving mode to the pedestrian mode or vice versa.

The notification manager 4175 manages the presentation of notifications to the user. The notification manager 4175 receives the current position information from the current position tracker and the location information for the upcoming turn from the route manager 4110 to determine which notification to provide to the user.

The notification manager 4175 interacts with other components (not shown) of the device 4105 to identify (1) whether the device is connected to an audio output device, (2) whether the screen (not shown) of the device 4105 is turned on or off, and (3) whether the integrated application is running in the background. The notification manager 4175 also directs the device 4105 to output the audible and non-audiovisual notifications to the user.

The rendering module 4145 receives rendering instructions from the GUI manager 4125, the map manager 4130, and/or the route manager 4110. The rendering module 4145 draws map views, routes, GUI items, etc. according to the instructions and map data.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 42:
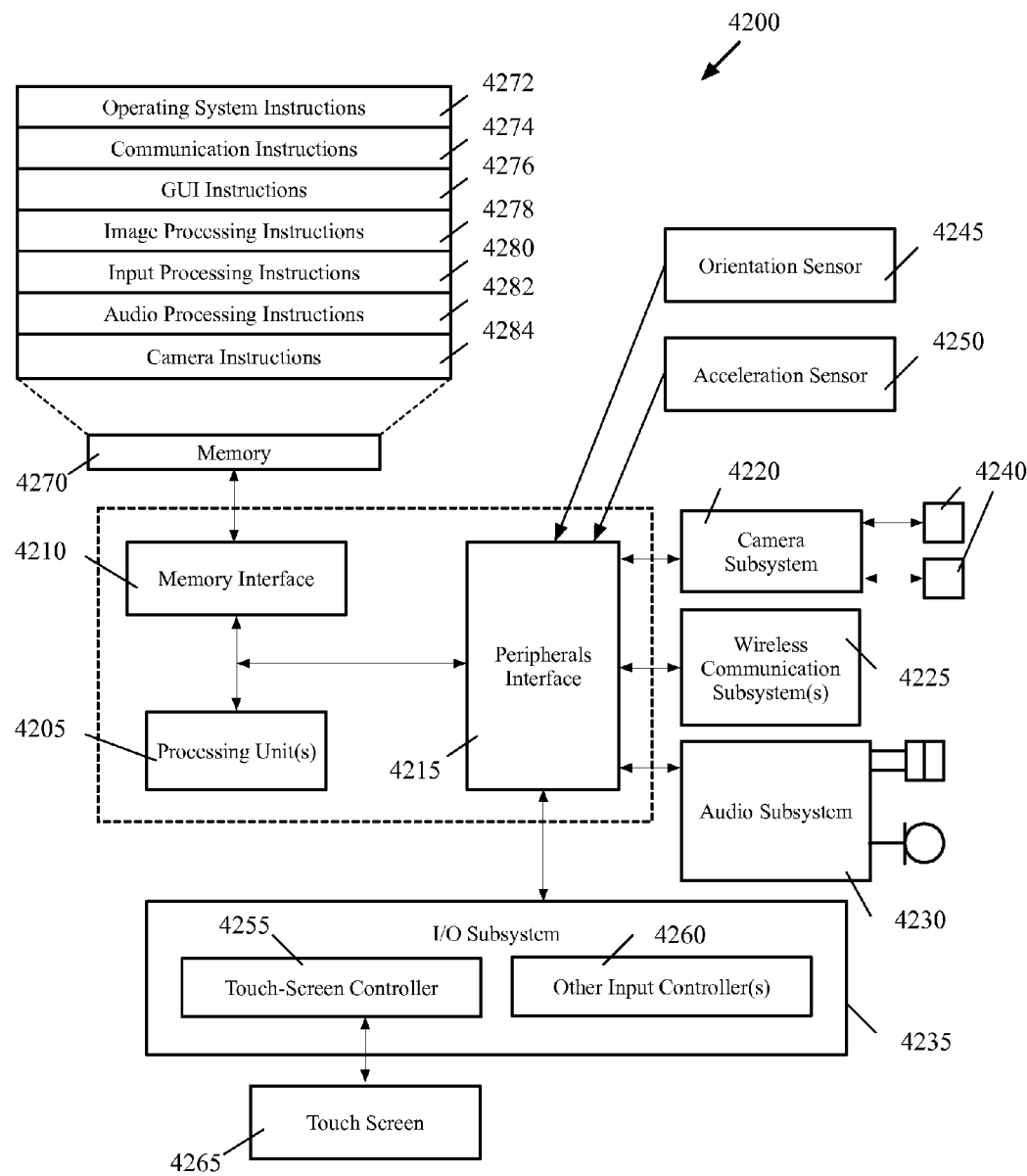
FIG. 42 is example architecture of a mobile computing device of some embodiments.

The mapping and navigation applications of some embodiments operate on mobile devices, such as smart phones (e.g., iPhones®) and tablets (e.g., iPads®). FIG. 42 is an example of an architecture 4200 of such a mobile computing device. Examples of mobile computing devices include smartphones, tablets, laptops, etc. As shown, the mobile computing device 4200 includes one or more processing units 4205, a memory interface 4210 and a peripherals interface 4215.

The peripherals interface 4215 is coupled to various sensors and subsystems, including a camera subsystem 4220, a wireless communication subsystem(s) 4225, an audio subsystem 4230, an I/O subsystem 4235, etc. The peripherals interface 4215 enables communication between the processing units 4205 and various peripherals. For example, an orientation sensor 4245 (e.g., a gyroscope) and an acceleration sensor 4250 (e.g., an accelerometer) is coupled to the peripherals interface 4215 to facilitate orientation and acceleration functions.

The camera subsystem 4220 is coupled to one or more optical sensors 4240 (e.g., a charged coupled device (CCD) optical sensor, a complementary metal-oxide-semiconductor (CMOS) optical sensor, etc.). The camera subsystem 4220 coupled with the optical sensors 4240 facilitates camera functions, such as image and/or video data capturing. The wireless communication subsystem 4225 serves to facilitate communication functions. In some embodiments, the wireless communication subsystem 4225 includes radio frequency receivers and transmitters, and optical receivers and transmitters (not shown in FIG. 42). These receivers and transmitters of some embodiments are implemented to operate over one or more communication networks such as a GSM network, a Wi-Fi network, a Bluetooth network, etc. The audio subsystem 4230 is coupled to a speaker to output audio (e.g., to output voice navigation instructions). Additionally, the audio subsystem 4230 is coupled to a microphone to facilitate voice-enabled functions, such as voice recognition (e.g., for searching), digital recording, etc.

The I/O subsystem 4235 involves the transfer between input/output peripheral devices, such as a display, a touch screen, etc., and the data bus of the processing units 4205 through the peripherals interface 4215. The I/O subsystem 4235 includes a touch-screen controller 4255 and other input controllers 4260 to facilitate the transfer between input/output peripheral devices and the data bus of the processing units 4205. As shown, the touch-screen controller 4255 is coupled to a touch screen 4265. The touch-screen controller 4255 detects contact and movement on the touch screen 4265 using any of multiple touch sensitivity technologies. The other input controllers 4260 are coupled to other input/control devices, such as one or more buttons. Some embodiments include a near-touch sensitive screen and a corresponding controller that can detect near-touch interactions instead of or in addition to touch interactions.

The memory interface 4210 is coupled to memory 4270. In some embodiments, the memory 4270 includes volatile memory (e.g., high-speed random access memory), non-volatile memory (e.g., flash memory), a combination of volatile and non-volatile memory, and/or any other type of memory. As illustrated in FIG. 42, the memory 4270 stores an operating system (OS) 4272. The OS 4272 includes instructions for handling basic system services and for performing hardware dependent tasks.

The memory 4270 also includes communication instructions 4274 to facilitate communicating with one or more additional devices; graphical user interface instructions 4276 to facilitate graphic user interface processing; image processing instructions 4278 to facilitate image-related processing and functions; input processing instructions 4280 to facilitate input-related (e.g., touch input) processes and functions; audio processing instructions 4282 to facilitate audio-related processes and functions; and camera instructions 4284 to facilitate camera-related processes and functions. The instructions described above are merely exemplary and the memory 4270 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 42 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 42 may be split into two or more integrated circuits.

B. Electronic System

Figure 43:
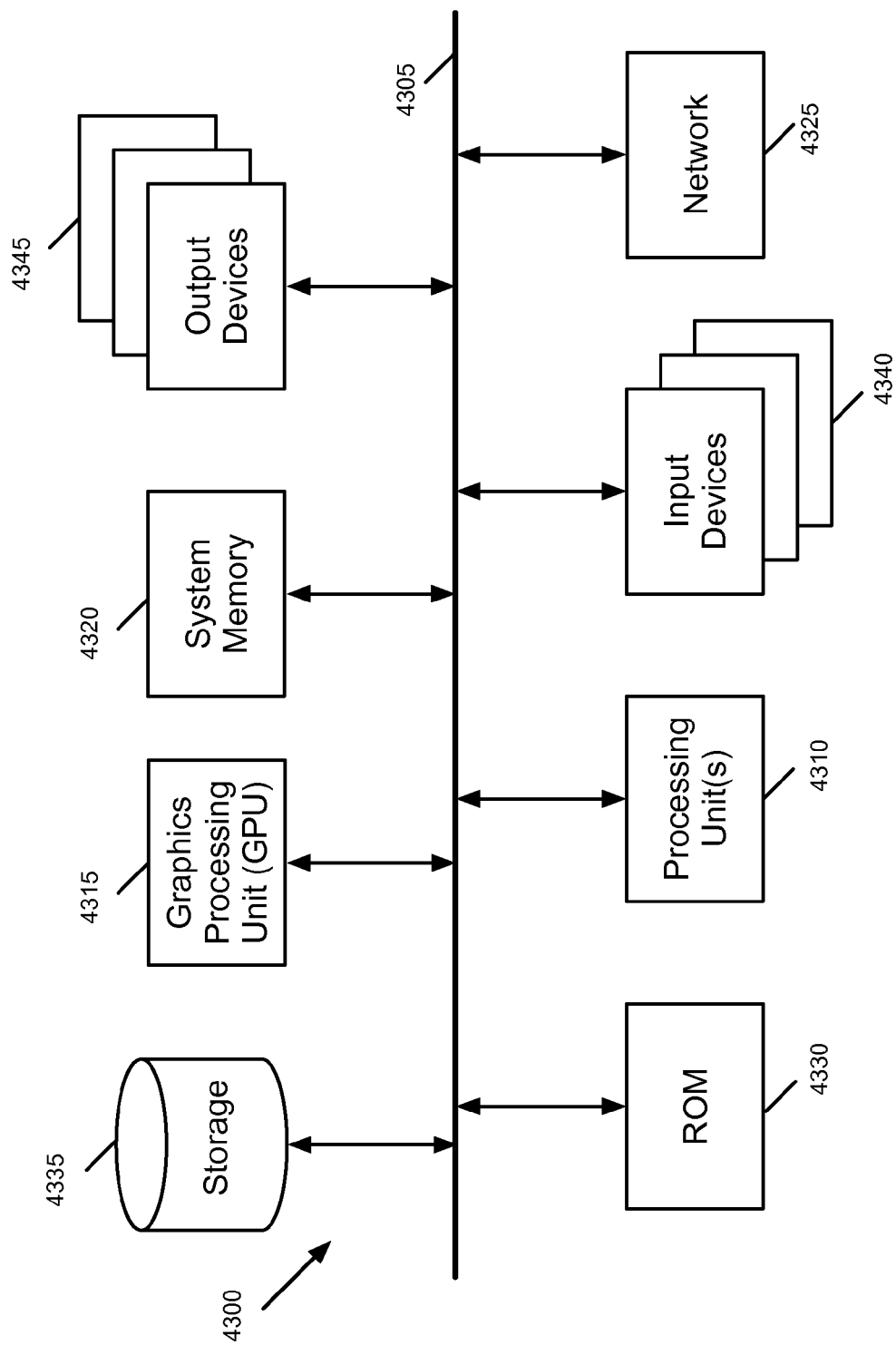
FIG. 43 conceptually illustrates an example of an electronic system with which some embodiments of the invention are implemented.

FIG. 43 conceptually illustrates another example of an electronic system 4300 with which some embodiments of the invention are implemented. The electronic system 4300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4300 includes a bus 4305, processing unit(s) 4310, a graphics processing unit (GPU) 4315, a system memory 4320, a network 4325, a read-only memory 4330, a permanent storage device 4335, input devices 4340, and output devices 4345.

The bus 4305 collectively represents all system, peripheral, and chipset buses that communicatively connect the numerous internal devices of the electronic system 4300. For instance, the bus 4305 communicatively connects the processing unit(s) 4310 with the read-only memory 4330, the GPU 4315, the system memory 4320, and the permanent storage device 4335.

From these various memory units, the processing unit(s) 4310 retrieves instructions to execute and data to process in order to execute the processes of the invention. The processing unit(s) may be a single processor or a multi-core processor in different embodiments. Some instructions are passed to and executed by the GPU 4315. The GPU 4315 can offload various computations or complement the image processing provided by the processing unit(s) 4310. In some embodiments, such functionality can be provided using CoreImage's kernel shading language.

The read-only-memory (ROM) 4330 stores static data and instructions that are needed by the processing unit(s) 4310 and other modules of the electronic system. The permanent storage device 4335, on the other hand, is a read-and-write memory device. This device is a non-volatile memory unit that stores instructions and data even when the electronic system 4300 is off. Some embodiments of the invention use a mass-storage device (such as a magnetic or optical disk and its corresponding disk drive, integrated flash memory) as the permanent storage device 4335.

Other embodiments use a removable storage device (such as a floppy disk, flash memory device, etc., and its corresponding drive) as the permanent storage device. Like the permanent storage device 4335, the system memory 4320 is a read-and-write memory device. However, unlike storage device 4335, the system memory 4320 is a volatile read-and-write memory, such a random access memory. The system memory 4320 stores some of the instructions and data that the processor needs at runtime. In some embodiments, the invention's processes are stored in the system memory 4320, the permanent storage device 4335, and/or the read-only memory 4330. For example, the various memory units include instructions for processing multimedia clips in accordance with some embodiments. From these various memory units, the processing unit(s) 4310 retrieves instructions to execute and data to process in order to execute the processes of some embodiments.

The bus 4305 also connects to the input and output devices 4340 and 4345. The input devices 4340 enable the user to communicate information and select commands to the electronic system. The input devices 4340 include alphanumeric keyboards and pointing devices (also called "cursor control devices"), cameras (e.g., webcams), microphones or similar devices for receiving voice commands, etc. The output devices 4345 display images generated by the electronic system or otherwise output data. The output devices 4345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 43, bus 4305 also couples electronic system 4300 to a network 4325 through a network adapter (not shown). In this manner, the computer can be a part of a network of computers (such as a local area network ("LAN"), a wide area network ("WAN"), or an Intranet), or a network of networks, such as the Internet. Any or all components of electronic system 4300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VI. Map Service Environment

Figure 44:
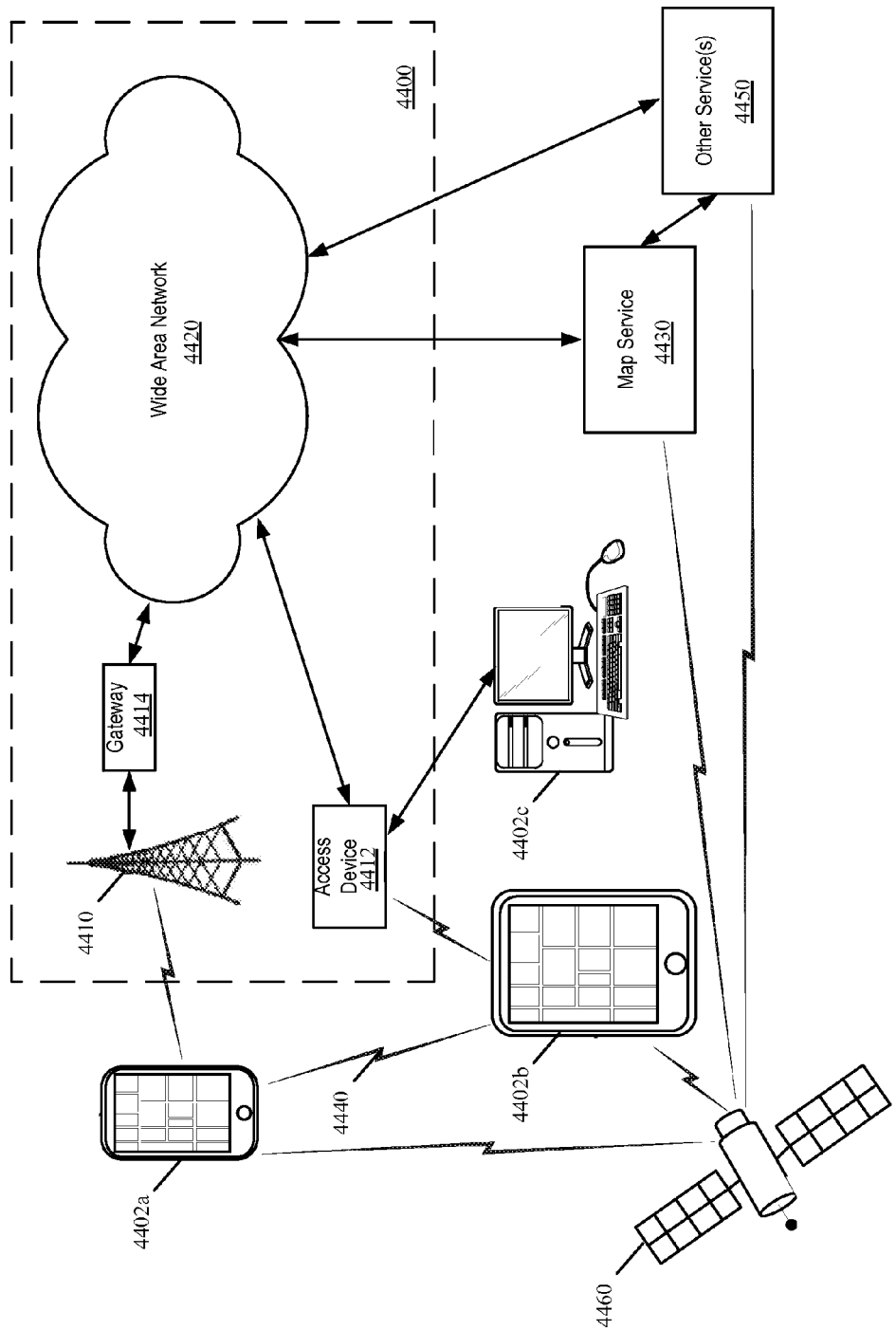
FIG. 44 illustrates a map service operating environment, according to some embodiments.

Various embodiments may operate within a map service operating environment. FIG. 44 illustrates a map service operating environment, according to some embodiments. A map service 4430 (also referred to as mapping service) may provide map services for one or more client devices 4402a-4402c in communication with the map service 4430 through various communication methods and protocols. A map service 4430 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 4402a-4402c may utilize these map services by obtaining map service data. Client devices 4402a-4402c may implement various techniques to process map service data. Client devices 4402a-4402c may then provide map services to various entities, including, but not limited to, users, internal software or hardware modules, and/or other systems or devices external to the client devices 4402a-4402c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 4402a-4402c) are implemented on different portable-multifunction device types. Client devices 4402a-4402c utilize map service 4430 through various communication methods and protocols. In some embodiments, client devices 4402a-4402c obtain map service data from map service 4430. Client devices 4402a-4402c request or receive map service data. Client devices 4402a-4402c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 44 illustrates one possible embodiment of an operating environment 4400 for a map service 4430 and client devices 4402a-4402c. In some embodiments, devices 4402a, 4402b, and 4402c communicate over one or more wire or wireless networks 4410. For example, wireless network 4410, such as a cellular network, can communicate with a wide area network (WAN) 4420, such as the Internet, by use of gateway 4414. A gateway 4414 in some embodiments provides a packet oriented mobile data service, such as General Packet Radio Service (GPRS), or other mobile data service allowing wireless networks to transmit data to other networks, such as wide area network 4420. Likewise, access device 4412 (e.g., IEEE 802.11g wireless access device) provides communication access to WAN 4420. Devices 4402a and 4402b can be any portable electronic or computing device capable of communicating with a map service. Device 4402c can be any non-portable electronic or computing device capable of communicating with a map service.

In some embodiments, both voice and data communications are established over wireless network 4410 and access device 4412. For instance, device 4402a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 4410, gateway 4414, and WAN 4420 (e.g., using Transmission Control Protocol/Internet Protocol (TCP/IP) or User Datagram Protocol (UDP)). Likewise, in some implementations, devices 4402b and 4402c can place and receive phone calls, send and receive e-mail messages, and retrieve electronic documents over access device 4412 and WAN 4420. In various embodiments, any of the illustrated client devices may communicate with map service 4430 and/or other service(s) 4450 using a persistent connection established in accordance with one or more security protocols, such as the Secure Sockets Layer (SSL) protocol or the Transport Layer Security (TLS) protocol.

Devices 4402*a* and 4402*b* can also establish communications by other means. For example, wireless device 4402*a* can communicate with other wireless devices (e.g., other devices 4402*b*, cell phones, etc.) over the wireless network 4410. Likewise devices 4402*a* and 4402*b* can establish peer-to-peer communications 4440 (e.g., a personal area network) by use of one or more communication subsystems, such as Bluetooth® communication from Bluetooth Special Interest Group, Inc. of Kirkland, Wash. Device 4402*c* can also establish peer to peer communications with devices 4402*a* or 4402*b* (not shown). Other communication protocols and topologies can also be implemented. Devices 4402*a* and 4402*b* may also receive Global Positioning Satellite (GPS) signals from GPS satellites 4460.

Devices 4402*a*, 4402*b*, and 4402*c* can communicate with map service 4430 over one or more wired and/or wireless networks, 4412 or 4410. For instance, map service 4430 can provide map service data to rendering devices 4402*a*, 4402*b*, and 4402*c*. Map service 4430 may also communicate with other services 4450 to obtain data to implement map services. Map service 4430 and other services 4450 may also receive GPS signals from GPS satellites 4460.

In various embodiments, map service 4430 and/or other service(s) 4450 are configured to process search requests from any of the client devices. Search requests may include but are not limited to queries for businesses, addresses, residential locations, points of interest, or some combination thereof. Map service 4430 and/or other service(s) 4450 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 4430 and/or other service(s) 4450 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 4430 and/or other service(s) 4450, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 4430 and/or other service(s) 4450 provide one or more feedback mechanisms to receive feedback from client devices 4402*a*-4402*c*. For instance, client devices may provide feedback on search results to map service 4430 and/or other service(s) 4450 (e.g., feedback specifying ratings, reviews, temporary or permanent business closures, errors etc.); this feedback may be used to update information about points of interest in order to provide more accurate or more up-to-date search results in the future. In some embodiments, map service 4430 and/or other service(s) 4450 may provide testing information to the client device (e.g., an A/B test) to determine which search results are best. For instance, at random intervals, the client device may receive and present two search results to a user and allow the user to indicate the best result. The client device may report the test results to map service 4430 and/or other service(s) 4450 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a navigation application which when executed by at least one processing unit of a device displays a navigation presentation for a route that includes a plurality of maneuvering instructions each associated with a location on a map, the navigation application comprising sets of instructions that, when executed by the at least one processing unit of the device, cause the device to perform a process comprising:
- tracking a current location of the device as the device traverses the route;
- identifying a particular maneuvering instruction that corresponds to the current location;
- in response to determining that the current location is within a threshold distance from a particular location, determining whether the navigation application operates in a first mode or a second mode;
- providing at least one of an audio notification and a visual notification in response to determining that the navigation application operates in the first mode;
- providing a first non-audiovisual notification in response to determining that the particular maneuvering instruction is for a first type of maneuver and the navigation application operates in the second mode; and
- providing a second, different non-audiovisual notification in response to determining that the particular maneuvering instruction is for a second type of maneuver and the navigation application operates in the second mode.

2. The non-transitory machine readable medium of claim 1, wherein the first non-audiovisual notification is a first vibration of the device and the second non-audiovisual notification is a second, different vibration of the device.

3. The non-transitory machine readable medium of claim 1, wherein the first non-audiovisual notification is a first combination of short and long vibrations of the device and the second non-audiovisual notification is a second, different combination of short and long vibrations of the device.

4. The non-transitory machine readable medium of claim 1, wherein the device comprises a display screen for displaying the map, wherein the second mode is a power save mode in which the screen is turned off.

5. The non-transitory machine readable medium of claim 1, wherein the second mode is a background mode in which the navigation application executes in a background of the device.

6. The non-transitory machine readable medium of claim 1, wherein the first type of maneuver comprises a left turn and the second type of maneuver comprises a right turn.

7. The non-transitory machine readable medium of claim 1,
- wherein the device comprises a display screen for displaying the map,
- wherein the first and second non-audiovisual notifications are supplemented by different audio notifications,
- wherein said audio notifications are provided when the screen is turned off only if the device is connected to an audio output device.

8. The non-transitory machine readable medium of claim 1, wherein the first and second non-audiovisual notifications are supplemented by different audio notifications,
- wherein said audio notifications are provided when the navigation application is executes in a background of the device only if the device is connected to an audio output device.

9. The non-transitory machine readable medium of claim 1, wherein the first and second non-audiovisual notifications are supplemented by different audio notifications,
- wherein the navigation application further comprises a user interface (UI) including a set of UI items for allowing a user to select a particular audio output device through which to provide said audio notifications.

* * * * *